Nov. 13, 1956 F. P. GOHOREL 2,770,676
AUTOMATIC TELEPHONE SYSTEMS
Filed Nov. 17, 1953 17 Sheets-Sheet 1

Inventor
F. P. GOHOREL
By Robert Harding Jr.
Attorney

Nov. 13, 1956 F. P. GOHOREL 2,770,676

AUTOMATIC TELEPHONE SYSTEMS

Filed Nov. 17, 1953 17 Sheets-Sheet 2

Inventor
F. P. GOHOREL
By Robert Harding Jr.
Attorney

Nov. 13, 1956 F. P. GOHOREL 2,770,676

AUTOMATIC TELEPHONE SYSTEMS

Filed Nov. 17, 1953 17 Sheets-Sheet 3

Inventor
F. P. GOHOREL
By Robert Harding Jr.
Attorney

Inventor
F. P. GOHOREL
By Robert Harding Jr.
Attorney

Inventor
F. P. GOHOREL
By Robert Harding Jr.
Attorney

Nov. 13, 1956

F. P. GOHOREL 2,770,676

AUTOMATIC TELEPHONE SYSTEMS

Filed Nov. 17, 1953

17 Sheets-Sheet 6

Inventor
F. P. GOHOREL
By Robert Harding Jr
Attorney

Inventor
F P GOHOREL
By Robert Harding Jr.
Attorney

Inventor
F. P. GOHOREL
By Robert Harding Jr.
Attorney

Inventor
F. P. GOHOREL
By [signature]
Attorney

Nov. 13, 1956

F. P. GOHOREL 2,770,676

AUTOMATIC TELEPHONE SYSTEMS

Filed Nov. 17, 1953

17 Sheets-Sheet 10

Inventor
F. P. GOHOREL
By Robert Harding Jr
Attorney

Inventor
F. P. GOHOREL
By Robert Harding
Attorney

Inventor
F. P. GOHOREL
By Robert Harding Jr.
Attorney

Inventor
F. P. GOHOREL
By Robert Harding Jr.
Attorney

Nov. 13, 1956 F. P. GOHOREL 2,770,676

AUTOMATIC TELEPHONE SYSTEMS

Filed Nov. 17, 1953 17 Sheets-Sheet 14

Inventor

F. P. GOHOREL

By Robert Harding Jr.

Attorney

Nov. 13, 1956 F. P. GOHOREL 2,770,676

AUTOMATIC TELEPHONE SYSTEMS

Filed Nov. 17, 1953 17 Sheets-Sheet 15

Inventor
F. P. GOHOREL

By Robert Harding Jr.
Attorney

Nov. 13, 1956 F. P. GOHOREL 2,770,676

AUTOMATIC TELEPHONE SYSTEMS

Filed Nov. 17, 1953 17 Sheets-Sheet 16

Inventor
F. P. GOHOREL
By Robert Harding Jr.
Attorney

Nov. 13, 1956 F. P. GOHOREL 2,770,676

AUTOMATIC TELEPHONE SYSTEMS

Filed Nov. 17, 1953 17 Sheets-Sheet 17

Inventor
F. P. GOHOREL
By Robert Harding Jr.
Attorney

United States Patent Office 2,770,676
Patented Nov. 13, 1956

2,770,676

AUTOMATIC TELEPHONE SYSTEMS

Fernand Pierre Gohorel, Antony, France, assignor to International Standard Electric Corporation, New York, N. Y., a corporation of Delaware Application November 17, 1953, Serial No. 392,713

Claims priority, application France December 18, 1952

18 Claims. (Cl. 179—18)

The present invention relates to automatic telephone systems and more particularly to registering and translating devices.

These devices receive the telephone number dialed, translate it and then send the various selective combinations required for routing the call.

In certain telephone exchanges, a selection chain is set aside for specific kinds of calls, such as national calls. A prefix digit characterizing such calls is then dialed by the calling subscriber to route the call to the segregated selection chain; the called subscriber's number, comprising an office code prefix and a numerical portion, is thereupon received by the register of the chain involved.

One of the features of the invention lies in the fact that when the subscriber removes his handset he finds himself connected to a main register, the digit denoting the special character of the call being received by said register, which associates itself directly with an auxiliary register designed to receive the office prefix and the corresponding signals from the translator, the numerical portion being thereupon received by the main register, these arrangements making it unnecessary to use a segregated selection chain for calls of this type.

Another feature of the invention lies in a main register consisting of a "receiver" that receives each of the digits dialed and then sends them immediately to a registering device, a "registering device" that registers the numerical portion of the number dialed, the sending of the selective combinations required for routing the call being thereupon effected, these arrangements making it possible to provide in each case a receiver adapted to the method of receiving the call number (numerical pulses, coded pulses) and yet to use a single registering and sending device in all cases.

Another feature of the invention lies in associating with the auxiliary register the receiver and the sender of the main register, the receiver receiving each of the digits of the office prefix and then sending them immediately to said auxiliary register, the sender exploring the various combinations received by the auxiliary register and then sending them to the various selection stages, these arrangements making it possible to use, for calls of a special type, equipment already provided for regular calls and to obtain an auxiliary register of simple design.

Another feature of the invention lies in the fact that when the association of the main and auxiliary registers has been effected, the receiver finds itself connected automatically to the auxiliary register and that, when the office prefix has been received by said register, this latter causes the numerical portion of the call number to be routed to the main register, arrangements being provided to release the auxiliary register as soon as the information it has received has been sent by the sender, the holding time of the auxiliary register thus being shortened, this making it possible to reduce the number of registers and to lessen the cost of the equipment.

Generally, a translator is seized by a register as soon as a predetermined number of digits of the call number has been received by the register. The register then sends these digits to the translator.

Another feature of the invention lies in a translator that can be associated with a plurality of registers of different types and can receive an indication of the calling subscriber's class, said translator thereupon sending selective combinations that depend upon the office prefix of the number dialed, upon the type of the calling register and upon the class of the calling subscriber, these arrangements making it possible to use one and the same translator regardless of what that class and the type of register may be and to provide a small number of translators in the exchange.

In some known systems a routing relay is used to translate one or more digital combinations. In order to fix the selective combinations corresponding to a particular routing relay, jumper wires are provided to connect each contact of the routing relay to the corresponding register relay designed to receive the translation, this making it necessary to provide one or more jumper wires for each digit translated.

In order to code the translation, use can be made of a device comprising current transformers of the torroidal coil type, each associated with a gas-discharge tube and a relay. A current of suitable magnitude is sent over a special wire characterizing the translation received; this wire passes through several toroidal coils whereof it constitutes the primary, the secondary being constituted by the coils themselves. The current induced in each secondary fires the corresponding tube, the actual operation of said tube being obtained by means of a pulse produced by the discharge of a condenser. The relays associated with the tubes rendered conducting energize, each relay energized corresponding to a coded translation.

Another feature of the invention lies in a translator comprising a series of terminals each corresponding to a digital combination to be translated and an electronic coding device whose various members are connected by permanent connections to the register relays designed to receive the translations, a wire individual to each digital combination to be translated being connected to the corresponding terminal and passing through the coils characterizing the various translations, these arrangements allowing a single jumper wire to be used for each digital combination to be translated.

It may happen that the number of digits necessary for the seizure of a translator will not be sufficient for the routing of the call.

Another feature of the invention lies in the fact that when the translator, after having received from the register a predetermined number of digits, cannot deduce therefrom the selective combinations required for the routing of the call, it releases after sending the register a signal that places said register in such a condition that it cannot seize a translator again until after having received all the digits necessary to bring about the routing of the call without fail; these arrangements allow shortening the holding time of the translators.

In certain cases provision is made for using one or more alternative routes when all the direct routes are busy.

Another feature of the invention lies in the fact that when there is no direct route for the call and one or more alternative routes are provided, the register receives a special signal that causes the release of the selection chain that has been seized, the return to normal of the devices for registering the translations and the reseizing of a translator, said translator receiving the office prefix of the number dialed, together with a re-routing signal, and sending to the register the selective combinations required for routing the call over the first alternative route.

Another feature of the invention lies in the fact that when all the first alternative-route lines are busy and a second alternative route is provided, the register receives the same signal as in the preceding feature, this causing the same operations, the register, owing to the reception of a first re-routing signal, sending to the translator a signal characteristic of a second alternative route, said translator sending to the register the selective combinations required for the routing of the call over the second alternative route, the various alternative routes being explored in a predetermined order according to this same method.

The essential function of the sender consists in exploring all or part of the selective combinations received by the various registers and required for the routing of the call and in then sending combinations out in succession.

Another feature of the invention lies in an exploring device consisting of a chain comprising a plurality of relays and two incoming wires, the relays associated with the first wire being designed to explore the odd combinations and the relays associated with the second wire being designed to explore the even combinations, a polarity applied to the first incoming wire being received by the first exploring relay, which operates, connects the sender to the device that has registered the first selective combination and at the same time prepares the circuit of the second exploring relay, arrangements being provided to switch said polarity to the second incoming wire after the sending of the first selective combination, the second exploring relay upon operating connecting the sender to the device that has registered the second selective combination and preparing the circuit of the third exploring relay, the operation of these various relays then proceeding according to the same method.

Another feature of the invention lies in arrangements that upon the sending of each selective combination cause the sending of a pulse to a combination of counting relays, these counting relays causing at the end of each pulse the operation of an inverting device that alternatively applies a polarity to one or the other of the two incoming wires of the exploring chain, thus ensuring the proper operation of said chain.

The sending of the codes required for the routing of a call does not always require the use of all the exploring relays, since the sender can send only part of the various digital combinations received by the registers. Where it is necessary to send in succession the selective combinations corresponding to two even-rank exploring relays or to two odd-rank exploring relays, special arrangements must be provided to ensure the proper operation of the exploring device.

Another feature of the invention lies in the fact that when an odd number of consecutive exploring relays remain unused, arrangements are provided for reversing the two incoming wires of the exploration chain and for thus causing the routing of the polarity to the appropriate wire, said polarity being applied twice in succession to this wire and then being switched again alternately to one wire and to the other.

In certain exchanges of a special type the subscribers are divided up into groups, the selection being effected in two stages, the first stage for selecting the group in the exchange and the second stage for selecting the line within the group. The numerical portion of the call number is used for these two selections taken together, it being possible for each of the digits making up such numerical portion to be sent out in the form of a multi-element code.

Another feature of the invention lies in a device for sending codes for selection stages each requiring several codes, comprising arrangements for receiving, from a selection stage, an "invitation-to-send" signal and arrangements for sending several selective combinations in succession, each combination consisting in the sending of an electrical characteristic or the simultaneous sending of several electrical characteristics and being sent for a predetermined period of time; a suitable time interval is left after each combination and a signal coming from said stage ends this sending after the reception of the number of codes necessary for the steering of said stage, it being possible for a new sending of codes to occur after the reception of a new "invitation-to-send" signal coming from the next selection stage.

If the division into groups is not on a decimal basis and it is desired to send without translation the various digits of the numerical portion of a call number, a digit already used for steering the first selection stage must be used over again to steer the second stage; moreover, each stage will be steered in the same manner by several different digits.

Another feature of the invention lies in arranging the various code elements of a digit in such a way that one or more elements will appear in all the codes that, for certain digits of a particular rank, must steer a selection stage in similar fashion, so that it will suffice to transmit to said stage this or these characteristic elements to the exclusion of the others.

Another feature of the invention lies in the fact that when a digit of a particular rank must be used both for the group-selecting stage and for the line-selecting stage, some of the code elements of this digit are transmitted to the group-selecting stage and the rest to the line-selecting stage, the codes corresponding to the other digits being sent complete to both the group-selecting and the line-selecting stages.

In the embodiment described, each digit is registered by a set of relays, each relay receiving a code element.

Another feature of the invention lies in using, to determine the called subscriber's group, the thousands digit and a code element of the hundreds digit, said element being sent before the thousands digit; these arrangements allow sending consecutively the thousands, the hundreds, the tens and the units digits, thus simplifying the arrangement of the device for the exploration of these digits by the sender.

Another feature of the invention lies in the fact that when a selection stage must be steered by a combination of several codes, arrangements are provided to withhold the sending of the first of these codes until all have been received by the register, thus shortening the holding time of the common control member associated with that selection stage.

By dialing, the calling subscriber causes the sending out of numerical pulses that are received by the receiver upon receiving relays whose energization combinations characterize at all times the number of pulses received. The number of these receiving relays being limited for reasons of economy, they energize according to a certain cycle. As a result, some of these relays can energize and release several times during the reception of a digit. Generally, the pulses will be received upon a combination known as "counting relays," some of said relays being required to operate at close intervals. It is of interest to replace these latter with a combination of relays giving the same results but operating faster and more dependably regardless of the repetition rate and the distortion of the subscriber's dial pulses.

Another feature of the invention lies in a combination of counting relays consisting of a differential relay and a single-winding relay, the opposition winding of the differential relay being placed in series with the winding of the other relay via a rectifier, the first pulse being received by the energizing winding of the differential relay and preparing the circuit of the single-winding relay, which does not actually operate until the end of the first pulse, the second pulse being received both by the opposition winding of the differential relay, which releases, and by the single-winding relay, which holds and does not release until the end of the second pulse, the rectifier being so poled as to prevent the untimely release of the differential relay at the end of the first pulse.

In a register group certain arrangements are adopted in order to lessen the effect of selection failures, that is, in order not to hold a register when the various selections are not made within a suitable period of time.

Another feature of the invention lies in a timing device switched in at the moment of each selection and operating after a predetermined time lag if said selection is not made, thus causing the release of the selection chain and a resumption of the selection operations, said device being then released, switched in again and operating after a predetermined time lag if the second selection attempt is unsuccessful, the calling subscriber then receiving the busy tone.

Another feature of the invention lies in the fact that upon the resumption of the selection operations the translations received from the translator that was used for the first selection attempt are cancelled and another translator, switched in thereupon, sends to the register the translations required for the routing of the call and releases, the seizure of these two translators in succession having the effect of eliminating any wrong translations that may have been sent by the first translator owing to a fault.

Another feature of the invention lies in the fact that when the routing of a call requires the switching in of the auxiliary register, the operation of the timing device is so modified that, if the selection relative to the numerical portion is not made within a predetermined period of time, said device sends the calling subscriber the busy tone, these arrangements making it possible to release the auxiliary register as soon as the translations received by said register have been sent out.

The registers may be divided up into $p$ groups, each group comprising $n$ registers. When a register has received a predetermined number of digits, it seizes a free translator from among the $q$ that can be associated with the $n \times p$ registers.

Another feature of the invention lies in a system for connecting a calling register and a free translator and comprising a connecting device for associating any register with any translator, the number of these devices being equal to $n \times p \times q$, and a common control device, switched in at the time of hunting for a translator, controlling the operation of the appropriate connecting device and releasing, these arrangements ensuring the connection of the calling register to the chosen translator and holding only one connecting device, it being possible to make said connection with any number of connecting wires.

Another feature of the invention lies in a common control device for connecting a calling register to a free translator and comprising a set of $n \times p$ relays, each relay being individual to a register, another set of $p$ relays being provided for each translator, each of these $p$ relays being associated with a group of registers, the relay associated with the calling register operating and completing the circuit, in each translator, of the relay characterizing the group of the calling register, arrangements being provided to leave switched in only one translator relay and to disable all the others so as to make a choice among all the free translators, the operation of the device connecting the calling register to said translator being obtained by the combination of the two relays that have operated.

Various other features of the invention will appear from the following description, given as a nonlimitative example with reference to the accompanying drawing, in which.

Figure 10:
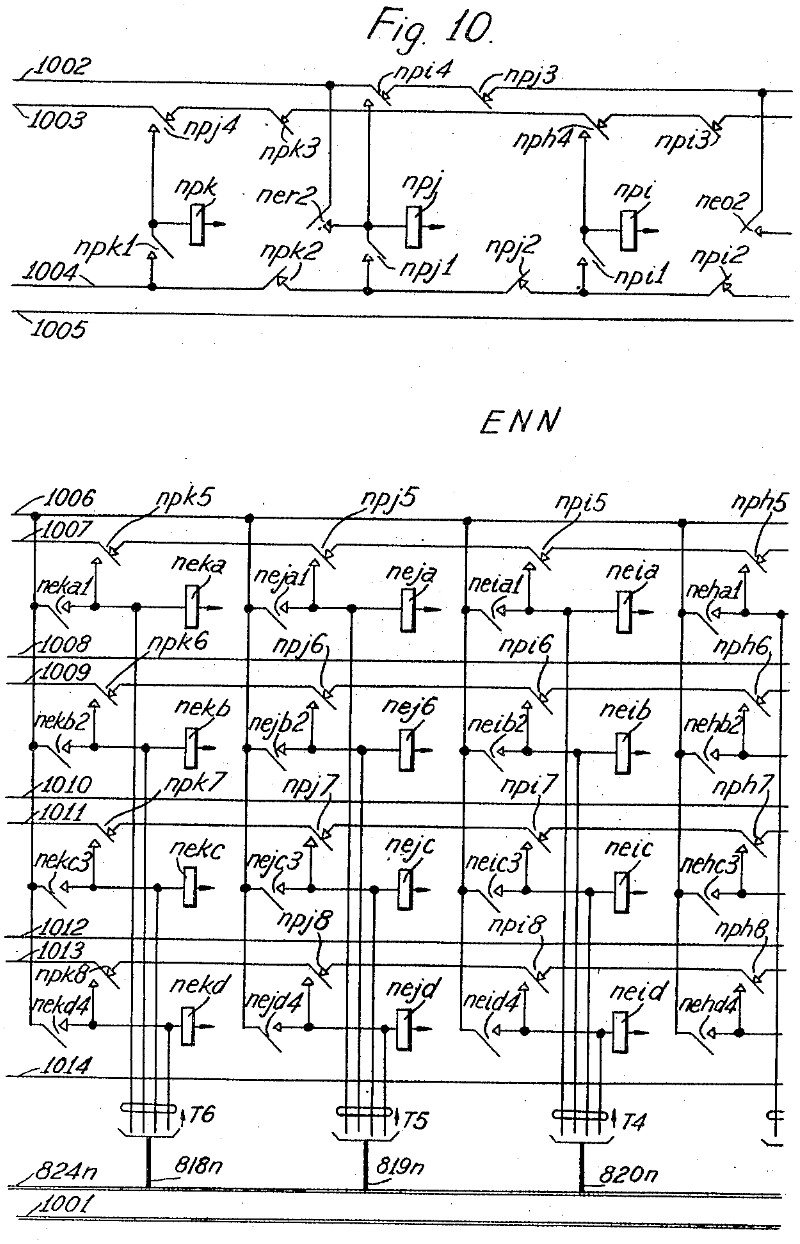
Figure 10A:
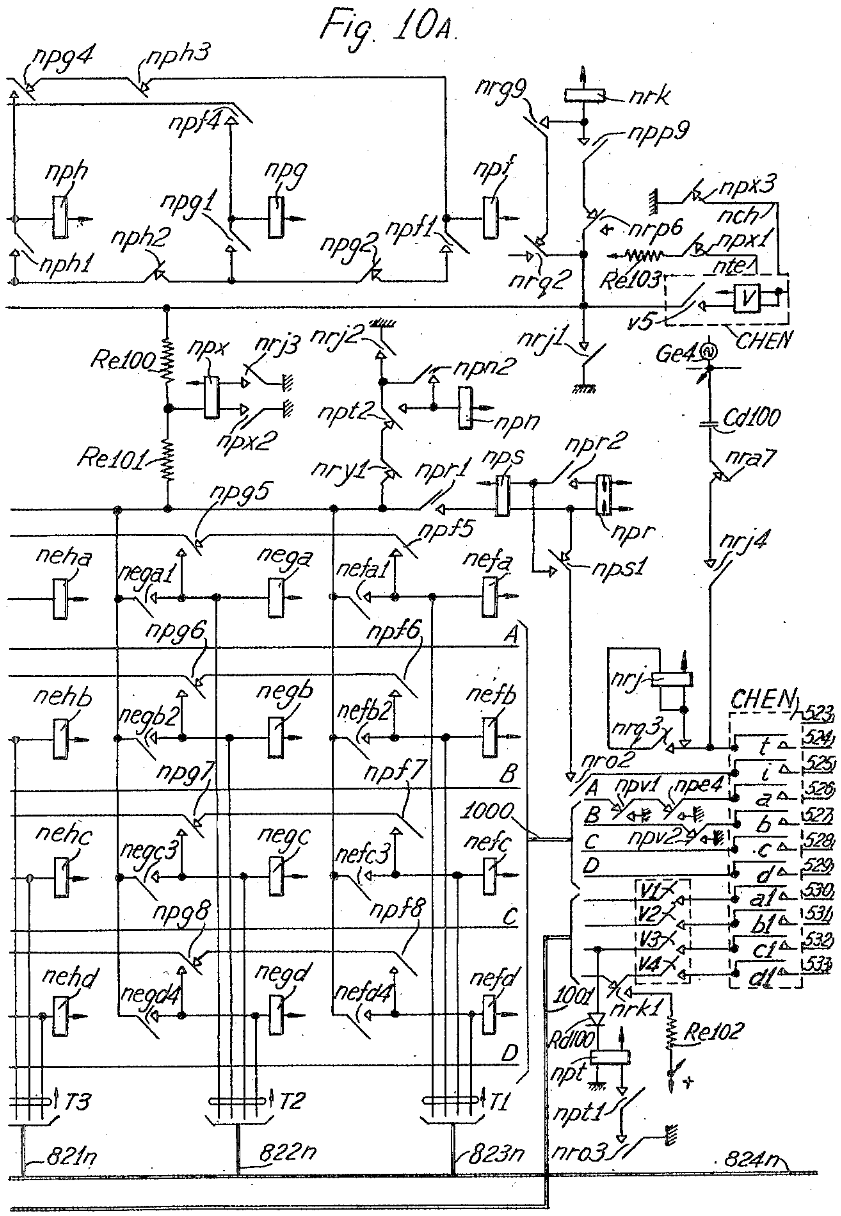
Figure 11:
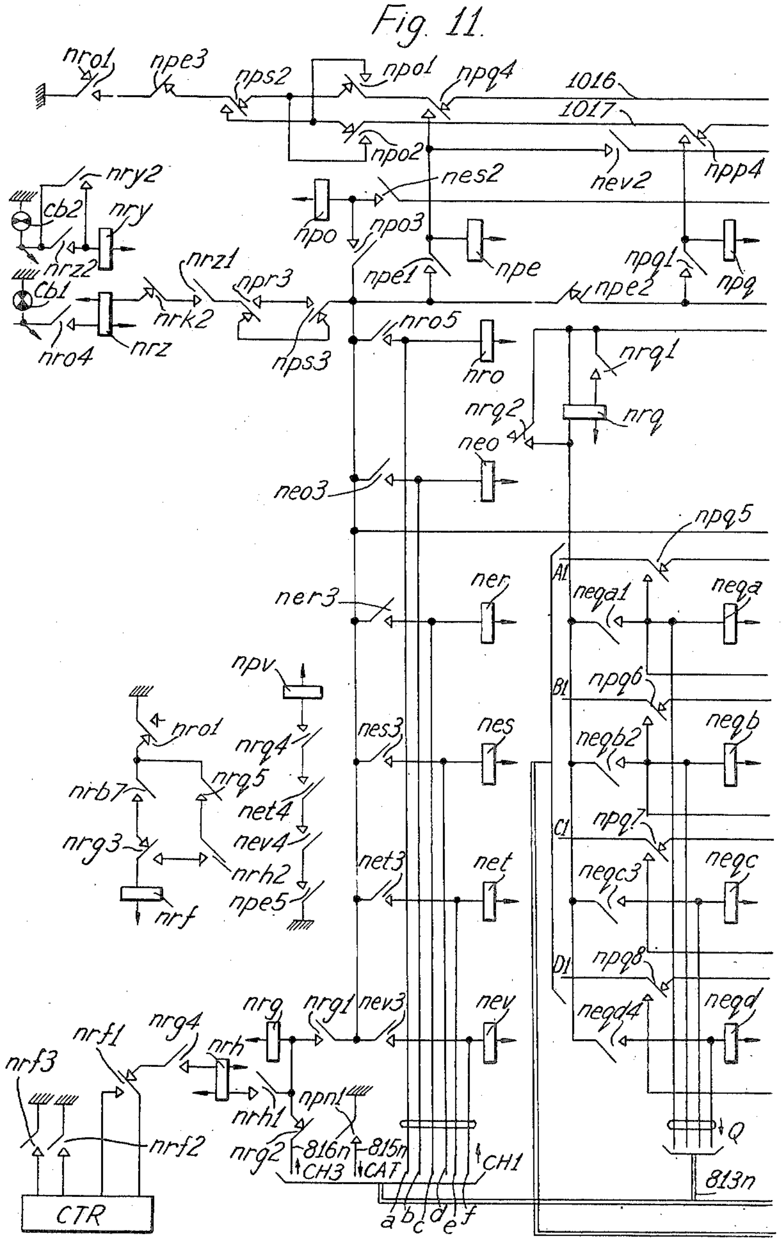
Figure 11A:
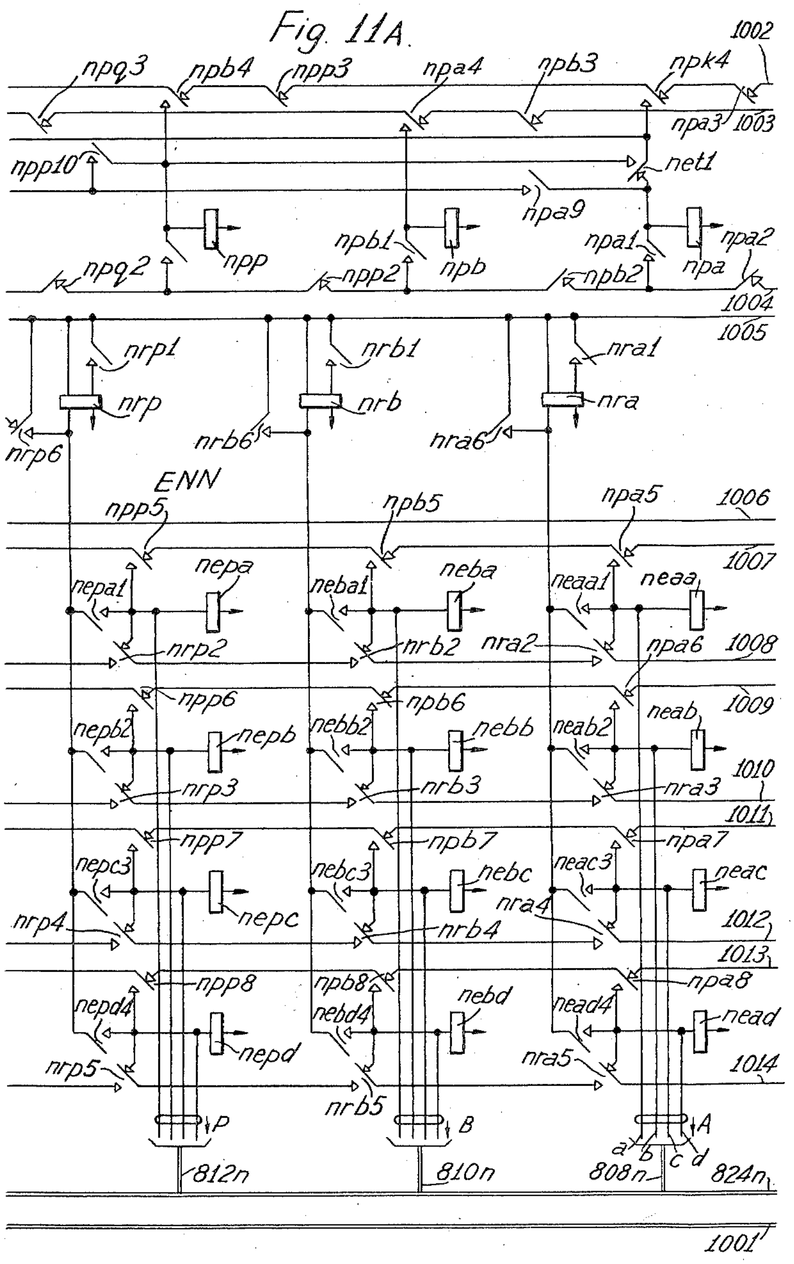
Figure 12:
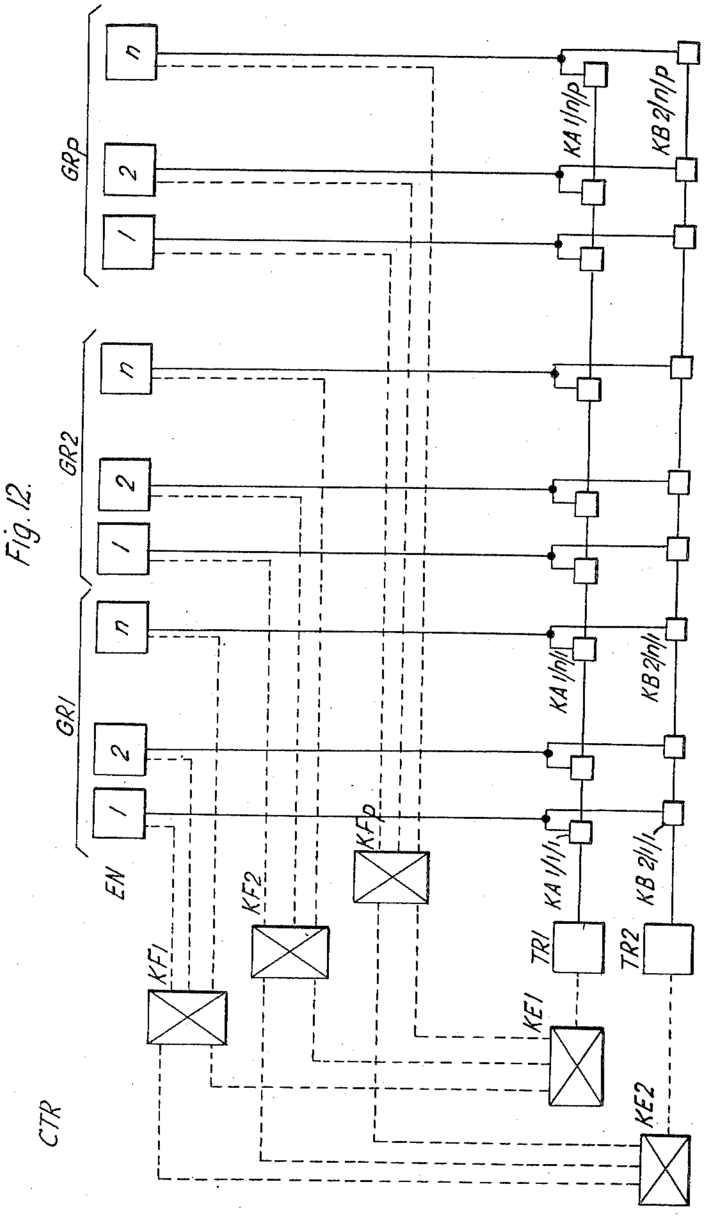
Figure 13:
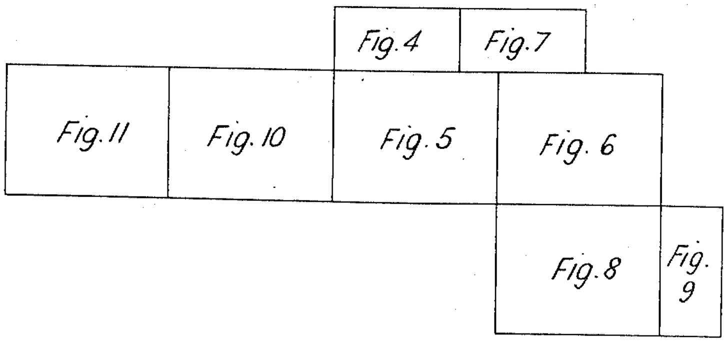

Figs. 10 through 11*a* show the schematic of an auxiliary register;

Fig. 12 is a switching diagram used to explain the method of connecting a register to a translator; and Fig. 13 is the manner of associating Figs. 4 to 11.

In the following description the cases will be discussed in succession of a call requiring the use of a main register only and of a call requiring the use of an auxiliary register. In the embodiment described it has been assumed that in the first case the call was a local or regional call, in which case the main register may be designated as a "regional receiver-register-sender group" or "regional group," and that in the second case the call was a national call, the auxiliary register then being designated as a "national register."

The general operation of the system will now be described with reference to Figs. 1 and 2.

In an automatic switchboard, a group of equipment designed for the purpose receives the digits dialed and registers them so as to be able to route the call.

In the following description it will be assumed that the automatic switchboard involved serves a number of subscribers divided up into groups. A "group-selecting means" hunts for the group of the called subscriber, a "line-selecting means" hunting for the called subscriber among all the subscribers in the group involved.

The case of a local call will be discussed first. When subscriber A*b* (Fig. 1) desires to make a call, he removes his handset and thus finds himself connected to a feeding bridge AL1 according to a known method after said feeding bridge has itself been connected to a free receiver-register-sender group ENR through a finder CHER.

Group ENR then sends the calling subscriber the dial tone telling him he may dial the called subscriber's number. This number generally comprises two different parts:

(1) A prefix characterizing the other subscriber's local exchange or group;

(2) A numerical portion characterizing the subscriber in the exchange or the group.

The pulses sent out by the subscriber's dial are received and registered by group ENR.

This group is then connected to a free translator TR through a translator connector CTR. It will be noted that several translators can serve a number of registers. If no translator is free, the association of group ENR with a translator cannot take place. The holding time of a translator TR is very short in practice. The delay in routing a call owing to the unavailability of a translator is therefore very small.

The translator receives from the register the prefix dialed. It translates the digits received in the form of codes and sends a number of translations to group ENR. It determines the number of digits to be translated and then the number of preliminary codes required for the group selection. The translator also determines the number of untranslated digits to be sent to the line-selecting stage. It then sends a service indication to group ENR, together with all the other indications required for the routing of the call to its destination, including metering indications, if needed, and releases.

It will be assumed that subscriber A*b* makes a call to a distant office or to a special service. When this subscriber removes his handset he is connected, according to the same method described above, to a register, which itself is connected to a translator TR through a translator connector CTR. The translator then sends to group ENR translations determining the codes that will cause the routing of the call through selection stages SG and SG′ to an outgoing trunk leading to the distant office or special service called and thence to the called subscriber's local exchange in the case of a distant office.

It will now be assumed that the calling subscriber is connected to a distant office located ahead of the exchange involved. Said subscriber's call is received over an incoming line such as *lge*1 associated with incoming trunk JA (Fig. 1). This trunk JA is connected according to a known method to a feeding bridge AL2 after said feeding bridge has been connected to a register ENR' and a translator TR as previously described through a finder CHER'. The translator sends the necessary translations to register ENR' in order to enable it as previously described to route the call to a subscriber connected to the exchange involved or to an outgoing line *lgs*1 through an outgoing trunk JD if the called subscriber is in a distant office.

The case where a subscriber makes a national call will now be described with reference to Fig. 2.

At the originating exchange a subscriber removing his handset is connected as described to regional register ENR, which sends him the dialing tone. The calling subscriber then dials the special number characterizing a national call. As soon as regional register ENR has received that number, it causes as described the seizure of a translator, which sends it back a service indication causing it to be connected to a national register ENN over a national-register finder CHEN. That connection having been made, a new dialing tone is sent to the calling subscriber. Said subscriber then dials the called subscriber's number. This number comprises two quite different parts, the same as the number dialed for a regional call, that is, a prefix and a numerical portion:

(1) The prefix is registered in the national register through national-register finder CHEN;

(2) The numerical portion is registered in register ENR.

As in the case of a local call, the national register hunts for a free translator, connects itself to it through a translator connector CTR and sends it the prefix received. The translator then sends national register ENN the preliminary codes and service indications required to enable it to route the call to an outgoing trunk JD and thence to the local exchange or the toll center of the subscriber through one or more group-selecting stages SG, SG', depending upon the case.

When the national register has sent back the necessary indications through the regional register, it causes the operations that in said regional register ENR will allow sending the outgoing trunk and calling line *lgs*2 the second portion of the call number that it had registered before.

It may happen that the calling subscriber A*b* desiring to make a national call is connected to a distant office located beyond the exchange under consideration.

In that case, the call is received by the trunk JA associated with line *lge*2, said trunk being connected to feeding bridge AL2 by known means after this feeding bridge has been connected to a regional register ENR' as in the preceding case. The calling subscriber then dials, as in the preceding case, the special number characterizing a national call. The translator seized by regional register ENR' causes this register to be connected to a national register ENN through a national-register connector CHEN The routing of the call then develops as in the preceding case.

Having thus described the general operation of the system in the various cases that can arise, the various members making up the system will now be described and their role indicated.

Figures 1, 3:
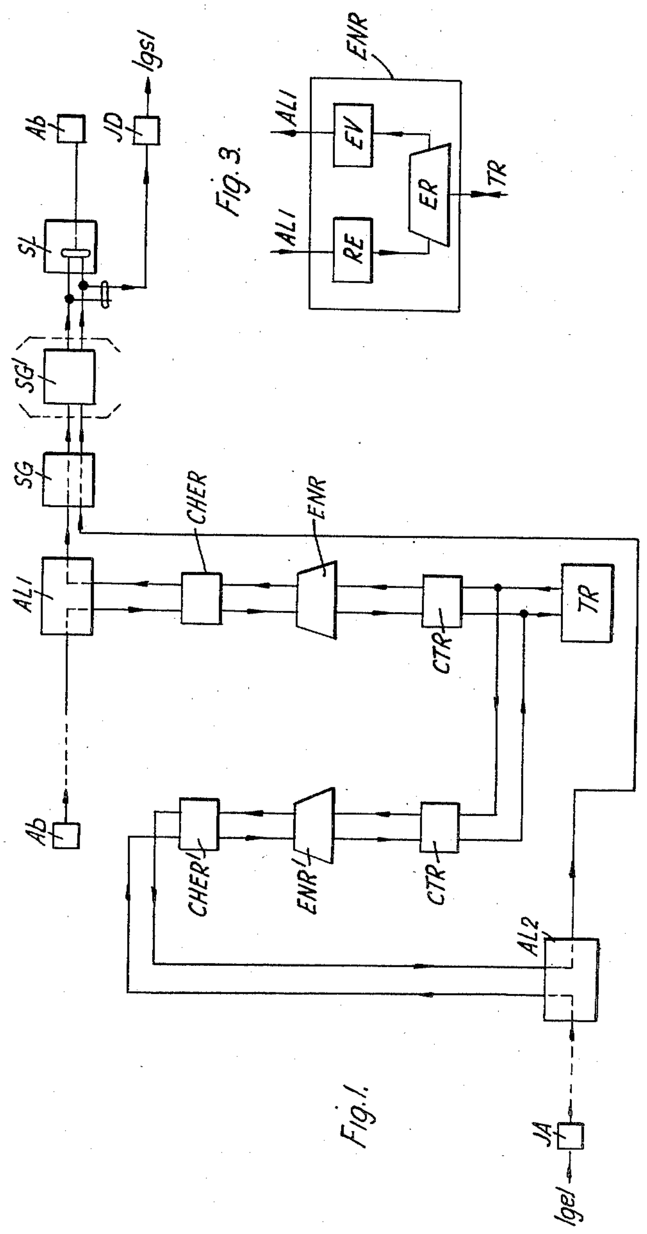
Fig. 1 is a switching diagram used to explain the general operation of the system in the case of a call using the main register.
Fig. 3 shows the various components of a main register.

Regional group ENR comprises, in general, three component members: a receiver RE, a sender EV and a register ER (Fig. 3).

Receiver RE connects regional register ER to register finder CHER and to the feeding bridge. It gives out the dial pulses and the class indications of the calling line and sends these codes to register ER.

Regional register ER receives the codes coming from receiver RE and registers them; it also receives the codes and the service indications from the translator and registers them.

Sender EV is connected directly to the feeding bridge and through said feeding bridge to the whole selection chain below.

It sends the selective combinations that allow routing the call to the local system or to a distant office up to the called subscriber if the distant office is of the same type as the originating office and up to an outgoing trunk if the distant office is of a different type. This same sender EV also allows routing the call to an outgoing trunk in the case of a national call.

The codes received from receiver RE comprise the digits dialed by the calling subscriber and the calling line's class codes. The register seizes a translator as soon as the prefix is registered. The latter, after having received the prefix, as also the calling subscriber's class indication, answers by sending register ER a number of translations that will allow sending the digits required for the routing of the call. This sending is done by sender EV, which causes the starting of a registering-relay reading chain in ER.

Figure 2:
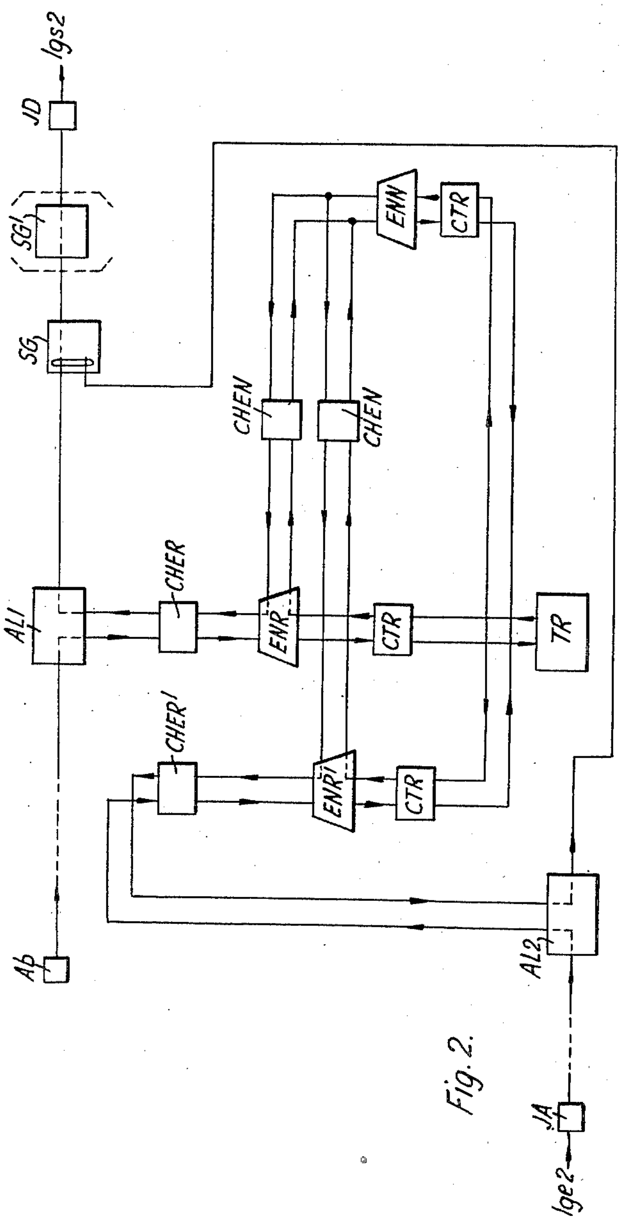
Fig. 2 is a switching diagram used to explain the general operation of the system for a call requiring the use of an auxiliary register.

If the subscriber makes a national call, as stated he dials a special number, which causes in the translator the sending of a service indication controlling the seizure of a national register ENN (Fig. 2).

The national register comprises a chain for registering the prefix dialed by the calling subscriber in the case of a national call, which chain is connected to the receiver of regional register ENR, and a chain for registering the codes sent back by the translator. The exploring chain of register ENN is controlled by the sender EV of regional register ENR and allows reading the routing codes and the digits according to the service indications and transmitting them to said sender EV.

As pointed out, the national register is seized by regional register ER and registers only the called subsecriber's prefix. That operation over, national register ENN releases in the regional register the operations for registering in said regional register the numerical portion of the called subscriber's number.

The seizure of the translator by the national register is effected according to the same method indicated for the regional register when the first two digits of the national prefix have been registered.

After the return and translation of the first portion of the called subscriber's number, the national register sends regional register ER a signal that causes the sending back of said number's second portion, which it had registered.

It has been assumed in all the foregoing that the prefix dialed sufficed to determine the called subscriber's group or the direction of his distant office.

For equipment reasons and for metering reasons it may happen, in the case of a regional call, that the prefix dialed will not suffice and that it will be necessary to add a new digit to those making up said prefix. In that case, the translator returns a special service-indication calling for a new digit in order to route the call. It then releases itself from the register, which, after the added digit has been registered, seizes a translator again. The operations then develop according to the method already described.

In the case of a national call, if the first two digits of the prefix registered do not suffice to route the call, the translator calls for the other two digits and the operations develop according to the method already described.

A local call will now be described with reference to Figs. 4 to 9.

In the descriptions that follow, the contacts associated with the relays or magnets are designated by the same letter or group of letters as the relay or the magnet, followed by one of references 1 to 9. Only small letters are used to reference said contacts.

In some schematics only such circuit components as are necessary for an understanding of the invention are shown. For example, some relay sets are shown connected up in a chain, that is, they are so arranged that the simultaneous energization of these relays cannot occur, the details of these circuits not being shown.

In some cases, for the purpose of simplifying the drawing, not all the similar members or circuits have been shown but only one member or circuit of each kind, their number being shown in parentheses. For instance, when there are 10 relays *trfa* in the translator, only one is shown.

In some cases, further, it has been necessary to show several relays performing the same functions. These relays are then denoted by one and the same group of letters, followed by a digit indicating the rank of the relay. The contacts will then be denoted by the group of letters denoting the relay, followed by two digits separated by a slant line. Thus, contact *kb*1/5 in connector CTR denotes contact No. 5 of the first *kb* relay.

Of course, if a contact of these relays plays a quite obvious role in the various circuits to which it belongs, such contact will be denoted in the usual manner by the letters denoting the particular relay, followed by the number denoting the rank of the contact involved.

Individual members have been separated from common members by dash lines. The same applies to the various common members.

To make it easier to read the drawing it has been necessary to group the connecting wires, in particular those connecting two adjoining figures, into a cable.

It will be assumed to begin with that the various members used in the course of the present description are free. Under these conditions, all the relays and magnets shown in Figs. 4 to 9 are in home position, excepting relays *kc* of the translator connector and *kg* of the translator. Relay *kc* (Fig. 8) is in effect energized over the following circuit: battery, resistance R*e*80, back *kf*1/1 . . . *kfn*/1, relay *kc*, ground. Relay *kg* (Fig. 8) is energized over the following circuit: battery, resistance R*e*81, chain of back contacts *ke*1/1 . . . *kep*/1, relay *kg*, back *try*1, ground.

The battery normally used to supply the various relays, whose negative pole is represented by an arrow, has its positive pole grounded; however, a special low-capacity battery is also provided, whose negative pole is grounded and whose positive pole is represented by an arrow bearing the plus sign. There has also been need of a battery supplying a high voltage for the gas-discharge tubes; this battery is denoted by the letters HT together with the plus or the minus sign, depending upon whether the high voltage required is positive or negative.

It will be assumed as a nonlimitative example that the automatic switchboard involved serves 10,000 subscribers. These 10,000 subscribers are divided up into 20 groups of 500, each group being selected by a group-selecting means SG of a group-selecting set. The called subscriber is then hunted by a line-selecting means of a line-selecting set.

As stated, a subscriber A*b* removing his handset is connected to a feeding bridge AL1 (Fig. 1) having access to a free regional register ENR through a register finder CHER. When these conditions have been met, wire *v* (Fig. 4) is grounded, magnet V of the register finder energizes and makes the connection between the regional register and its feeding bridge through the closing of its contacts *a*, *b*, *c*, *t*, *a'*, *b'*, *c'*, *t'*, as also contacts *v*1 to *v*6.

It will be noted in this connection that the calling subscriber's line wires *a* and *b* are not connected to the register upon the seizure of said register by finder CHER, while wire *c*, denoting said subscriber's class, is connected to the register. The class indication is then sent to the special relays of the receiver until the subscriber is connected to the register, this connection causing a break in the class wire as will subsequently be explained.

Over its front *v*2 magnet V completes the following circuit for the relay *ab* whereby the seizing is done by the finder: ground in the finder, wire *t'*, contact of individual switch *cher*, front *v*2, back *ac*2, relay *ab*, battery. Relay *ab* energizes. It will be noted that this relay energizes at the moment the register is seized by the finder and therefore before this regional register ENR is itself connected to the calling subscriber, for the reason indicated above.

Over its front *v*3 magnet V completes the circuit of the local feeding bridge's seizing relay over the *t* wire of finder CHER across resistance R*c*. Over its front *v*4 and *v*5 it prepares the sending of the selective combinations to the various selection stages. Over its front *v*6 magnet V prepares a holding circuit to the ground given by *ab*2, a circuit that will be completed when relay *ab* energizes. Over its front *v*1 magnet V completes the circuit of the *c* wire of finder switch CHER in receiver RE. This is the circuit for sending the calling subscriber's class indication.

In receiver RE there are four relays *ap*, *aq*, *ar*, *as*, two of them, *aq* and *as*, being marginal relays, which are the class-indication relays. They energize for alternations of a quite definite sense, as follows from the presence of rectifiers R*d*40 and R*d*41, and for given values of amplitude of said alternations. It is then possible to send over the *c* wire eight different signals that will allow one or more of the class relays to energize by using positive or negative alternations of quite definite amplitudes of alternating current of more or less great magnitude and undulating current. This undulating current is characterized by the fact that the positive and negative alternations are not of the same amplitude.

If F designates the current amplitude not allowing a marginal relay to energize, and G that allowing a marginal relay to energize, the following table gives the energizing combinations of the class relays.

It will be noted that in the case of the undulating current the plus or minus sign prefixed to the letters F and G indicates the sense of the alternation whose value is represented by said letters.

| Current | Current Amplitude | Relay Energized |
|---|---|---|
| Positive | F | *ap* |
| Do | G | *ap—aq* |
| Negative | F | *ar* |
| Do | G | *ar —as* |
| Alternating | F | *ap—ar* |
| Do | G | *ap—aq—ar—as* |
| Undulating | +F—G | *ap—ar—as* |
| Do | +G—F | *ap—aq—ar* |

It will be assumed in the description that follows, to simplify the specification, that the magnitude of the current flowing over the *c* wire is great and positive. Under these conditions, the following circuit is completed: positive source in the feeding bridge, wire *c*, contact associated with switch *cher*, front *v*1, back *ac*3, rectifier R*d*40, upper windings of relays *ap* and *aq*, ground; relays *ap* and *aq* energize in series.

The contacts of the four class-indication relays are grouped a certain way in a coder CD1 to effect a coding of the indications received over the *c* wire. This coder CD1 has one incoming wire 409 and three outgoing coding wires A', B', C'. Each of these wires is connected to a class-code registering relay in register ER.

Over their front *ap*2 and *aq*3 relays *ap* and *aq* complete holding circuits for themselves to the ground on front *ab*2 of relay *ab*. These circuits will be completed when *ab* energizes. Upon energizing, relay *ab* completes the following circuits over its front *ab*2:

(1) Holding circuits of relays *ap* and *aq* as already stated;

(2) Ground, front *ab*2, wire 406, back *sq*3, resistance R*e*70, relay *sm*, battery. Relay *sm* energizes.

Over its front *ab*3 relay *ab* completes the energizing circuit of relay *ax* over its lower winding. This relay energizes.

Over its back *ax*1 relay *ax* removes the battery from test wire *te* in order to mark the register involved busy. Over its back *ax*2 it removes the ground from chain wire *ch* for the same reason. Over its front *ax*3 it prepares holding circuits that will be used at the time of the release.

It will be noted that the chain and test wires as also wires *a, b, c, t, a', b', c', t'* of finder *cher* terminate at the feeding bridge across the stage *cc* comprising the control members of said finder.

During these operations for the reception of the calling subscriber's class indication, the operations for connecting said subscriber to regional register ENR have occurred according to a known method, as previously indicated, and relay *aa* energizes over the subscriber's loop. Over the following circuit: generator Ge1 in register ER (Fig. 5), back *rp*7, wire 400, condenser C*d*40, back *ad*1, middle winding of relay *aa*, ground, the dialing tone is sent into said middle winding; this current passes by induction into the right- and left-hand windings of relay *aa* and is sent to the calling subscriber over the following circuit: ground, right-hand winding of relay *aa*, wire *b* . . ., subscriber's loop . . ., wire *a*, left-hand winding of relay *aa*, battery.

The calling subscriber A*b* then dials the called subscriber's number. It will be assumed throughout what follows that the system involved is a 6-digit system, the digits being denoted respectively by P, Q, M, C, D, U. The first two digits will constitute a prefix and will be used to characterize the local exchange or the group of the called subscriber; said digits can, for example, consist of a prefix comprising one letter and one digit. The last four digits are intended to identify the called subscriber within his local exchange. It will be assumed that the calling subscriber dials the number M2–25–70.

When said subscriber dials, breaks are made in the loop of his line and relay *aa* beats.

In receiver RE the pulses are received by relays *ag* to *am*. The contacts of these relays form a coder CD2 having one incoming wire 411 and four outgoing coding wires A, B, C, D having access in register ER to relays registering said codes.

Relay *aa* upon energizing completes the following circuit over its front *aa*1: battery, resistance Re43, front *aa*1, relay *ac*, ground. Guard relay *ac* energizes. This is a slow relay and will therefore hold during the pulse trains.

Upon energizing, relay *ac* completes over its front *ac*1 a holding circuit for relay *ab*. Over its back *ac*2 it opens the initial energizing circuit of said relay *ab*. Over its back *ac*3 it opens the energizing circuits of class relays *ap* . . . *as*, which hold as already stated. Over its front *ac*5 it applies the general holding ground of register ER. Over its front *ac*4 it applies the general holding ground of the receiver and of the sender and ground incoming wire 409 of coder CD1 of the class-relay contacts, thus allowing the coding of the class indications received by wire *c*.

As already pointed out, relays *ap* and *aq* are energized, closing their front *ap*1, *aq*1 and *aq*2 in coder CD1. The following circuits are then completed:

(1) Ground, front *ac*4, wire 409, back *ar*1, front *aq*2, wire A', which extends into cable 402 in register ER up to relay *eea*, battery;

(2) The circuit already described, front *aq*1, wire B', cable 402, relay *eeb* in register ER, battery.

Relays *eea* and *eeb* energize, having thus registered the class indication. These relays close their front *eea*1 and *eeb*2, thus completing a holding circuit for themselves to the general ground of the register over front *ac*5.

The subscriber having received the dialing tone from the register, he then dials the first digit of the called subscriber's number, that is, the letter M, corresponding to the sending out of 6 pulses.

On the first break made by the dial; relay *aa* falls back, having its energizing circuit opened. Over its back *aa*1 it short-circuits relay *ac*, which being slow to release does not fall back, and over its front *aa*1 it removes the short-circuit of relay *ad*, which energizes over the following circuit: ground, back *oa*1, front *ac*6, relay *ad*, resistance Re43, battery. It will be noted that this relay *ad* energizes on each pulse train. In effect, on each release of beating relay *aa*, relay *ad* is short-circuited over front *aa*1, but the delay this circuit imposes is too great as compared with the repetition rate of the pulse of a train. Relay *ad* therefore holds throughout a pulse train.

Over its back *ad*1 relay *ad* upon energizing breaks the dialing-tone sending circuit to the calling subscriber. Over its front *ad*4 it applies the receiver's general ground over *ac*4 to receiving relays *ag* to *am* and to relay *ae*. The following circuit is completed for the latter relay: ground, front *ac*4 and *ad*4, relay *ae*, resistance Re44, battery. Relay *ae* energizes.

Upon energizing, relay *ae* gives itself a holding ground, over front *ae*1, and also gives it to receiving relays *ag* to *am*. At its front *ae*2 it prepares the application of the ground of contact *ac*4 to the coder CD2 of the receiving-relay contacts; this circuit is completed when relay *ad* falls back.

Relay *aa*, which has released, completes the following circuit over its back *aa*3: ground, front *ac*4 and *ad*4, back *ru*4, *aa*3 and *ah*1, right-hand winding of differential relay *ag*, battery. Relay *ag* energizes.

Over its front *ag*2 relay *ag* upon energizing completes a holding circuit for itself across ground and Re46. Over its front *ag*3 it prepares the switching in of its second winding. Over its front *ag*4 it prepares the energizing circuit of relay *ah*. At the end of the first break, that is, of the first pulse, relay *aa* re-energizes.

Over its front *aa*1 relay *aa* reconnects relay *ac* to the battery. It will be noted that relay *ac*, being slow, has not had time to release. As a result, relay *ac* remains energized throughout the pulse trains, while relay *ad*, short-circuited by front *aa*1, is slowed but falls back after each pulse train. Over its front *aa*2 relay *aa* completes to the ground of *ac*4 the energizing circuit of relay *ah*, which energizes.

Over its front *ah*5 relay *ah* upon energizing completes the following circuit: ground of front *ac*4, front *ad*4, wire 410, front *ah*5, back *aj*3, right-hand winding of differential relay *ai*, which energizes.

Upon energizing, relay *ai* prepares for itself over its front *ai*1 a holding circuit across the right-hand winding of relay *aj*. This circuit will be completed when *ah* is no longer energized. Over its front *ai*2 relay *ai* prepares the switching in of its left-hand winding.

Therefore, when the first pulse ends, receiving relays *ag*, *ah* and *ai* are energized in the receiver.

Relay *aa* releases at the start of the second pulse.

Over its back *aa*3 relay *aa* upon releasing completes the following circuit: ground over a known circuit, wire 410, back *ru*4 and *aa*3, front *ah*1 and *ag*3, left-hand winding of differential relay *ag*, battery. The fluxes in the two windings of relay *ag* being equal and of opposite sense, relay *ag* is balanced and releases. In parallel with this circuit, back *aa*3 completes a holding circuit for relay *ah* across rectifier R*d*42 and resistance Re47. This holding is necessary, because the release of relays *aa* and *ag* opens the energizing circuit of relay *ah* at *aa*2 and *ag*4.

At the end of the second pulse, relay *aa* energizes again and over its back *aa*3 opens the holding circuit of relay *ah*, which releases.

Upon releasing, relay *ah* removes over its front *ah*5 the short-circuit of the right-hand winding of relay *aj*, allowing this relay to energize over the right-hand winding of relay *ai*.

Over its front *aj*4 relay *aj* upon energizing completes the following circuit: ground on wire 410, front *aj*4, back *al*2, right-hand winding of differential relay *ak*, battery. Relay *ak* energizes.

Over its front *ak*1 relay *ak* upon energizing prepares a holding circuit for itself over the right-hand winding of relay *al*. This relay does not energize, said winding being short-circuited by contact *aj*4. Over its front *ak*2 relay *ak* prepares the switching in of its second winding.

Therefore, the reception of the second pulse is characterized by the energization of relays *ai, ak* and *aj* in receiver RE.

Relay *aa* releases again at the start of the third pulse. Relay *ah* having returned to normal, as already mentioned, the release of relay *aa* completes the energizing circuit of relay *ag* over its right-hand winding across back *aa*3 and *ah*1.

Over its front *ag*2 relay *ag* upon energizing completes a holding circuit for itself over its right-hand winding. Over its front *ag*3 it prepares the switching in of its left-hand winding. Over its front *ag*4 it again prepares the re-energization of relay *ah*.

Relay *aa* re-energizes at the end of the third pulse. Over its front *aa*2 it completes, across front *ag*4 of relay *ag* energized, the energizing circuit of relay *ah*, which energizes. Relay *ah* completes the following circuit over its front *ah*5: ground on wire 410, front *ah*5, *aj*3 and *ai*2, left-hand winding of differential relay *ai*, battery. Relay *ai*, being balanced, releases. In parallel with the preceding circuit, contact *ah*5 completes the following holding circuit for relay *aj*: ground on wire 410, front *ah*5, *aj*3 and *aj*5, left-hand winding of relay *aj*, battery.

The reception of the third pulse is therefore characterized by the energization of relays *ag, ak, ah* and *aj* in receiver RE.

Relay *aa* releases again at the start of the fourth pulse. Over its back *aa*3 it causes the release of differential relay *ag* according to a known method.

At the end of the fourth pulse, relay *aa* re-energizes and over its back *aa*3 opens, as at the end of the second pulse, the holding circuit of relay *ah*, which releases.

Over its front *ah*5 relay *ah* upon releasing opens the holding circuit of relay *aj*, which releases in turn.

Upon opening its front *aj*4, relay *aj* removes the short-circuit of the right-hand winding of relay *al*, which energizes.

Upon energizing, relay *al* prepares for itself, over its front *al*2 and *al*4, a holding circuit over its left-hand winding.

The reception of the fourth pulse is therefore characterized by the energization of relays *ak* and *al* in receiver RE.

Relay *aa* releases at the start of the fifth pulse. Over its back *aa*3 it causes relay *ag* to energize according to a method already described.

Upon energizing, relay *ag* prepares the energization of relay *ah*, according to a method already described.

Relay *aa* re-energizes at the end of the fifth pulse, completing over its front *aa*2 the energizing circuit of relay *ah*, which energizes.

Relay *ah* upon energizing completes over its front *ah*5 the energizing circuit of differential relay *ai* over its right-hand winding and prepares a holding circuit for itself over its front *ah*1. Nothing is changed for relays *ak* and *al*, which also remain energized.

The reception of the fifth pulse is therefore characterized by the energization of relays *ag, ah, ai, ak* and *al* in receiver RE.

Relay *aa* releases at the start of the sixth pulse and causes according to a known method the release of relay *ag*.

Relay *ag* upon releasing completes the following circuit over its back *ag*1: ground on wire 410, back *ag*1, front *ai*3 and *al*5, relay *am*, battery. Relay *am* energizes.

Relay *aa* re-energizes at the end of the sixth pulse. Over its back *aa*3 relay *aa* upon energizing opens the holding circuit of relay *ah*, which releases. Relay *ah* upon releasing removes the short-circuit of the right-hand winding of relay *aj*, which energizes.

Relay *aj* upon energizing completes the following circuit: ground on wire 410, front *aj*4, *al*2 and *ak*2, left-hand winding of relay *ak*, battery. Differential relay *ak*, being balanced, releases.

As has been seen, relay *am* has energized. Over its front *am*5 it has completed a holding circuit to the general ground of contact *ac*4 across resistance R*e*48.

The reception of the sixth pulse is therefore characterized by the energization of relays *ai, aj, al* and *am* in receiver RE.

The reception of the first digit (M) thus ends.

Relay *ad*, being short-circuited by front *aa*1 of relay *aa*, ends by releasing, the second-digit pulses not being sent yet.

Over its back *ad*4 relay *ad* upon releasing short-circuits relay *ae*, which releases slowly, thus ensuring the continued grounding, over its front *ae*1, of the seized receiving relays at the end of the first pulse-train and the grounding, over back *ad*2 and front *ae*2, of incoming wire 411 of coder CD2. The following circuits are then completed:

(1) Ground, front *ac*4, wire 409, *ae*2, back *ad*2, wire 411, back *ah*2, front *am*1, wire A, cable 401, wire A in register ER, back *rp*2, relay *epa*, battery.

(2) Ground . . ., front *am*4, wire D, cable 401, wire D, back *rp*5, relay *epd*, battery.

Relays *epa* and *epd* energize in the register and characterize the first digit (P) of the prefix of the subscriber called by subscriber A*b*.

These two relays upon energizing close their front *epa*1 and *epd*4, preparing a holding circuit for themselves to the general ground *ac*5 of the register across the left-hand winding of relay *rp*. This holding circuit, which is at the same time the energizing circuit of relay *rp*, will be switched in when relay *ae* is released, removing the short-circuit of said relay over its front *ae*2.

Relay *ae*, a slow relay, as already pointed out, ends by releasing. Over its front *ae*1 it removes the ground from the receiving relays still seized after the first pulse train of the first digit has been registered in ER, that is, relays *ai, aj, al* and *am*. Over its front *ae*2 relay *ae* removes the ground from incoming wire 411 of coder CD2, allowing relay *rp* to energize and also allowing the holding of the relays that register the first digit.

By energizing, relay *rp* (Fig. 5) indicates the end of the registration of the digit P. It completes a holding circuit for itself over its front *rp*1. Over its back *rp*2 to *rp*5 it breaks the possible energizing circuits of the relays that register the first digit of the prefix and over its front *rp*2 to *rp*5 it prepares the registration of the second digit of the prefix, that is, the digit Q, over relays *eqa* . . . *eqd*. Over its front *rp*6 it short-circuits its left-hand winding, which makes it slow to release, and applies ground direct to relays *epa* and *epd*. Over its back *rp*7 it opens the circuit used to send the invitation-to-send tone.

The receiver is then ready to receive over relays *ag* to *am* the pulses characterizing the second digit (Q).

It has been assumed that Q was represented by the digit 2. The sending of this digit corresponds to the emission of two numerical pulses. From the explanations given above it follows that the condition of the receiving relays at the end of the second pulse is as follows: relays *ai, ak* and *aj* are energized.

Relay *ad* releases then and at *ad*4 short-circuits relay *ae*, which releases with a certain delay. During the lapse of time separating the release of relays *ad* and *ae*, incoming wire 411 of coder CD2 is grounded. The following circuit is then completed, it being understood that relays *ai, ak* and *aj* have energized: ground, front *ac*4, wire 409, front *ae*2, back *ad*2, wire 411, front *aj*1, back *am*2, wire B, cable 401, wire B, front *rp*3, back *rq*3, relay *eqb*, battery. Relay *eqb* energizes.

Upon energizing, relay *eqb* closes its contact. Over its contact *eqb*2 it prepares a holding circuit for itself over front *eqb*2 and the left-hand winding of relay *rq* to the general ground of the register.

Slow relay *ae* ends by releasing, removing the ground from coder CD2, by opening its front *ae*2, and the receiving relays by *ae*1. Relay *rq* then energizes and the holding circuit of relay *eqb* is completed. Receiving relays *ai, ak* and *aj* release. The receive is then ready to receive the third pulse of the character M.

By energizing, relay *rq* indicates the registration of the character Q in register ER. Over its front *rq*1, *rq* completes a holding circuit for itself. Over its back *rq*2/*rq*5 it opens the possible energizing circuits of relays *eqa/d* and over its front *rq*2/*rq*5 it prepares the energizing circuits of the relays that register the character M of the number dialed by the calling subscriber. Over its front *rq*7 it completes the following circuit: battery, *rf* (Fig. 6), back *rg*3, front *rq*7, back *eo*1, *er*1 and *es*1 in parallel, wire 711, back *sq*8 and *so*1, ground. Relay *rf* energizes.

After the energization of relay *rq,* following the release of relay *ae*, the receiver is ready to receive the thousands digit. It has been seen that in the specific example described this digit was the digit 2.

It follows from the foregoing that at the end of the second numerical pulse the thousands digit is received by the receiver, whose relays *ai, ak* and *aj* are energized. According to a method previously described, a pulse is sent over outgoing wire B of coder CD2 and the ground of contact *ac*4 is extended to wire B over front *rp*3 and *rq*3, back *rr*4, wire 512, back *rm*3 up to the relay *emb* energized and terminates at the battery.

Upon energizing, relay *emb* prepares a holding circuit for itself over its front *emb*2 to the general ground of the register over front *ac*5, across the left-hand winding of relay *rm.*

As before, relay *ae* ends by releasing, removing the ground from the incoming wire of coder CD2 and the set of receiving relays *ag* to *am.* Relays *ai, ak* and *aj* release and *rm* energizes.

The energization of *rm* indicates that the thousands digit has been registered in register ER. Over its front *rm*1, *rm* completes a holding circuit for itself. Over its back *rm*2 to *rm*5 it opens the possible energizing circuits of relays *ema/d* and over its front *rm*2/*rm*5 it prepares the energizing circuits of relays *eca/d* for the codes characterizing the next digit, that is, the hundreds digit. Over its front *rm*6 it short-circuits its left-hand winding and grounds relay *emb* directly.

The hundreds digit being a 5, it is characterized by 5 numerical pulses. It follows from the preceding explanations that at the end of the fifth pulse, relays *ag, ai, ak, ah* and *al* of the receiver will be energized upon the release of *ad* and during the holding of relay *ac,* slow releasing, as already pointed out, the following circuits are completed by the ground of *ac*4 applied to the incoming wire of coder CD2:

(1) Ground, front *ac*4, wire 409, front *ae*2, back *ad*2, wire 411, front *ah*2, back *am*1, wire A, cable 401, wire A, front *rp*2 and *rq*2, back *rr*3, wire 510, front *rm*2, back *rc*2, relay *eca,* battery;

(2) The circuit already described, front *al*3, back *am*3, wire C, cable 401, wire C, front *rp*4 and *rq*4, back *rr*5, wire 514, front *rm*4, back *rc*4, relay *ecc,* battery. Relays *eca* and *ecc* energize.

Over their front *eca*1 and *ecc*3 these relays upon energizing prepare a holding circuit for themselves across the left-hand winding of relay *rc* and the general ground of register *ac*5 (sic—Translator).

Relay *ae* ends by releasing and it isolates coder CD2 and the receiver's receiving relays from the ground of contact *ac*4 over its front *ae*2 and *ae*1. Relays *ag, ai, ak, ah* and *al* release, making the receiver ready to receive the tens digit (D).

Relay *rc* energizes and by its energization indicates that the reception of the hundreds digit by register ER has ended.

Over its front *rc*1 relay *rc* completes a holding circuit for itself. Over its back *rc*2/*rc*5 it opens the possible energizing circuits of relays *eca/ecd* and over its front *rc*2/*rc*5 it prepares the energizing circuits of tens-digit receiving relays *eda/edd.* Over its front *rc*6 it short-circuits its left-hand winding and grounds relays *eca* and *ecc* directly.

The tens digit is a 7, characterized by 7 numerical pulses. It has been seen before that receiving relays *ai, aj, al* and *am* were energized at the end of the sixth pulse.

At the start of the seventh pulse, relay *aa,* which had energized at the end of the sixth pulse, releases. Relay *ah* being in normal position, relay *aa* causes, over its back *aa*3 and in known manner, the energization of relay *ag* by switching in the right-hand winding of said relay *ag.* Relay *ag* energizes. Relay *aa* energizes again at the end of the seventh pulse.

As has already been pointed out, upon the re-energization of relay *aa,* relay *ag* holds over its front *ag*2 and relay *ah* energizes over contacts *aa*2 and *ag*4.

Upon energizing, relay *ah* switches in, over its front *ah*5 and front *aj*3 and *ai*2, the second winding of relay *ai.* This relay is then balanced and it releases.

The reception of the tens digit (7) at the receiver is therefore characterized by the energization of relays *ag, ah, aj, al* and *am.*

According to a known method, the closing of the contacts of these relays in coder CD2 completes the following circuits:

(1) Ground, front *ac*4 . . ., front *aj*1, *al*6, *ah*3 and *am*2, wire B, cable 401, wire B, front *rp*3 and *rq*3, back *rr*4, wire 512, front *rm*3 and *rc*3, back *rd*3, relay *edb,* battery;

(2) The circuit already described, front *am*4, wire D, cable 401, wire D, front *rp*5 and *rq*5, back *rr*6, wire 516, front *rm*5 and *rc*5, back *rd*5, relay *edd,* battery.

Relays *edb* and *edd* energize. Over their front *edb*2 and *edd*4, these relays prepare a holding circuit for themselves across the left-hand winding of relay *rd.*

When slow relay *ae* has returned to normal, isolating coder CD2 and the set of receiving relays of receiver RE, relays *ag, ah, aj, al, am* release and relay *rd* energizes, marking the end of the registration of the tens digit in the receiver.

Relay *rd* completes a holding circuit for itself over its front *rd*1. Over its back *rd*2/*rd*5 it isolates the possible energizing circuits of relays *eda/edd* and over its front *rd*2/*rd*5 it prepares the energizing circuits of units-digit registering relays *eua/eud.* Over its front *rd*6 it removes the short-circuit of its left-hand winding and grounds relays *eda* and *edd* directly.

The units digit is a zero, characterized by 10 numerical pulses.

As has been seen, relays *ag, ah, aj, al, am* are energized in the receiver at the end of the seventh pulse. Relay *aa,* which was energized, releases at the start of the eighth pulse. Over its back *aa*3 it switches in the second winding of relay *ag* over front *ah*1 and *ag*3. The fluxes in the two windings of said relay *ag* are equal and of opposite sense. Relay *ag* releases.

Relay *aa* re-energizes at the end of the eighth pulse, opening at *aa*3 the holding circuit of relay *ah.* The latter releases.

Upon releasing, relay *ah* opens over its front *ah*5 the energizing circuit of relay *aj,* which releases.

Upon releasing, relay *aj* opens over its front *aj*4 the energizing circuit of relay *al,* which releases in turn. Relay *am* holds over its front contact *am*5.

The eighth pulse is therefore characterized by the energization of relay *am.*

Relay *aa* releases at the start of the ninth pulse, causing in known manner the energization of relay *ag* over back *aa*3. This relay holds over its front *ag*2.

Relay *aa* re-energizes at the end of the ninth pulse and over front *aa*2 and *ag*4 completes the energizing circuit of relay *ah,* which energizes.

Over its front *ah*5 relay *ah* completes the energizing circuit of relay *ai* by switching in its right-hand winding. Relay *ai* therefore energizes and it holds over its contact *ai*1. Relay *am* is always energized.

The ninth pulse is therefore characterized by the energization of relays *ag, ah, ai* and *am* in the receiver.

Relay *aa* re-energizes at the end of the tenth pulse, bringing about in known manner the release of relay *ag*.

Relay *aa* re-enenrgizes at the end of the tenth pulse, bringing about in known manner the release of relay *ah*.

Upon releasing, relay *ah* opens its front *ah*5, this causing the energization of relay *aj*, the short-circuit of its right-hand winding being eliminated.

Upon energizing, relay *aj* causes over its front *aj*4 the energization of relay *ak* over its right-hand winding.

The reception of the tenth pulse is therefore characterized by the energization of relays *ai, ak, aj* and *am* of the receiver.

According to a method already described, slow relays *ad* and *ae* hold for a short instant, allowing the grounding of coder CD2 in order to effect the coding.

The energization of relays *ai, ak, aj* and *am* allows completing the following circuits:

(1) Ground by front *ac*4, circuit already described, back *ah*2, front *am*1, wire A, cable 401, wire A, circuit already described, wire 510, front *rm*2, *rc*2 and *rd*2, relay *eua*, battery;

(2) Circuit already described, back *a*13, front *aj*2, back *ah*4, front *am*3, wire C, cable 401, wire C, circuit already described, wire 514, front *rm*4, *rc*4 and *rd*4, relay *euc*, battery;

(3) Circuit already known, front *am*4, wire D, cable 401, wire D, circuit already described, wire 516, front *rm*5, *rc*5 and *rd*5, relay *eud*, battery. Relays *eua, euc* and *eud* energize.

Over their front *eua*1, *euc*3 and *eud*4 these relays prepare a holding circuit for themselves across the left-hand winding of relay *ru* to the general ground of the register.

Slow relay *ae* ends by releasing and allows relay *ru* to energize, while causing relays *ai, ak, aj* and *am* to release.

The energization of relay *ru* characterizes the registration of the units digit in the register and consequently indicates that the digits dialed by the calling subscriber, or, stated otherwise, the characters P, Q, M, C, D and U, have all been properly registered.

Relay *ru* completes a holding circuit for itself over its front *ru*1. Over its front *ru*2 it short-circuits its left-hand winding and grounds relays *eua, euc, eud* directly. Over its front *ru*3 it completes the following circuit: generator Ge2, front *ru*3 and *rp*7, wire 400, condenser Cd40, back *ad*1, middle winding of relay *aa*, ground. The waiting tone, sent by generator Ge2, passes by induction into the right- and left-hand windings of relay *aa* and is sent to the subscriber over a circuit already described. This signal tells the subscriber that the number he dialed has been registered. Over its front *ru*4 (Fig. 4) relay *ru* opens the energizing circuit of receiving relays *ag* to *am*.

The following table shows the receiving relays that energize for each of the 10 dial pulses that receiver RE can receive, as also the coding wires that are used to energize the relays registering the various characters (P, Q, M, C, D, U) of the call number in the register.

| Pulses | Receiving Relays Energized | Coding Wires Used |
|---|---|---|
| 1 | *ag—ai— ah* | A |
| 2 | *ai—ak— aj* | B |
| 3 | *ag— ak—ah—aj* | A—B |
| 4 | *ak— al* | C |
| 5 | *ag—ai—ak—ah— al* | A C |
| 6 | *ai— aj—al—am* | A D |
| 7 | *ag ah—aj—al—am* | B D |
| 8 | *am* | A B D |
| 9 | *ag—ai— ah— am* | C D |
| 10 | *ai—ak— aj— am* | A C D |

Figure 8:
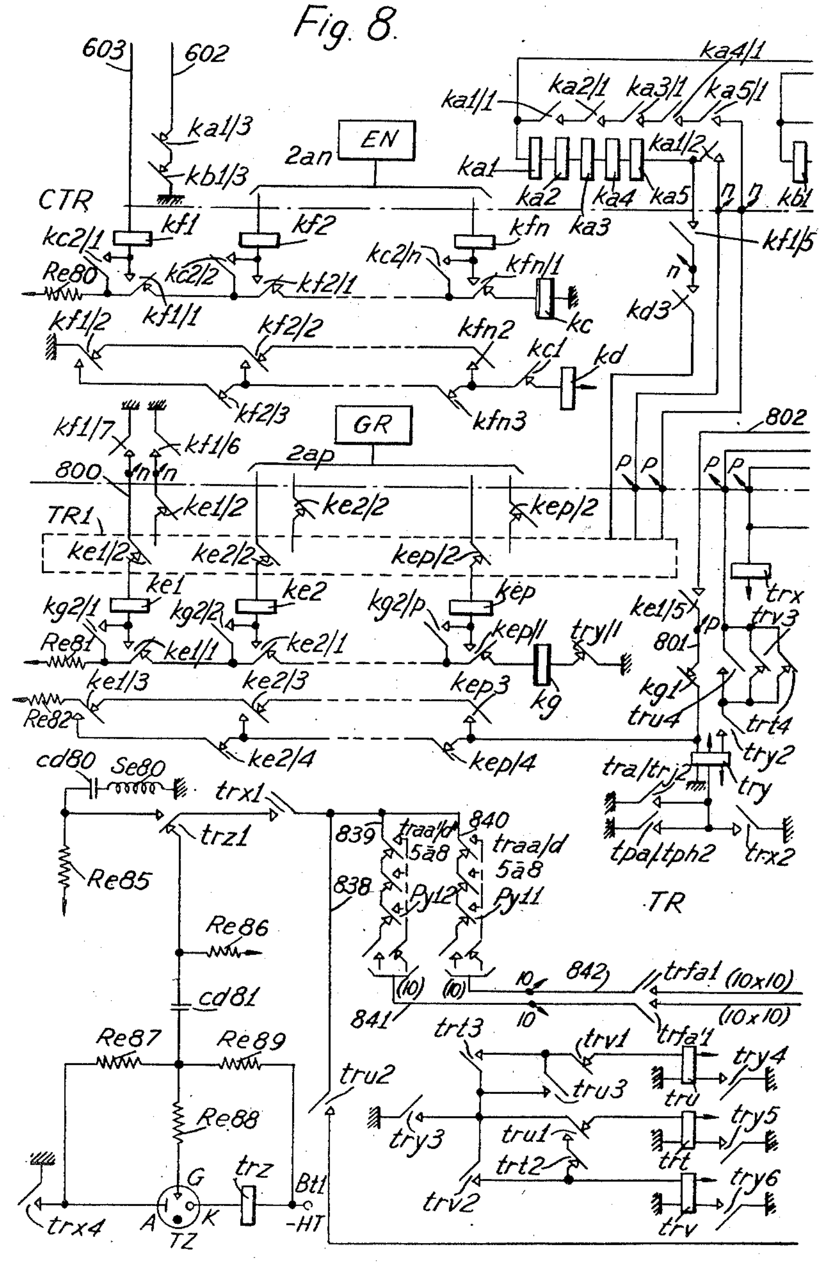
Figs. 8 through 9 show the schematic of a translator.
Figure 8A:
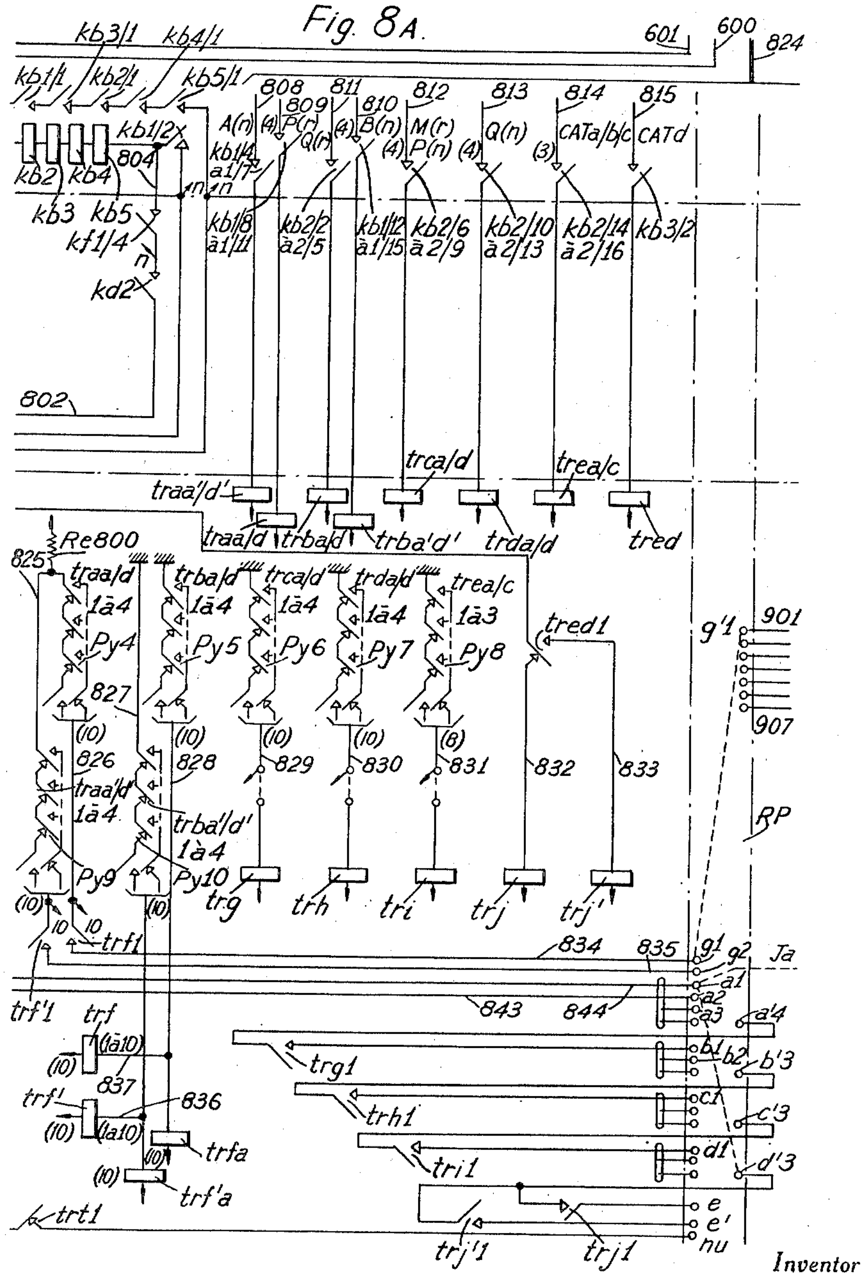
Figure 9:
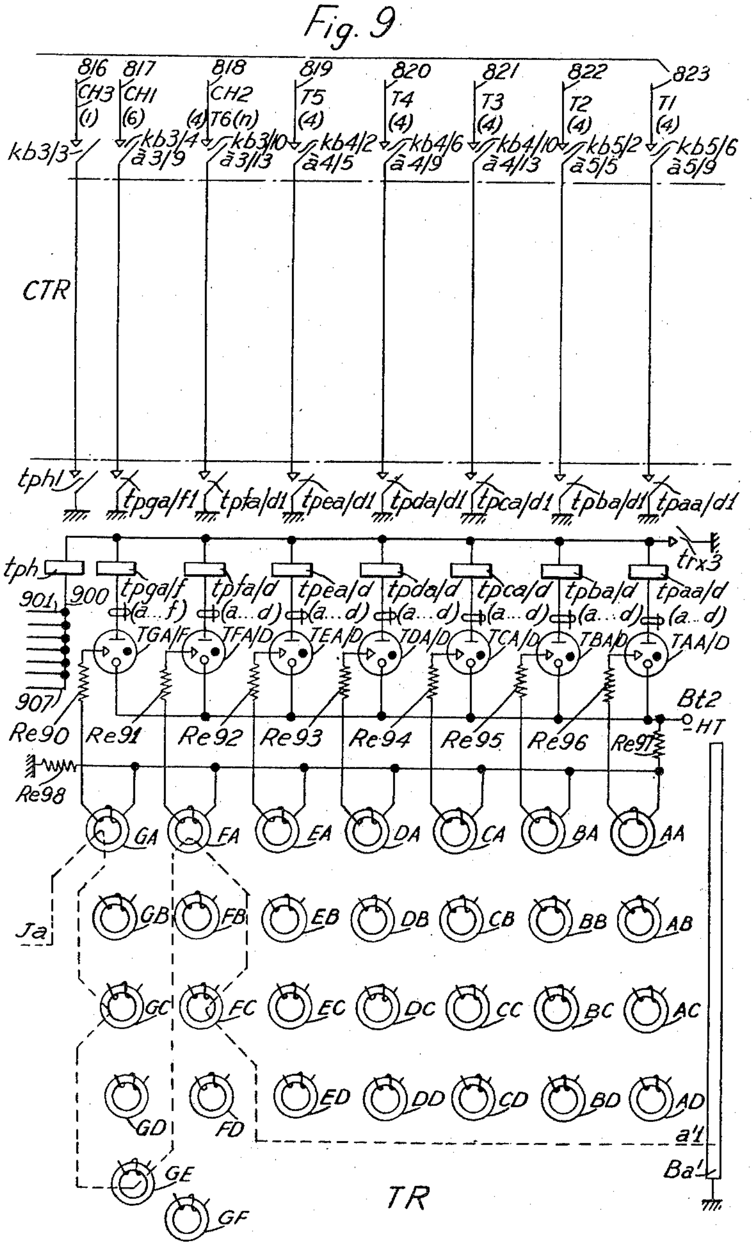

It has already been pointed out that relay *rf* was energized at the end of the reception of the prefix PQ. This relay is going to determine the seizure of a translator TR by regional register ENR through translator-connector CTR (Fig. 8).

The operations that will end in the seizure of a translator will now be described.

Translator-connector CTR is shown schematically in Fig. 12 to describe the general method of connecting registers to translators.

Registers EN are divided up into *p* groups GR1 . . . GR*p* each comprising *n* registers EN1 . . . EN*n*.

Each group GR is associated with a set of group relays KF. There are thus *p* sets of group relays KF1 . . . KF*p* each comprising *n* relays, each of these relays being associated with the register of the group involved.

Each of the two translators TR1 and TR2 considered in the present description is associated with a set of relays KE1, KE2, each set of relays KE comprising *p* relays corresponding to the *p* groups. It follows that each translator has access to any register of a group through the medium of one of the *p* relays of a set KE. Each call incoming into the connector is characterized by a register of a predetermined rank in a predetermined group.

The function of relay sets KF is therefore to discriminate the calling register, that is, the rank of said register, in any group and to bring it into calling position in the two relay sets KE. These two sets then discriminate in turn the group to which the calling register belongs.

Sets KE comprise priority devices that alternately give priority to one of the two groups. The relay group KE thus chosen determines the translator that is going to route the call.

The translator having been seized, the connection between it and the calling register is made through connecting relays KB and KA.

Assuming all the registers of all the groups are brought into calling position simultaneously, the sets of group relays KF, also comprising priority devices, will discriminate in each of groups GR1 . . . GR*p* a register of a predetermined rank.

These *p* registers will then, as has been previously explained, be brought into calling position in both translators through the two sets KE.

The alternate priority device available for the two sets of relays KE will make it possible to choose two different registers from among the *p* registers that are brought into calling position and will thus allow the simultaneous routing of two calls by means of the two translators that have been provided, the two relays *ke* of the same rank of the sets mutually cutting themselves off.

In the example described there are two translators serving a certain number of registers divided up into groups.

It will now be assumed that the register involved belongs to the first group and that it alone is brought into calling position in the translator connector.

Relay *rf* completes the following circuit over its front *rf*1: battery, resistance Re80, front *kc*2/1, relay *kf*1 corresponding to the first register of the first group, wire 603, front *rf*1 (Fig. 6), wire 602, back *ka*1/3 and *kb*1/3, ground. As has been explained, relay *kc* of the translator connector is energized when no register is engaged with a translator, an assumption that has been made for the present description; relay *kf*1 therefore energizes and by its energization characterizes the register seized in the group involved.

Over its front *kf*1/1 relay *kf*1 opens the energizing circuit of relay *kc*, which releases slowly to allow relay *kf*1 to energize fully. Over its front *kf*1/1 it completes a holding circuit for itself. Over its front *kf*1/2 it completes the following circuit: ground, front *kf*1/2, chain of back contacts *kf*2/3 . . . *kfn*/3 of the other *kf* relays of the first-group registers, back *kc*1, relay *kd*, battery. Relay *kd* energizes when slow relay *kc* returns to normal. Relay *kd* upon energizing controls the energization of relay *kf*1 and its front contacts *kd*2 and *kd*3 associated with front contacts *kf*1/4 and *kf*1/5 of relay *kf*1 prepare the energizing circuits of the relays connecting regional register ENR to translator TR.

As has already been pointed out, there are two translators TR1 and TR2 capable of being associated with the register seized.

Over its front *kf*1/6 and *kf*1/7 the magnet *kf*1 energized brings the register ENR involved into calling position in both translators.

Each translator comprises as many relays *ke* as there are register groups and these relays are so arranged that the holding of any one of them prevents the holding of the others.

As has already been pointed out, relay *kg* is energized if none of the *ke* relays is energized. Over its front *kg*2/1 relay *kg* then completes the following circuit: ground, front *kf*1/7, wire 800, back *ke*1/2 in translator No. 1, relay *ke*1, front *kg*2/1, resistance Re81, battery. Magnet *ke*1 of the first group of registers energizes.

Note the presence of the multiplying arrow bearing the index *n* on wire 800 to indicate that identical circuits would exist for the *n* registers of a group if these *n* registers were brought into calling position.

Note also that the energizing circuit of the relay *ke*1 involved passes through a contact of the same rank located in translator No. 1. An identical circuit is further completed in this first translator from front *kf*1/6 of the *kf*1 relay energized.

The rank 1 chain of back contacts of the *ke* relays, a chain that, when all these relays are in home position, allows the energization of the corresponding *kg* relay in each of the translators, is connected up in inverse fashion in each of said translators. In translator No. 2, for example, relay *ke*1 is located the nearest to the energizing battery, while in translator No. 1 this first relay *ke*1 is located the farthest from the energizing battery. This arrangement allows inverting in each translator the priority of choice of each group of sets such as ENR.

In the present description it has been assumed that only the first set ENR of the first group was brought into calling position, this having led to the energization of relay *kf*1 in translator connector CTR. It will now be assumed that the *ke*1 relay corresponding to this first group energizes in translator No. 2.

It will be noted in this connection that both translators TRE and TR2 are absolutely identical and that similar operations develop. The *ke* relays belonging to the same group in each translator are so connected up that one of the *ke* relays of the same rank in each translator operates faster than the other, the relay energizing allowing the translator with which it is associated to route the call and releasing the other translator to enable it to route another call if one is received.

Over its back *ke*1/1 relay *ke*1 opens the energizing circuit of relay *kg*, which, being slow, releases slowly to allow relay *ke*1 to energize fully; over its front *ke*1/1 it completes a holding circuit for itself. Over its back *ke*1/2 relay *ke*1 opens the energizing circuit of the *ke*1 relay of the first translator. Over its front *ke*1/3 it completes the following circuit: battery, resistance Re82, front *ke*1/3, back *ke*2/4 . . . *kep*/4, left-hand winding of relay *try*, ground. Relay *try* energizes.

Relay *kg* ends by homing. Over its back *kg*1 associated with front *ke*1/5 of the *ke* relay energized, relay *kg* completes the following circuit: battery, resistance Re82, front *ke*1/3, back *ke*2/4 . . . *kep*/4 and *kg*1, wire 801, front *ke*1/5, wire 802, front *kd*2, front *kf*1/4, wire 804, relays *kb*5 to *kb*1, wire 600, front *rf*3, ground. Connecting relays *kb*1 to *kb*5 energize.

It will be noted, in the circuit just described, that wire 801 is connected to *p* contacts *ke*1/5 corresponding respectively to the *p* groups of existing registers. There are hence *p* wires 802 connected respectively to the *p* contacts *kd*2 and each corresponding to a group of registers.

Each contact *kd*2 associated with a group of registers is multipled to the *n* contacts *kf*1/4 associated with the various registers in the group. At the outlet of these contacts there are $p \times n$ wires 804 terminating at the *kb* relays. There would be a similar circuit for translator No. 1.

It follows from the preceding explanation that there are 5 relays *kb*1 . . . *kb*5 for each register. This arrangement has been adopted in order to have a sufficient number of contacts.

By energizing, relay *try* shows that translator TR has selected the group of sets ENR comprising the particular register ER to be served.

Over its back *try*1 relay *try* maintains the energizing circuit of relay *kg* open until full release. Over its front *try*2 it completes the following holding circuit for itself: battery, right-hand winding of relay *try*, front *try*2, back *trv*3 and *trt*4 in parallel, front *kb*1/2 of relay *kb*1 energized and ground by contact *rf*2 over a circuit already described. This circuit is also a holding circuit for relays *kb*1 to *kb*5.

Over their front *kb*1/1 to *kb*5/1 relays *kb*1 to *kb*5 cause the energization of relay *trx* of the translator over the ground of front *rf*3 in register ER, as also of relay *trj* over back *tred*1. Over its back *kb*1/3 relay *kb*1 opens the energizing circuit of relay *kf*1, which releases. Over their front *kb*1/5 . . ., relays *kb*1 to 5 complete all the circuits that allow sending the service indications and codes from the translator to the register.

By energizing, relay *trx* shows the seizure of the translator by the register. Over its front *trx*2 relay *trx* completes a holding circuit for relay *try* over the latter's middle winding.

By energizing, relay *trj* shows that there is no re-routing and that the lines that are going to be tested to effect the group selection are direct lines.

Upon releasing, relay *kf*1 again completes over its back *kf*1/1 the energizing circuit of relay *kc*, which energizes. Over its front *kf*1/2 it opens the energizing circuit of relay *kd*, which releases. Over its front *kf*1/7 it opens the holding circuit of relay *ke*1, which releases in turn.

Relays *ke*1, *kd* and *kf*1 are thus restored to normal. Over their front *ke*1/5, *kd*2 and *kf*1/4 they open the energizing circuit of connecting relays *kb*1. These latter hold as has already been pointed out.

Thus, all the relays that have enabled the register seized to select a translator are restored to their initial condition, except relay *kg*, whose circuit is opened at *try*1. It will not be possible for this translator to be seized to handle another call, contacts *kg*2 of relay *kg* being open. The translator is then ready to receive the class indications, as also the prefix PQ, which are registered in register ER in the manner previously described.

It will be assumed in what follows that the prefix PQ suffices to determine the routing of the call up to the called subscriber's local exchange or his group.

Translator TR comprises relays charged with receiving the class indications and the prefix. While it has been assumed that a local call was involved, it will be noted that the translator comprises similar relays to receive indications coming from national register ENN or indications resulting from special cases. The contacts of these relays are arranged in pyramids and so set up that, in the example under consideration, it is possible to obtain 100 points corresponding to 100 prefixes arranged in distributor RP. The function of the translator is then to send preliminary codes and service indications to the register in order to enable it to route the call. To that end the translator comprises a certain number of coils across which can be made to pass a wire one of whose ends in connected to a contact of distributor RP and the other connected to a contact of a clip Ba'. With each toroidal coil such as GA is associated a cold-cathode tube such as TGA and a relay such as *tpga* for example. A pulse passing over the wire induces a certain current in the coils across which it passes. This current fires the associated cold-cathode tube and allows the energization of relays themselves associated with the tubes.

These operations constitute the translation. The indications thus translated are then reforwarded to the register.

As already pointed out, the translator will receive the class indications registered by the two relays *eea* and *eeb* of register ER.

The following circuits are completed over the contacts of relays *kb* of translator connector CTR:

(1) Ground (Fig. 4), front *ac*5, wire 404, front *eea*1 of relay *eea* energized, wire *a* in cable 814, cable 824, cable 814 (Fig. 8), front *kb*2/14, relay *trea*, battery;

(2) Circuit already described, front *eeb*2 of relay *eeb*, wire *b′* in cable 814, cable 824, cable 814 (Fig. 8), front *kb*2/15, relay *treb*, battery. Relays *trea* and *treb* energize.

The contacts of relays *trea* to *trec* receiving the class indications form a pyramid Py8 having one incoming wire grounded and 8 outgoing wires 831 terminating at 8 relays *tri*. These 8 relays *tri* correspond to the 8 class indications that can be received over the *c* wire of the register finder as previously indicated. The *tri* relay corresponding to the class indication received energizes.

According to a method similar to the one described for the class indications, circuits are completed from the relays *epa*, *epd* and *eqb* that have received the letters P and Q and cause the energization of relays *traa*, *trad* and *trbb* of the translator.

Contacts *trba*/*d*1 to 4 of relays *trba*/*d* are grouped into a pyramid Py5 having 1 incoming wire and 10 outgoing wires 828 respectively connected to 10 relays *trfa*. Likewise, contacts *traa*/*d*5 to 8 of relays *traa*/*d* are grouped into a pyramid Py11 having 1 incoming wire 840 and 10 outgoing wires 842 connected to 10 front contacts *trfa*1 respectively belonging to the 10 relays *trfa*. At the outlet of these 10 contacts are thus obtained 100 wires 844, which are connected to 100 points of distributor RP. These 100 points correspond to the 100 regional prefixes PQ it is possible to form. Wires crossing, as stated, tores such as GC, GD . . . and terminating at points of strip B*a′* grounded can lead out from these points.

The *trfa* relay corresponding to the character Q registered and decoded in pyramid Py5 energizes and closes its front *trfa*1.

It will be assumed that the routing of the call does not depend upon the calling subscriber's class. It suffices then to translate the two digits P and Q. The translator answers by sending the service indication "No code sent—Called exchange of the same type as the one involved." From point *a*1 of distributor RP a wire is run across tores GA, GC, GE, FA and FC, which terminates at point *a′*1 of strip B*a′*.

To pass a pulse to this wire there is a discharge device consisting of a cold-cathode tube TZ associated with a relay *trz*. This device will allow condenser C*d*80, charged across self-induction coil S*e*80 and resistance R*e*85, to discharge over wires 842, 844.

Cold-cathode tube TZ comprises an anode A, a control electrode G and a cathode K connected to a relay *trz*. Resistances R*e*87, R*e*88 and R*e*89 and condenser C*d*81 constitute a network that allows timing the discharge.

Upon energizing, relay *trx* completes the following circuit over its front *trx*1: battery, resistance R*e*86, back *trz*1, front *trx*1, wire 840, pyramid Py11, wire 842, front *trfa*1, terminal *a*1 of RP, wire J*a* across tores GA, GC, GE, FA and FC, terminal *a′*1 of strip B*a′*, ground. A current is produced by induction in the secondary windings of the coils that tends to bring the building-up potential close to the potential of the control electrodes of tubes TGA, TGC, TGE, TFA and TFC, respectively associated with the coils involved. Over its front *trx*4 relay *trx* places the control electrode of tube TZ at a potential approaching ground potential and grounds anode A. Tube TZ becomes conductive and the following circuit is completed: ground, front *trx*4, anode A, cathode K of tube TZ, relay *trz*, battery B*t*1. Relay *trz* energizes.

Over its front *trz*1 relay *trz* branches condenser C*d*80 off the circuit previously described and crossing the tores, the condenser discharging. The pulse thus produced causes in the various coils involved an induction electromotive force that makes the associated tubes conductive. The relays *tpga* . . . *tpfc* associated with the various tubes energize over circuits looped to battery B*t*2 and to the ground provided by front *trx*3.

As has already been explained, in this translator (Fig. 9) a cold-cathode tube TGA is associated with each coil GA. A relay *tpga* is associated with each tube.

As has already been pointed out, the function of the translator is to provide the register with which it is associated with means that will enable it to route the call in progress.

This means is translated, in the register, into the energization of relays in combinations that will allow the routing of calls in the following cases.

| Preliminary Codes | Relays Energized | Untranslated Digits | Relays Energized |
|---|---|---|---|
| For the National | *eo*+*er*+*es* | 6 digits resent | ---------- |
| 5 | ---------- | 5 digits resent | *ev* |
| 4 | *eo* | 4 digits resent | *ex* |
| 3 | *er* | 0 digits resent | *ev*+*ex* |
| 2 | *eo*+*er* | ---------- | ---------- |
| 1 | *es* | ---------- | ---------- |
| 0 | *eo*+*es* | ---------- | ---------- |

Relays *ev* and *ey* energize when the terminating exchange is of the same type as the originating exchange.

When the supply bridge is eliminated, relay *et* is energized; when the ringer is eliminated, relay *ez* is energized.

The register sends the translator the prefix dialed and the calling subscriber's class and if need be the re-routing indication.

Once it has received these indications, the translator in the present case must determine:

(1) If the prefix is incomplete, the operation to be effected in order to seize a translator again when said prefix has been completed;

(2) The number of digits and of codes to be sent by the register;

(3) The various codes;

(4) If need be, the order in which the codes and the digits should be sent.

To that end the translator comprises a whole series of relays, relays *tpga* . . . *tpad*, to each of which corresponds a particular relay in the register.

Depending upon the case, one or more relays *tbga* . . . are energized, which by their energization causes the energization of the corresponding relays in the register associated with the translator, thus allowing the routing of the call to its destination.

Relays *tpga*, *tpgc*, *tpge*, *tpfa* and *tpfc* energize in the present description. These relays complete the following circuits:

(1) Ground, front *tpga*1 and *kb*3/4, cables 817, 824, wires 817*a*, relay *ev*, battery;

(2) Circuit similar to the one described over front *tpgc*1 and *kb*3/6, wire C (Fig. 6), relay *ey*, battery;

(3) Ground, front *tpge*1 and *kb*3/8, cables 817, cable 824, cable 817, wire *e*, wire 706, cable 712, wire 706 (Fig. 7), left-hand winding of relay *so*, battery;

(4) Ground, front *tpfa*1 and *kb*3/10, cables 818, 824 and 818 (Fig. 6) wire *a*, relay *eo*, battery;

(5) Ground, front *tpfc*1 and *kb*3/12, cables 818, 824, 818 (Fig. 6), wire *c*, relay *es*, battery;

Sender relays *so* and relays *ev*, *ey*, *eo* and *es* of the register energize and will cause in said register the digit sending operations.

Relay *so* of the sender energizes; this is the starting relay. Over its front *so*2 it completes the following circuit: ground, front *ac*4 (Fig. 4), wire 408, front *so*2, back *sj*2, *sf*2 and *sh*2, left-hand winding of relay *sl*, battery. Relay *sl* having its right-hand winding short-circuited at *sl*2, it energizes slowly. Over its front *so*4 relay *so* applies to ground of contact *ac*4 to reversing contact *ps*2, causing the starting of the exploration chain. Over its front *so*6 relay *so* completes a holding circuit for itself to the ground over *ac*4. Over its back *so*1 it opens the energizing circuit of relay *rf*, which releases its energizing circuit being open.

Upon releasing, relay *rf* opens its front *rf*2, *rf*3, which cause the release of the translator. In effect, over its front *rf*2 it opens the holding circuit of relays *kb*1 . . . 5, which release. It also opens the energizing circuit of relays *trx*, *trj*, which release in turn.

Upon releasing, relays *kb*1 to *kb*5 open their front contacts, making breaks in the energizing circuits of relays *traa/d*, *trba/d*, which release. These latter bring about the release of relay *trfa*.

Upon releasing, relay *trx* makes a break in the energizing circuit of the relays sending the preliminary codes and the service indications. Relays *tpga*, *tpgc*, *tpge*, *tpfa* and *tpfc* return to normal.

All the translator's relays having homed, relay *try*, which had held, releases in turn.

Upon releasing, relay *try* closes its back *try*1, which again completes the energizing circuit of relay *kg*, which energizes, thus being restored to its initial condition.

Translator TR is released and is ready to receive a new call.

Relay *ev* by energizing indicates that a local call is involved. Over its front *ev*4 it completes a holding circuit for itself to the general holding ground of contact *ac*4.

Upon energizing, relay *ey* will cause the operations that will end in the selection of the called subscriber's group.

Over its back *ey*1 and *ey*2 relay *ey* isolates relays *eqb* and *eqc* from wires B1 and C1. Over its back *ey*3 it isolates relay *ecd* from wire D1. Over its back *ey*4 it isolates relay *eqc* from wire A1 and over its front *ey*4 it prepares the grounding of wire A1 from the reading of the code by relay *pq*. Over its back *ey*5 it isolates relay *eqd* and over its front *ey*5 it prepares the reading of the condition of relay *ecd* by relay *pq*. Over its front *ey*8 it completes a holding circuit for itself to the ground of contact *ac*4.

Upon energizing, relay *eo* inverts incoming wires 605 and 606 of the exploration chain over its front *eo*2 and *eo*3. Over its front *eo*6, it prepares the energizing circuit of relay *pp* to allow the exploration of the first digit registered. Over its front *eo*7 it completes a holding circuit for itself.

Figure 4:
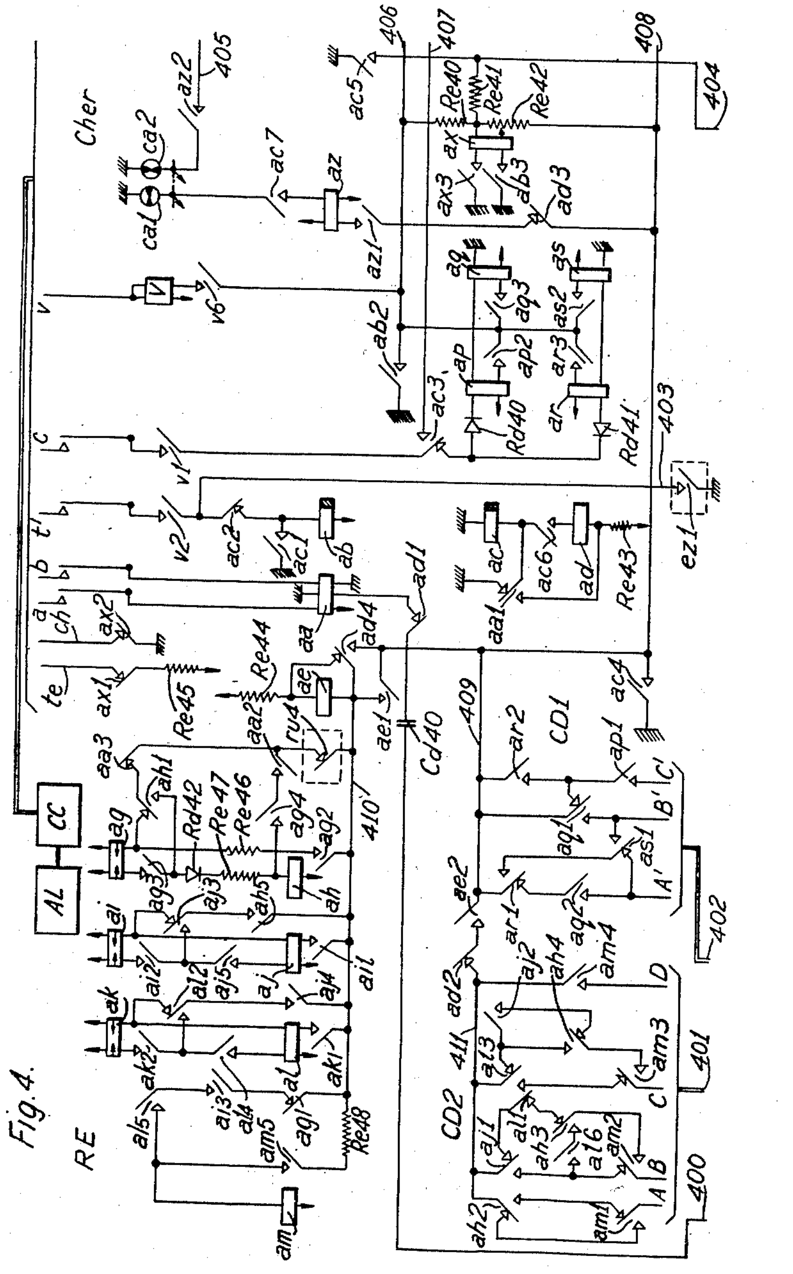
Figs. 4 through 7 show the schematic of a main register.
Figure 5:
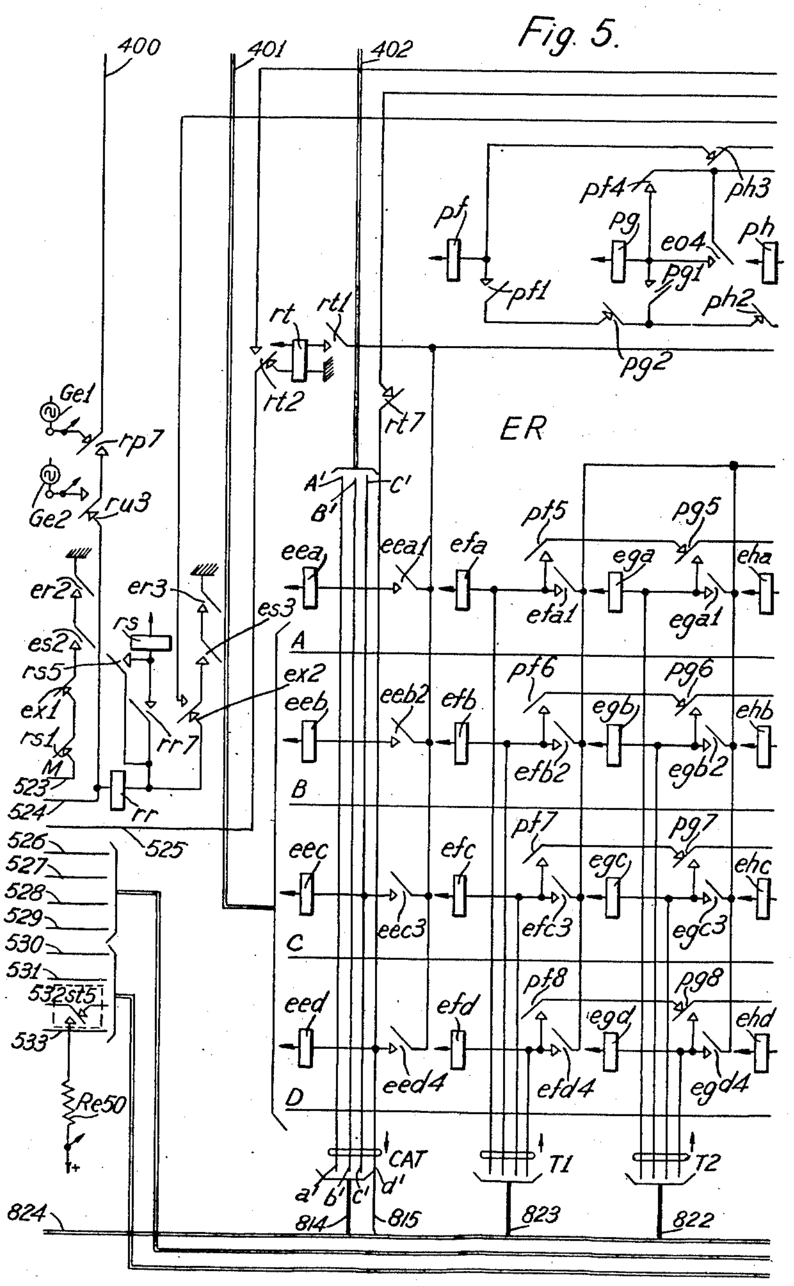
Figure 5A:
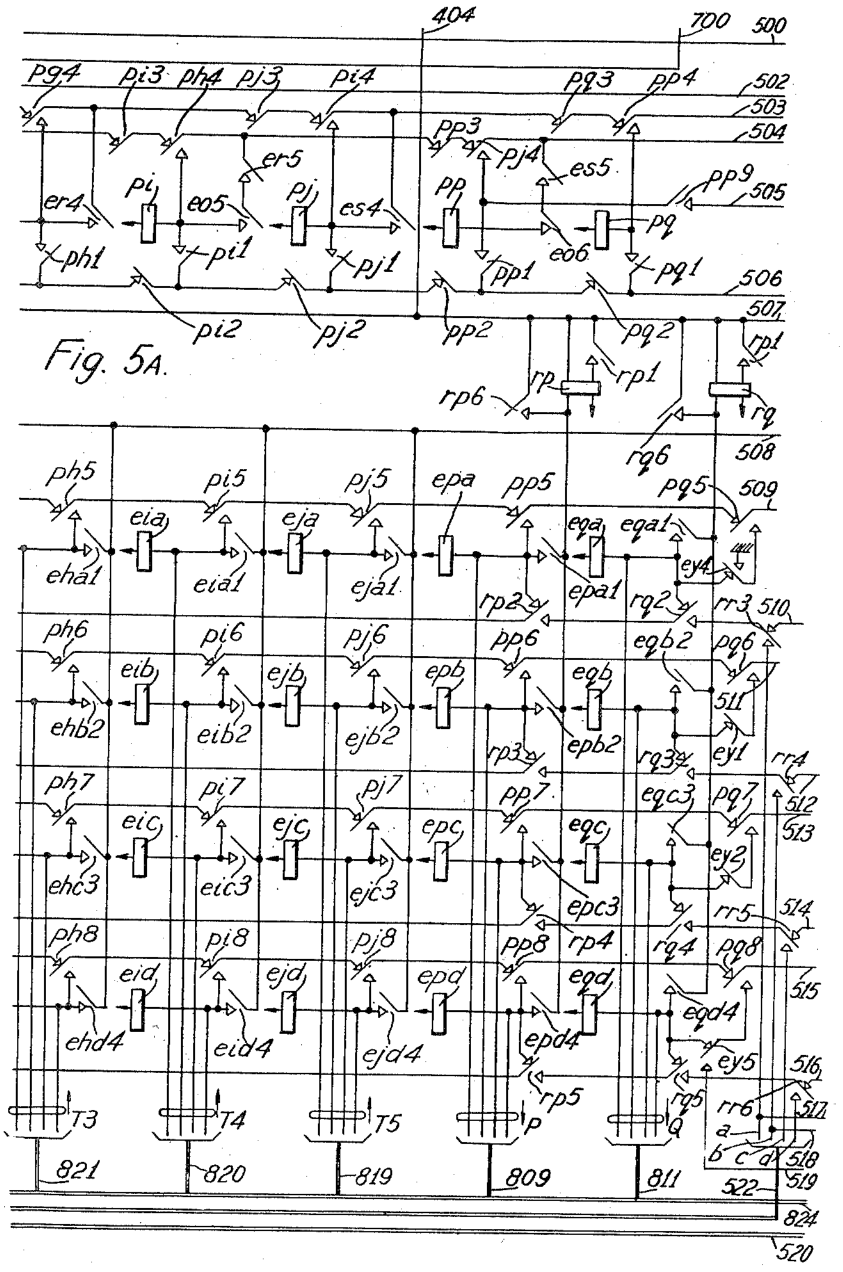

By energizing, relay *es* indicates in combination with relay *eo* that no preliminary code is resent in the example described. Over front *es*5 relay *es* completes the following circuit: battery, relay *pp*, front *eo*6 and *es*5, wire 504, back *pm*3, *pq*4, *pd*3, *pc*4, *pu*4 and *po*2, front *eo*2, back *ps*2, *rs*3 and ground by *ac*4 (Fig. 4). Relay *pp* energizes.

Upon energizing, relay *pp* has completed a holding circuit over its front *pp*1 to the ground on contact *ac*4. Over its front *pp*4, it prepares the energizing circuit of relay *pq*. Over its front *pp*9 it completes the following circuit in parallel with its own energizing circuit: circuit already described, front *pp*9, wire 505, back *ex*3, front *ev*2, relay *po* energized, battery.

Upon energizing, relay *po* completes a holding circuit for itself over its front *po*3. Over its contacts *po*1 and *po*2 associated with contacts *eo*2 and *eo*3 it again reverses the position of wires 605 and 606. Owing to this it allows the energization of relay *pq* over the following circuit: ground . . . back *rs*3, *ps*2, front *eo*2, *po*1, wire 605, back *pd*4, *pu*3, *pm*4, *pc*3, wire 503, front *pp*4, relay *pq*, battery. Relay *pq* energizes.

Upon energizing, relay *pq* opens over its back *pq*2 the holding circuit of relay *pp*, which releases. Over its front *pq*1 it completes a holding circuit for itself. Over its front *pq*4 it prepares the energizing circuit of the relay *pm* used for reading the thousands digit. Over its front *pq*5 associated with front *ey*4 it grounds wire A1 of code relay *sa* of the sender. Over its front *pq*8 associated with front *ey*5 relay *pq* will allow obtaining information on the condition of relay *ecd*.

Relay *sl*, slowed by the short-circuiting of its right-hand winding, ends by energizing. This relay releases in the sender the operations indicating that the register is ready to send the codes required for the group selection.

As previously stated, the 10,000 subscribers connected to the exchange under consideration are divided into groups of 500. It will suffice to take the thousands and the hundreds digits in order to determine the 500-subscriber group comprising the called subscriber. Each 1000-subscriber group comprises in fact two 500-subscriber groups belonging to the first and to the second halves of the thousands. The hundreds digit indicates the particular one out of the possible two 500-subscriber groups to which a subscriber can be connected. Reference to the recapitulatory table of the coding wires A, B, C, D used for the various digits of the call number will show that wire D is grounded only for digits 6, 7, 8, 9 and 0; it is not used for digits 1, 2, 3, 4 and 5.

It will therefore suffice to test the condition of relay *ecd* in order to determine whether the called subscriber belongs to the 500-subscriber group of the first or of the second half of the thousands. Two codes are therefore sufficient in order to determine a group.

To determine a subscriber within a group it will be necessary to send 3 codes; the first is represented by the hundreds digit read over relays *eca*, *ecb* and *ecc*, which allow determining one digit out of 5, this being sufficient because a group comprises only 5 hundreds; the second code is represented by the tens digit and the third by the units digit.

Over its back *sl*2 relay *sl* removes the short circuit of its right-hand winding and over its front *sl*2 it completes a holding circuit for itself. Over its front *sl*4 it grounds wire C towards the feeding bridge over the following circuit: ground (Fig. 7), back *st*6 and *sy*5, front *sl*4, rectifier R*d*73, wire 407, front *ac*3 and *v*1, contact of switch *cher* and wire *c*. This grounding of the *c* wire causes the seizure of the group-selecting stage.

When the group-selecting stage is ready to receive the first selective combination a ground is applied to wire *b'* of switch *cher* and the following circuit is completed: ground on wire *b*, contact of switch *cher*, front *v*5, back *sq*5, *sc*2 and *sd*3, rectifier R*d*75, relay *sj*, resistance R*e*76, battery. Relay *sj* energizes.

Relay *sj* prepares a holding circuit for itself over its front *sj*1. Over its back *sj*2 it opens the circuit of relay *sl*, which releases. Over its front *sj*3 it completes the following circuit: general ground on *ac*4, front *so*2, back *sq*2, *sh*1, *sf*1 and *sl*1, front *sj*3, left-hand winding of relay *se*, battery. Relay *se* energizes.

Relay *se* is a time pulse relay that together with relay *sf* will allow exploring in succession all the indications sent from the translator to the register.

Over its front *se*1 relay *se* short-circuits its right-hand winding, which will make it slow to release. Over its front *se*2 it completes a holding circuit for itself. Over its front *se*3 it completes the following circuit: ground, front *ey*4 and *pq*5, wire 509, back *pm*5, *pc*5, *pd*5 and *pu*5, wire A1, cable 708, wire A1 in the sender, frone *se*3, relay *sa*, battery. Relay *sa* energizes. Over its front *se*7 relay *se* completes the following circuit: ground, front *se*7, upper winding of relay *sf*, battery. Relay *sf* having its lower winding short-circuited, it energizes slowly. Over this same contact *se*7 relay *se* completes the following circuit: ground, front *se*7, wire 709, back *rs*4 and *ps*1, upper winding of differential relay *pr*, battery. Relay *pr* energizes.

As stated, relay *sa* has energized and controls the sending of the first selective combination to the group-selecting stage over the following circuit: ground, generator Ge3, rectifier Rd72, resistance Re73, front *fa*1, back *sb*1 and *sq*4, front *v*4, contact of switch *cher*, wire *a'*. The presence of rectifier Rd72 in this circuit allows only the passage of positive alternations.

Over its front *sa*2 relay *sa* completes the following circuit: ground, front *sa*2, r. h. winding of relay *sg*, battery. Relay *sg* energizes.

As has been explained, the circuit of wire D1 to relay *ecd* not having been completed, the called subscriber is comprised in the 500-subscriber group of the first half of the 1000-subscriber group indicated by the digit M of the call number.

Upon energizing, relay *pr* prepares at *pr*1 a holding circuit for itself, as also an energizing circuit for relay *ps*; at the instant under consideration, the upper winding of said relay *ps* is short-circuited by the ground of contact *se*7 and the general holding ground applied across *pr*1.

Upon energizing, relay *sg*, through its back *sg*1, opens the battery circuit of wires *a'* after the sending of the code, that is to say, when relay *sa* has released to allow the code-receiving relay to return to normal. Over its front *sg*5 it short-circuits its own left-hand winding, this making it slow to release.

Slow-acting relay *sf* ends by energizing. Over its back *sf*1 it opens the energizing and holding circuits of relay *se*, which releases slowly, having its right-hand winding short-circuited. Over its back *sf*2 it opens the re-energizing circuit of relay *sl*.

Slow to release, relay *se* ends by releasing. Over its front *se*1 it removes the short-circuit from its right-hand winding. Over its front *se*3 it opens the energizing circuit of relay *sa*, which releases. Over its front *se*7 it opens the energizing circuit of relay *sf*, which releases slowly, its lower winding being short-circuited. Over this same contact, relay *se* removes the short-circuit from the upper winding of relay *ps*, which energizes over: upper windings in series of relays *pr* and *ps*, front *pr*1, wire 704, cable 712, wire 704, back *sq*1, *sy*1, *st*3, wire 408, front *ac*4, ground.

Upon releasing, relay *sa* isolates over its front *sa*1 the selective-combination sending wire *a'* from generator Ge3. Over its front *sa*2 it opens the energizing circuit of relay *sg*, which, having its left-hand winding short-circuited, is slow to release and hence does not release at the instant under consideration.

Upon energizing, relay *ps*, over its back *ps*1, isolates the upper winding of relay *pr* from the ground of *se*7; this relay *pr* holds over its contact *pr*1 across the upper winding of relay *ps*. Over its front *ps*1, relay *ps* prepares a holding circuit for itself and at the same time prepares the switching in of a second winding of differential relay *pr*. Through the action of its back-front contact *ps*2 relay *ps* shifts the ground of contact *ac*4 from wire 605 to wire 606 over front *eo*3 and *po*2.

The circuit of relay *pm* is then completed: ground at *ac*4 . . . , wire 406, back *pu*4, *pc*4 and *pd*3, front *pq*4, relay *pm*, battery. Relay *pm* energizes and by its energization will allow the exploration of the thousands digit dialed by the subscriber and registered upon relay *emb*.

Over its front *pm*1 relay *pm* completes a holding *a* circuit for itself. Over its back *pm*2 it opens the circuit of the relays located ahead and thus causes the release of relay *pq*. Over its back *pm*3 and *pm*4 it opens the energizing circuits of the relays located ahead. Over its front *pm*4 it prepares the energizing circuit of *pc*. Over its back *pm*5 to *pm*8 it isolates from exploration wires A1 to D1 all the registering relays located ahead of the thousands-digit registering relays. Over its front *pm*6 it prepares the energizing circuit of sender relay *sb*.

Slow-to-release relay *sf* ends by releasing. Over its back *sf*1 it causes anew, over a circuit already described, the energization of relay *se*.

Upon energizing, relay *se* short-circuits its right-hand winding over its front *se*1 and it completes a holding circuit for itself over its front *se*2. Over its front *se*4 it completes the energizing circuit of relay *sb* over front *emb*2 and *pm*6 and wire B1. Over its front *se*7 it completes the energizing circuit of relay *sf*, which, short-circuited, energizes slowly; it also completes over this same front *se*7 the switching in of the lower winding of relay *pr*: ground, front *se*7, wire 709, back *rs*4, front *ps*1 and *pr*2, lower winding of relay *pr*, battery. The fluxes induced in the windings of relay *pr* being equal and of opposite sense, this relay releases. Relay *ps* holds over its lower winding in parallel with the preceding circuit.

Upon energizing, relay *sb* will cause the sending over *a'* of the second selective combination to the group-selecting stage. Over its front *sb*1 relay *sb* completes the following circuit: ground, generator Ge3, resistance Re71, front *sb*1, back *sq*4, front *v*4 and wire *a'* to the group-selecting stage. The second selective combination is thus characterized by the sending of an alternating current. Over its front *sb*2 relay *sb* again completes the energizing circuit of relay *sg*, which has not had time to release.

Upon releasing, relay *pr* opens its front *pr*1 and *pr*2, but relays *ps* holds over its lower winding as already indicated.

Slow-acting relay *sf* ends by energizing, thus causing, as previously pointed out, the slow release of relay *se*.

Relay *se* ends by releasing, causing in a manner similar to the one already described the release of relay *sb* and the release of relay *sf*, but with a certain delay. Likewise, removing over its front *se*7 the holding ground of relay *ps*, relay *se* causes it to release.

Upon releasing, relay *sb* isolates wire *a'* from generator Ge3 over its front *sb*1, and over *sb*2 it opens the circuit of relay *sg*, which, being made slow to release by the short-circuiting of its left-hand winding, releases only after a certain period of time.

Upon releasing, relays *ps* again prepares over its back *ps*1 the energizing circuit of relay *pr* over its upper winding. Over its back *ps*2, it restores the ground of contact *ac*4 to wire 605, removing it from wire 606.

The group-selecting means having received the two codes that it needs, it opens the circuit of wire *b'*, causing relay *sj* to release.

Over its back *sj*2 relay *sj* prepares the energizing circuit of relay *sl*. Over its front *sj*3 it prevents the re-energizing of relay *se* until the reception of a new invitation-to-send signal. Slow to release, relay *sf* ends by releasing.

Over its front *sf*1 relay *sf* prepares the energizing circuit of relay *se*. Over its back *sf*2 it completes the energizing circuit of relay *sl*, which energizes slowly, having its right-hand winding short-circuited.

Likewise, relay *sg*, slow to release, ends by homing, opening over its front *sg*5 the short-circuit of its left-hand winding.

The group-selecting means proceeds to hunt for the 500-subscriber group comprising the called subscriber then passes into calling position in the first stage of the line-selecting means.

Relay *sl*, slow to operate, ends by energizing. Over its back *sl*2 it opens the short-circuit of its right-hand winding and over its front *sl*2 it completes a holding circuit for itself. Over its front *sl*4 relay *sl* grounds the *c* wire of the feeding bridge over a circuit already described, in order to cause the seizure of the line-selecting stage.

When the line-selecting stage is ready to receive the selective combinations, a ground is applied to the *b'* wire of switch *cher*, thus completing the already-described circuit of relay *sj*, which energizes.

Relay *sj* upon operating causes according to a method already described the sending of the hundreds digit. Relay *pc* pulls up when relays *pr* and *ps* are energized and proceeds to explore relays *eca* . . . *ecd* owing to the position of front contacts *pc*5 to *pc*8.

In the example described, the hundreds digit being a 5 relays *eca, ecc* are energized and cause relays *sa, sc* to energize. The code sent consists in the sending of a positive pulsating current to wires *a′*, *b′*.

The tens digit is thereupon sent according to the same method; relays *sb* and *sd* energize and send a code consisting of an alternating current to the *a′* wire and a negative pulsating current to the *b′* wire.

The units digit is thereupon sent according to the same method; relays *sa, sc* and *sd* energize and send a code consisting of a positive pulsating current to the *a′* wire and alternating current to the *b′* wire.

According to the same method as for the sending of the first two codes, a suitable time lag has been provided between the sending of the last three codes by the set of slow relays *se* and *sf*.

After the operation of inverting contact *ps*2, relay *sq* energizes over the following circuit: ground, front *ac*4, wire 408, back *st*3, *sy*1, *sq*1, front *so*4, wire 703, back *rs*3, front *ps*2, *eo*3, *po*2, wire 606, front *pu*4, wire 705, relay *sq*, battery.

Upon energizing, relay *sq* marks the end of the sending of the digits registered. This relay will cause the connection or the sending of the busy signal to the calling subscriber and then the release of the register.

Over its back *sq*1 relay *sq* opens the holding circuit of code-registering relays *ey, ev, sc, eo* and *es*, as also the holding circuit of relays *so, po, pu, pr, ps*. These relays release.

Over its back *sq*2 relay *sq* opens the energizing circuit of relay *se*. Over its back *sq*3 it opens the holding circuit of relay *sm*, which thereupon holds over *sq*4. Over its front *sq*4 it prepares a new holding circuit for relay *sm*. Over its back *sq*5 it opens the energizing circuit of relay *sj*, which releases. Over its front *sq*6 it completes a holding circuit for itself to the general ground across *ac*4.

The receiver of the line-selecting means having registered the hundreds, tens and units digits of the called subscriber's call number, it makes a break in the *b′* wire of finder *cher*. The hunting for the called subscriber is then effected in this line-selecting means.

Relays *sg* and *sf*, slow to release, end by releasing.

Upon releasing, relay *sg* opens at *sg*4 the holding circuit of relay *sm* but it completes another over *sg*2: battery, relay *sm*, back *sg*2, front *sq*4, *v*4, contact of switch *cher*, wire *a′* and ground in the line-selecting means.

It will be assumed that the called subscriber is free. In that case, the line-selecting means connects itself to said subscriber and the ground disappears from the *a′* wire of finder *cher*, causing relay *sm* to release.

Upon releasing, relay *sm* recloses its back *sm*1, which, associated with front *sq*7, short-circuits resistance R*c* and causes in the feeding bridge the energization of the relays that bring about the connection in the feeding bridge to the calling subscriber.

The connection having been made, receiver *aa* releases, having its circuit opened over the *a* and *b* wires in the feeding bridge.

Over its back *aa*1 relay *aa* short-circuits relay *ac*, which releases slowly.

Relay *ac* ends by releasing. Over its front *ac*1 it causes the release of relay *ab*, which homes slowly. Over its front *ac*4 and *ac*5 relay *ac* removes the general holding grounds of the receiver and the register, causing the release of all the relays still energized in the register; relays *eca, ecc, edb, edd, eea, eeb, emb, epa, epd, eqb, eua, euc, eud, rc, rd, rm, rp, rq, ru, sq* release. Register ER is thus fully released.

Register relay *ab* being slow to release, it ends by releasing, opening at its front *ab*2 the holding circuits of the class relays. Relays *ap* and *aq* release. Over its front *ab*3 relay *ab* opens the energizing circuit of relay *ax*. But this relay could hold over register relays that have not released, such as a class relay, over the following circuit: ground, front *ax*3, upper winding of relay *ax*, resistance Re4O, front *as*2, upper winding of relay *as*, battery. The resistance of relay *ax* is such that it does not prevent the release of relay *as*. Relay *ax* therefore controls the homing of the register relays. It releases in turn and restores the continuity of wires *te* and *ch*, thus marking the register available.

Group ENR is thus fully released and ready to route a new call.

The various special cases that can be encountered in the operations involved in the routing of a local call will now be discussed.

It has been assumed in the preceding description that the called subscriber was free. It may happen that this subscriber is busy.

In that case, the receiver of the line-selecting means, having received digits C, D, U, does not cause a break in the *b′* wire but applies battery to it. The following circuit is then completed: battery in the selecting means, wire *b′*, contact of switch *cher*, front *v*5 and *sq*5, lower winding of relay *sp*, ground. Relay *sp*, the busy-tone relay, energizes.

Upon releasing, relay *sp* opens over its back *sp*1 the circuit of the *t* wire, this causing the release of the feeding bridge and of all the selection stages. The busy tone is sent accordingly by a know method by the equipment associated with the calling subscriber's line.

The operations involved in the release of group ENR then proceed as previously described.

It may happen that the calling subscriber is slow in dialing the call subscriber's number or that he will allow a period of time to elapse between two pulse trains that is greater than a predetermined value.

Receiver RE has a timing system comprising two cams C*a*1 and C*a*2. When the register is seized and cam C*a*1 closes its contact the following circuit is completed: ground, cam C*a*1, front *ac*7, right-hand winding of *az*, battery. Relay *az* energizes. This relay holds until the arrival of a pulse train releases it. Otherwise, if no pulse train has been received by the time cam C*a*2 closes its contact, the cam completes the energizing circuit of another relay, which then sends the calling subscriber the busy tone.

The moment the calling subscriber receives the dialing tone, relay *aa* energizes, causing in known manner the energization of relay *ac*. In turn, cam C*a*1 completes, as has been indicated, the energizing circuit of relay *az*, which energizes.

Upon energizing, this relay completes a holding circuit for itself to the ground of contact *ac*4 over its left-hand winding, front *az*1 and back *ad*3. Over its front *az*2, relay *az* prepares the energizing circuit of *sp*.

If the calling subscriber dials the first digit of the called subscriber's number before cam C*a*2 has closed its contact, relay *ad* energizes, as has been explained. Over its back *ad*3 relay *ad* opens the holding circuit of relay *az*, which releases. The operations proceed from this moment onward according to the method previously described.

If the subscriber fails to dial before cam C*a*2 has closed its contact, the ground of C*a*2 completes the following circuit: ground, cam C*a*2, front *az*2, wire 405, upper winding of *sp*, battery. Relay *sp* energizes.

Upon energizing, relay *sp* opens according to a known method the circuit of the *t* wire of the register finder and causes the sending of the busy tone to the calling subscriber. The sending of this tone causes the release of group ENR, as has already been explained. The same operations develop if the calling subscriber, after having dialed one digit of a call number, is slow in dialing the next.

It may also happen that the group-selecting means cannot perform its operations, that is to say, that it cannot find a free outgoing line to the line-selecting means.

There is then available in the sender a timing system comprising two cams *Cb*1 and *Cb*2.

On its first passage, cam *Cb*1 causes the following circuit to be completed: ground, cam *Cb*1, front *so*5, right-hand winding of relay *sz*, battery. This relay energizes.

Over its front *sz*1 relay *sz* completes the following holding circuit for itself: battery, left-hand winding of relay *sz*, front *sz*1, back *sf*3, *sy*3, *sh*3 and ground over front *ac*4. Over its front *sz*2 relay *sz* prepares the energizing circuit of relay *sy*.

Between the passage of cams *Cb*1 and *Cb*2 the holding circuit of relay *sz* has not been opened by back *sf*3, indicating the sending of a code, or by back *sh*3, indicating a stop in the registering of the digits; cam *Cb*2 closes its contact and completes the energizing circuit of relay *sy*: ground, cam *Cb*2, front *sz*2, back *sx*3, relay *sy*, battery. Relay *sy* energizes.

Upon energizing, relay *sy* will cause operations allowing a second selection attempt to be made.

Over its back *sy*1 relay *sy* removes the general holding ground from the code-reigstering relays and the exploration chain of the registering relays, as also from relay *so*, thus causing the re-seizure of the translator by the energization of relay *rf*. Over its back *sy*2 it causes a break in the *c'* wire of finder *cher*, opening the holding circuit of the members of the group- or line-selecting means. Over its back *sy*3 it opens the energizing circuit of relay *sz*, which releases. Over its front *sy*4 it completes the following circuit: battery, relay *sy*, front *sy*4, left-hand winding of relay *sx*, back *sx*2 and general holding ground. Relay *sy* holds an *sx* energizes. Over its back *sy*5 relay *sy* makes a break in the *c* wire to prevent the untimely sending of the metering ground upon the selection attempt.

Upon energizing, relay *sx* completes a holding circuit for itself at *sx*1. Over its back *sx*2 it opens the holding circuit of relay *sy*, which releases, its energizing circuit being opened by back *sx*3. Over its front *sx*3 relay *sx* prepares the energizing circuit of relay *sp*.

If the new selection attempt is not successful when cam *Cb*2 recloses its contact after the energization of relay *sz*, said cam *Cb*2 applies a ground over the following circuit, which is then completed: ground, cam *Cb*2, front *sz*2 and *sx*3, middle winding of relay *sp*, battery. Relay *sp* energizes then and sends the calling subscriber the busy tone.

Identical operations develop if the selection cannot be made normally for any reason whatever.

In the description of the general case, first a description was given of the registering operations and then of those involved in sending the various selective combinations. In fact, these combinations are sent as soon as the selection stages are ready to receive them. It may happen that a selection stage is ready to receive a selective combination before the corresponding digit has been registered.

It has been pointed out that translator TR was seized by the register upon the registration of the digits P and Q of the called subscriber's number. The translator then causes in known manner the sending of the first group-selection code, over front *ey*4 and *ey*5 of the *ey* relay energized.

It may happen that the hundreds digit has not yet been registered when, relay *ey* having been energized, an attempt is made to test the condition of relay *ecd* in order to determine the 500-subscriber group to which the called subscriber belongs. In this case, stopping relay *sh* energizes over the following circuit: ground by *ac*5, wire 507, back *rc*7, front *ey*7 and *pq*9, wire 710, right-hand winding of relay *sh*, battery.

Over its back *sh*1 relay *sh* opens the energizing circuit of time pulse relay *se* to prevent the starting of the exploration chain until the hundreds digit has been registered. Over its back *sh*2 relay *sh* opens the energizing circuit of relay *sl*, which will be unable to pull up until the other necessary digits of the call number have been registered. Over its back *sh*3 it opens the circuit of the left-handing winding of relay *sz* to prevent its holding if the selection is slow in being made.

As already pointed out, if there is a delay in dialing or in the registering of the digits of the call number, cams *Ca*1 and *Ca*2 are the ones that operate.

It is essential to start the sending of the codes to the line-selecting stage once the digits C, D, U have been registered, in order to prevent the holding for too long a time of the common control members of the line-selecting means. As long as the subscriber has not dialed his last digit, back *ru*2 is closed and relay *sh* energizes over front *ey*6 and *pc*9, blocking the sending of the hundreds digit.

It has been assumed in the general description that there was only one calling register, but it has been seen that the two translators under consideration, TR1 and TR2, could be seized by *p* groups of registers each comprising *n* registers.

It will be assumed, by way of example, that the $n \times p$ registers become calling over front *rf*1 of the register (Fig. 6), the *n* registers of the *p* groups becoming calling in the translator connector (Fig. 8). The *n* relays *kf*1 . . . *kf n* energize over identical circuits over the *n* front contacts *kc*2. Only one of these *kf* relays will hold after the release of relay *kc*. The *kf* relay that will hold is the one located nearest the battery, across resistance *Re*80. If this relay is relay *kf*1, it opens over its back *kf*1/1 the energizing circuit of relay *kc*, which releases slowly. When this relay *kc* homes, it opens its contacts *kc*2 and relay *kf*1, which energized, completes a holding circuit for itself over its front *kf*1/1, opening over its back *kf*1/1 the holding circuits of the other *kf* relays, which release. Over its front *kf*1/2, relay *kd* energizes as has already been explained.

The energization of relay *kf*1 indicates that the rank-1 register has been brought into calling position in each of the *p* register groups.

Over front contacts such as *kf*1/6 and *kf*1/7 this register in each register group is simultaneously brought into calling position in the two translators TR1 and TR2.

According to a method similar to the one already described, one and only one relay *ke* will hold in each translator. The contact chains of these relays are so constituted that two different groups of registers will be connected to the translators. Thus, in translator TR2 the relay *ke*1 located the nearest to the energizing battery will hold, while in translator TR1 relay *ke p* will be the one to hold. Moreover, each of these relays makes a break in the energizing circuit of the relay of the same rank located in the other translator.

The system thus described therefore allows the routing of two simultaneous calls. It has also been assumed in the general description that both translators were free.

It follows from the preceding descriptions that, if one of the translators is busy, the calling register will be served by the other translator, the *kg* relay of the busy translator being in home position; no *ke* relay of said translator can then energize.

If both translators are busy, their *kg* relays are in home position and no register can be served, so the calls will be held waiting. As has been indicated, the holding time of the translator being very short, no call will ever be held up too long.

It has been seen that the translator was released as soon as the register relays corresponding to the code-sending relays used in the translator were energized. The starting of the release of the translator is brought about by the release of register relay *rf*, which opens the seizing circuit of the translator over its front *rf*1. It may happen, for any reason, that register relay *rf* will not release. But since the translator must be released in spite of all, there is available in the translator a timing chain comprising three relays *trt, tru, trv*.

The seizure of the translator is characterized by the energization of relay *try*, which marks it busy. Relay *try* completes the following circuit over its front *try*3: ground, *try*3, back *tru*1, upper winding of relay *trt*, battery. Relay *trt* energizes, but slowly, its lower winding being short-circuited by front *try*5. It will be noted in addition that the other timing relays, *tru* and *trv*, have their lower windings short-circuited respectively by front *try*4 and *try*6. The three timing relays are therefore slow to operate and slow to release.

If relay *rf* has not released at the end of a certain period of time, relay *trt* ends by energizing. Over its front *trt*3 it completes the energizing circuit of relay *tru* over back *trv*1. Relay *tru* energizes slowly.

Relay *tru* energizes at the end of a certain period of time. Over its back *tru*1 it opens the energizing circuit of relay *trt*, which releases slowly. Over its front *tru*1 it prepares the energizing circuit of relay *trv*. Over its front *tru*3 relay *tru* completes a holding circuit for itself.

Relay *trt* ends by releasing at the end of a certain period of time. Over its back *trt*2 it completes the energizing circuit of relay *trv*: ground, front *try*3 and *tru*1, back *trt*2, upper winding of relay *try*, battery. Relay *trv* energizes slowly, its lower winding being short-circuited.

When relay *trv* has energized, it opens over its back *trv*1 the energizing and holding circuits of relay *tru*, which releases slowly. Over its front *trv*2 it completes a holding circuit for itself.

When relay *tru* homes, it completes over its back *tru*1 the re-energizing circuit of relay *trt*, which energizes slowly for the second time.

When relay *trt* energizes for the second time, relay *tru* is in home position and relay *trv* holds. If at this moment the translator is not yet released from the register, the combination consisting of back contacts *trt*4, *trv*3 and front contact *tru*4 causes the opening of the holding circuit of translator-connector relays *kb*1 to *kb*5. Relays *kb*1 to *kb*5 then release, causing the homing of the relay *trx* that seizes the translator. Relays *kb* also cause the release of the relays *tra* to *trj* that may still be seized in the translator. Relays *trx* cause the release of the relays *tpga* to *tpad* that might still be energized; relay *try* having its holding circuits open, it releases in turn, causing the energization of relay *kg* over its back *tryl*, thus restoring all the translator relays to their initial condition.

The translator is thus fully released through timing relays *trt, tru* and *trv*, which are quickly restored to their initial condition, relay *try* opening their energizing circuits and removing the short-circuits from their lower windings.

Of course, if register relay *rf* homed before the second energization of translator relay *trt*, the release of said translator would have taken place according to the normal method, relay *try* then releasing and causing the quick release of the relays *trt, tru,* or *trv* still energized.

It may happen that the calling subscriber dials a call number that is not used. In that case, no code and service indication is sent by the translator. The latter is therefore not released by the register according to the known method and its timing relays *trt, tru, trv* energize.

When relay *tru* is energized and *trt* has released, the "unused call numbers" circuit is prepared. From distributor terminal *nu* a wire is led across the tores corresponding to the special service to which it is desired to switch the calling subscriber.

When tube TZ becomes conductive, a discharge is sent into the "unused call numbers" circuit, and the following circuit is completed: ground, self *Se*80, condenser *Cd*80, front *trz*1 and *trx*1, wire 838, front *tru*2, back *trt*1, terminal *nu*, tores . . . , ground.

The release of the translator is thereupon effected according to the method already described.

The case will now be discussed where the calling subscriber A*b* makes a call intended for a special service. It will be assumed to begin with that the special service involved is characterized by two digits, P and Q.

A subscriber removing his handset is connected in known manner to group ENR (Figs. 4, 5, 6, 7) and receives the dialing tone. He therefore dials the special-service call number, which is received by the register and registered according to a known method. As in the preceding case, this call number suffices to determine in the group-selecting means the line assigned to the special service. Only one selection stage is needed, therefore, instead of the two required in the general case previously described.

After the registration of the second digit, the translator is seized according to a known method and sends the two codes required for the group selection and only these two.

From the point of the distributor in the translator where terminates the wire 844 corresponding to the prefix PQ dialed, a wire is led across tores FA, FB, GA, GB and GE, this causing, according to a known method, the energization of the associated relays *tpfa, tpfb, tpga, tpgb* and *tpge* and the energization in the register of relays *eo, er, ev, ex* and *so*.

The energization of relays *eo* and *er* indicates that the translator sends two preliminary codes; and that of relays *ev* and *ex*, that no digit is sent. Relay *so* is the starting relay.

The translator also sends two rodes that are registered on register relays *eia, eja* and that determine the group of lines leading to the special service involved. The energization of *eia, eja* is caused according to a method already described by the energization of the corresponding translator relays *tpda, tpea,* a wire having been led across tores DA and EA.

The register having then received the two codes required for the routing of the call and relay *so* being energized, the sending of the group selection can commence.

This is done according to the method already described for the general case, front *so*2 placing relay *sl* under voltage. Relay *sl* energizes and over its front *sl*4 applies a ground to the *c* wire of finder *cher* in order to bring the feeding bridge into calling position in the group-selecting means. The receiver of this means responds then in known manner by grounding the *b'* wire, thereby causing the energization of relay *sj*.

Relay *sj*, as previously described, causes the starting of the exploration chain by pulse time relays *se, sf* and counting relays *pr* and *ps*.

The relays *eia* and *eja* energized close their front *eia*1 and *eja*1 and hold over the ground of contact *ac*4.

The moment the exploration chain starts to operate, relay *eo* and relays *ex, ev, er* are energized. In the registering chain, relays *eia, eja, epa, eqa,* for example, are energized. The ground of contact *ac*4 completes the following circuit: ground, front *ac*4, wire 408, back *st*3, *sy*1, *sq*1, front *so*4, wire 703, cable 712, wire 703, back *rs*3, *ps*2, front *eo*2, back *po*2, wire 606, back *pu*4, *pc*4, *pd*3, *pq*4, *pm*3, wire 504, back *pj*4, *po*3, front *er*5, *eo*5, relay *pi*, battery. Relay *pi* energizes.

Upon energizing, relay *pi* completes a holding circuit for itself over its front *pi*1 and over its back *pi*2 opens the holding circuit of the relays located ahead. It also completes according to a method already described the energizing circuit of relay *sa* across front *pi*5.

Relay *sa* energizes and sends, in known manner, a positive pulsating current into the receiver of the group-selecting means over wire *a'*.

According to a known method, relay *pi* has prepared the energization of relay *pj* over its front *pi*4, a circuit that is completed when relay *ps* energizes upon the release of *se*.

Relay *pj*, upon energizing, holds over *pj*1, and over *pj*2 opens the holding circuit of relay *pi*, which releases.

Relay *se* having pulled up according to a known method, relay *pj*, through its front *pj*5, completes the energizing circuit of relay *sa*, since it has been assumed that relay *eja* had energized.

Relay *sa* sends the second code required for the group selection.

Over its front *pj*4, the ground of contact *ac*4 completes the following circuit, relay *ps* having homed: ground, front *ac*4, circuit already described, back *ps*2, front *eo*2, back *po*2, circuit already described, wire 504, front *pj*4, relay *pp*, battery. Relay *pp* energizes and over its front *pp*9 completes the following circuit in parallel with the circuit of relay *pp*: circuit already described, front *pp*9, wire 505, front *ex*3, *ev*1, wire 705, relay *sq*, battery. Relay *sq* energizes and causes the release of relay *pp* over its back *sq*1, as also of the other register relays still energized, except the digit-registering relay.

Relay *sq*, upon energizing, indicates that the selection is over.

As from that moment, all the operations leading to the release of the members seized develop according to the method previously described.

It may happen that the special-service number to be reached comprises three digits.

All the dialing operations by the subscriber and all the digit-registering operations in the register develop according to a known method. Also, the translator is seized as soon as the digit Q has been registered.

Digits P and Q, as already indicated, are registered upon translator relays *traa/d* and *trba/d*. The points corresponding to this specific prefix PQ, as also all incomplete prefixes, are combined into one point *g*1, for example, of distributor RP.

In fact, in this case, relays *trba/trbd*, over their contacts *trba/d*1 to *trba/d*4, combined into pyramid Py5, complete the energizing circuits of relays *trf* and *trfa*. These relays energize.

Over its front *trf*1 the *trf* relay energized completes the following circuit: battery, resistance R*e*800, pyramid *py*4 of rank 1 to 4, contacts of relays *traa . . . trad*, wire 826 multipled to 10 contacts *trf*1 in parallel with 10 relays *trf*, wire 834, terminals *g*1 and *g'*1 of distributer RP, wires 901 and 900, relays *tph*, front *trx*3, ground. Relay *tph* energizes.

By its energization, relay *tph* indicates that the translator needs a third digit to be able to route the call.

Over its front *tph*2 relay *tph* completes a holding circuit for translator-busying relay *try*. Over its front *tph*1 it completes the following circuit: ground, front *tph*1, *kb*3/3, wire 816, cable 824, wire 816, back *rg*2, relay *rg*, battery. Register relay *rg* energizes.

By its energization, this relay will allow the re-seizing of a translator after the registration of the third digit.

Upon energizing, relay *rg* completes over its front *rg*1 a holding circuit for itself to the general ground of contact *ac*4. Over its back *rg*2 it opens its initial energizing circuit. Over its back *rg*3 it opens the energizing circuit of relay *rf*, which falls back, and over its front *rg*3 it prepares a new energizing circuit for the same relay *rf*. Over its front *rg*4 relay *rg* prepares the energizing circuit of relay *rh*.

Upon releasing, register relay *rf* causes the release of translator relays *kb*1/5, which bring about, in continuous fashion, the release of said translator; this release also occurs in known manner, the holding of relay *try* by front *tph*2, as also the other holdings of said relay, being intended to bring about the release of relay *try* only in the last position, once all the translator relays have returned to normal.

The third digit (M) dialed by the calling subscriber is registered by the register, which indicates that the registration is effected upon energizing its relay *rm*. This latter prepares the re-energizing circuit of relay *rf* over its front *rm*7.

Register relay *rh* energizes over the following circuit: ground, back *kb*1/3 and *ka*1/3, wire 602, back *rf*1, front *rg*4, upper winding of relay *rh* energized, battery.

Upon energizing, relay *rh* completes for itself, over its front *rh*1, a holding circuit to the general holding ground.

Over its front *rh*2 it completes the following circuit: ground, back *so*1 and *sq*8, wire 711, back *es*1, front *rm*7, *rh*2 and *rg*3, relay *rf*, battery. Relay *rf* re-energizes and causes in translator connector CTR the operations that will lead to the seizure of the translator, according to a known method, and to the sending to said translator of digits P, Q and M.

Digit M is registered in known manner upon all or part of relays *ema . . . emd*. These latter then cause the energization of all or part of relays *trca/trcd* over circuits already described.

One or more relays *trca/trcd* energize. The contacts of these relays are arranged in a pyramid Py6 having 10 outgoing wires 829 terminating at 10 relays *trg* corresponding to the 10 thousands digits that can be used. Across this pyramid, a relay *trg* is energized, corresponding to the digit M dialed by the subscriber.

This relay *trg* upon energizing closes its front *trg*1.

The translator having received all the signals that will allow it to route the call, it causes the various relays corresponding to said call to energize according to the normal method already described. In order to do this, a connection is made from distributor terminal *a*3 to terminal *a'*4 and then to a terminal *b*1 across front *trg*1; from terminal *b*1 a wire is led across the tores corresponding to the relays to be energized.

The rest of the operations and the release of the register are effected according to the method already described.

The various special cases that can be encountered in the routing of a call intended for a special service are the same as those previously described in the case of a local call.

Another special case, however, can be encountered in connection with a call intended for a special service.

It may happen that the supplying of a calling subscriber is done by the seized feeding bridge and that of the special service by its trunk. In that case, the wire corresponding to said service passes through tore FD. This tore corresponds to a gas-discharge tube TFD, which, upon the passage of a discharge, causes translator relay *tpfd* to energize. Relay *tpfd* in turn causes the energization of register relay *et* over wire *d* of cable CH2.

Figure 6:
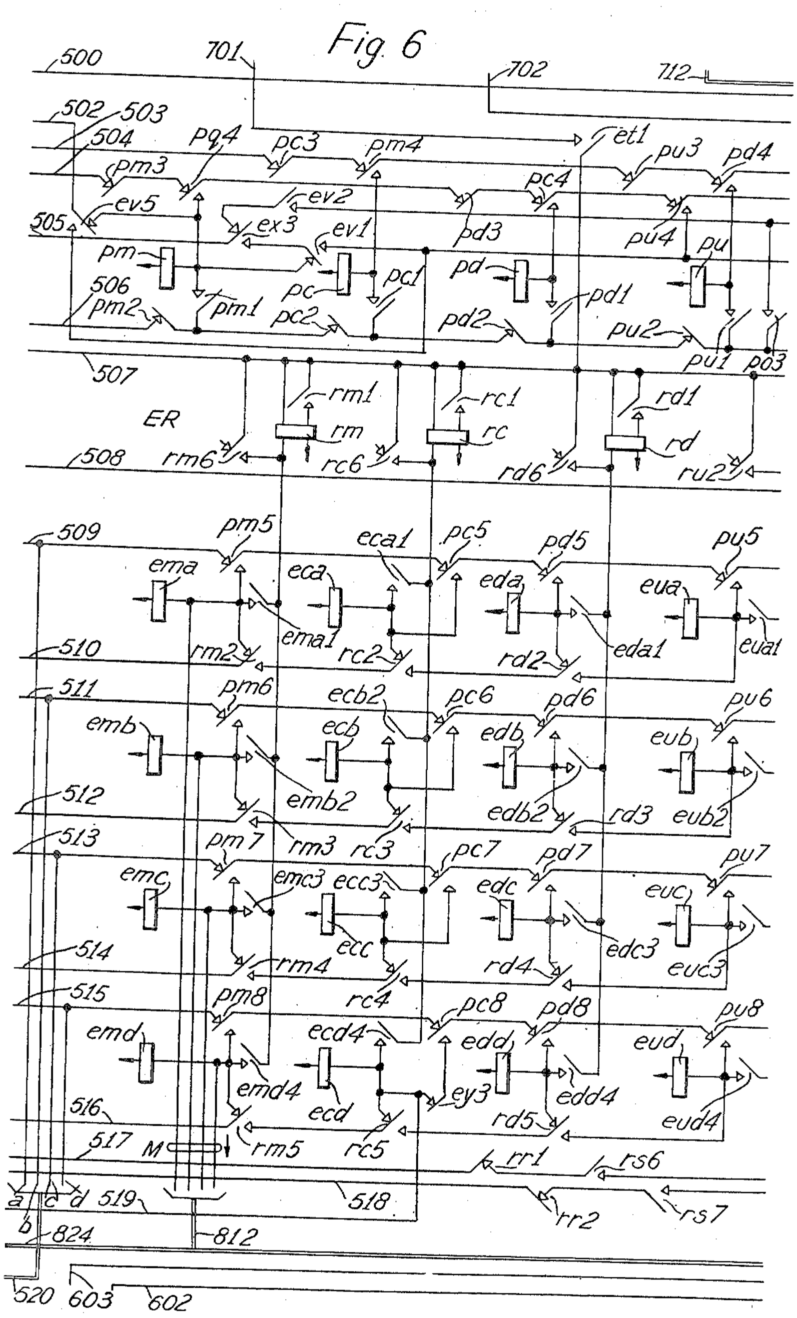
Figure 6A:
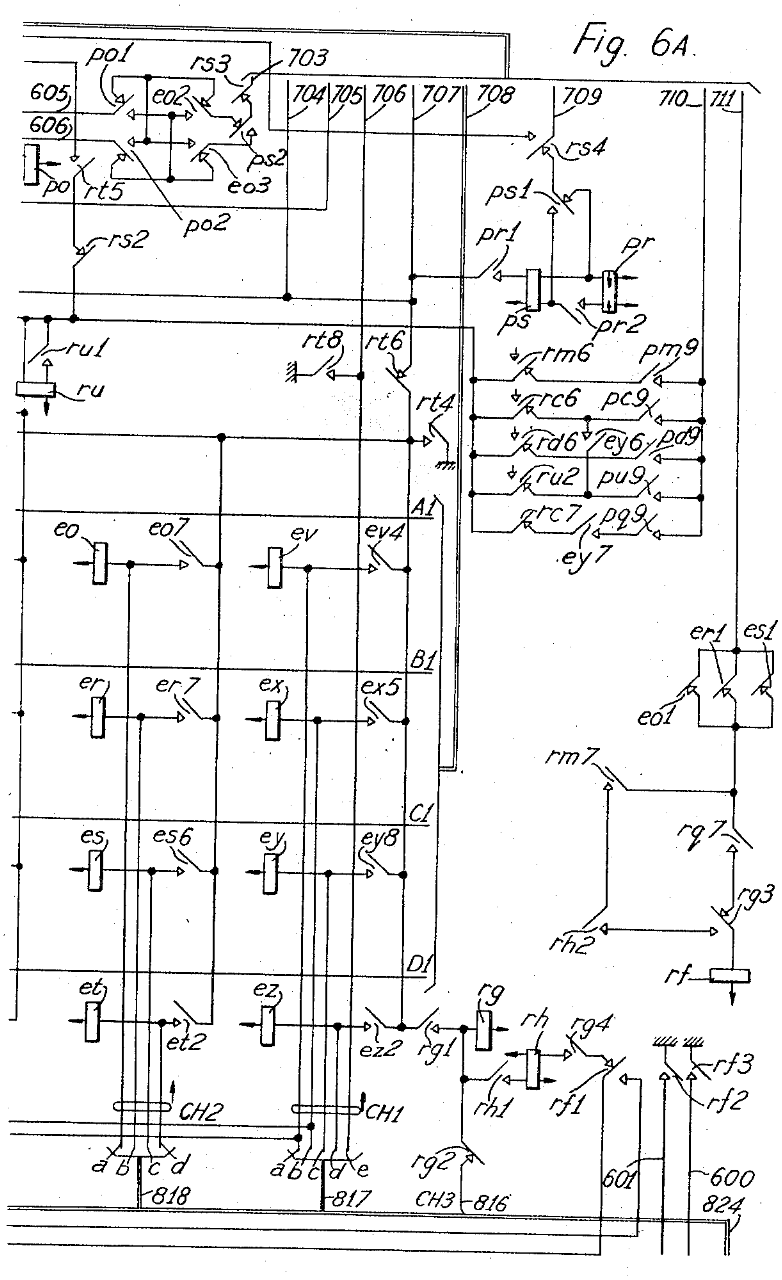
Figure 7:
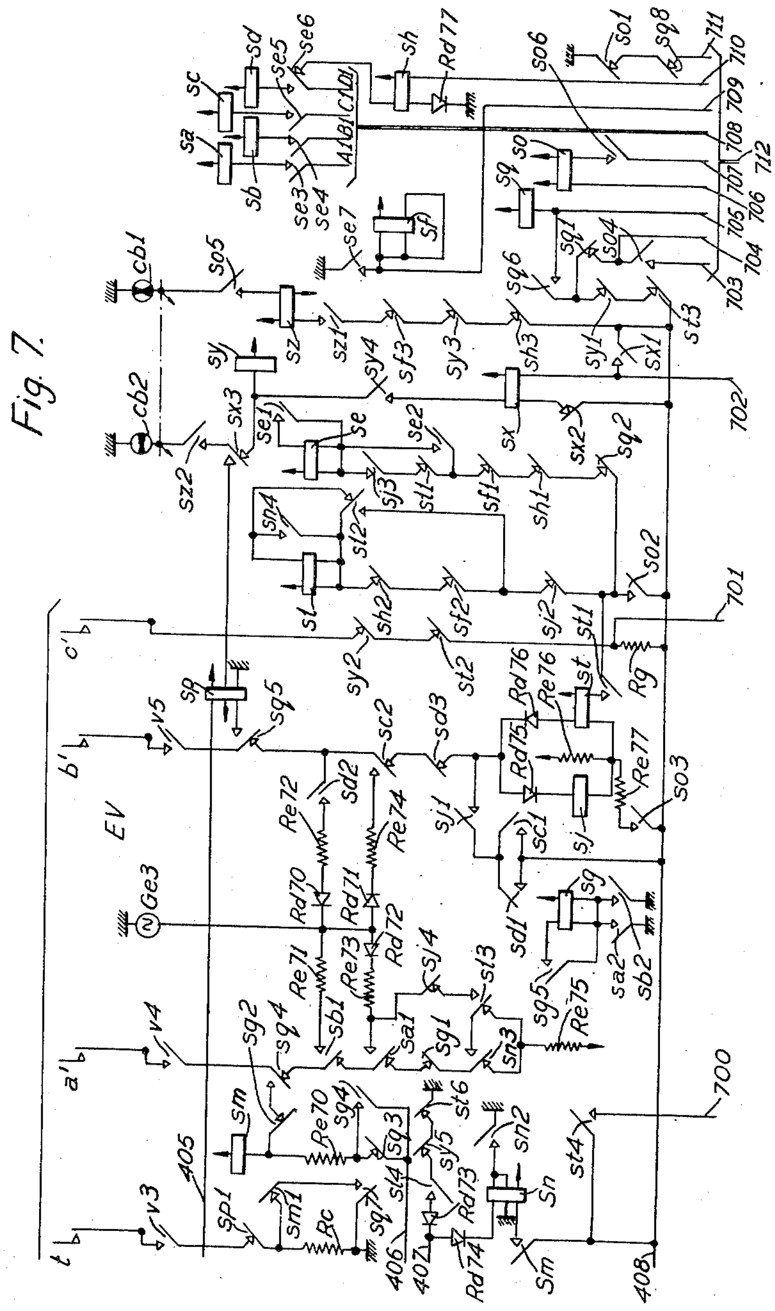

Over its front *et*2 relay *et* completes a holding circuit for itself. Over its front *et*1 it short-circuits resistance R*g* and applies a free ground to the *c'* wire in register finder *cher* (Figs. 6 and 7). This free ground over the *c'* wire causes the physical connection of a calling subscriber to the trunk of the special-service call, but the supplying of said subscriber is always done by the feeding bridge.

It may also happen that the feeding bridge must effect only the physical connection of the calling subscriber to the special service, to the exclusion of any supplying, effected by the special-service trunk.

In that case and according to a method already described, the translator causes register relay *ez* to pull up.

This relay *ez* upon energizing completes for itself over its front *ez*2 a holding circuit to the general holding ground. Over its front *ez*1 it grounds the *t'* wire, this causes, in combination with other feeding-bridge relays, the breaking of the supply of the chain ahead by said feeding bridge and the physical connection of the subscriber to the trunk.

Upon the release, these relays *et* and *ez* fall back like the other relays through the opening of their holding circuits by the removal of the general holding ground.

The case of a regional call will now be discussed, and it will further be assumed that the terminating exchange belongs to the same system as the originating exchange. These two central offices are close enough to each other to allow using pulsating current for the exchange of the various signals required for the routing of a call. The terminating exchange is absolutely identical with the originating exchange, so that it comprises a group-selecting means that requires two selective combinations and a line-selecting means that requires three selective combinations.

All the operations involved in connecting the calling subscriber to the register, in registering the digits of the called subscriber's number and in the seizure of the translator by the regional register are performed according to the method already described.

However, the routing of a call is different from the routing that takes place in the case of a local call.

A first group-selection is effected in the originating exchange in order to determine the direction of the distant exchange. When this direction has been found, a signal is sent from the outgoing trunk to the distant exchange to tell it that the orders will be given over two instead of three wires (*a'*, *b'* instead of *a'*, *b'*, *c'*); the method of selection is then identical with the one already described for a local call as far as the sending is concerned.

The outgoing register then sends the selective combinations intended to effect the selection of the subscriber in the terminating exchange. These combinations consist in whole or in part of digits M, C, D, U.

When the digits P and Q of the called subscriber's number have been registered, the register seizes a translator as already described.

From the input terminal of repeater RP corresponding to the prefix PQ, a wire is led across predetermined tores of the translator, which sends certain codes or signals that allow routing the call to its destination, through the energization of the corresponding register relays.

The translator in this case sends:

(1) A service indication that tells the register that it must send two preliminary codes before sending digits M, C, D, U; this is translated into the energization of relays *eo* and *er*;

(2) A service indication that is translated into the energization of relays *ey* and *ev* and that indicates that the terminating exchange is of the same type as the originating exchange. The energization of these two relays tells the outgoing register that it must send the distant exchange two selective combinations to steer the group-selecting stage and three selective combinations to steer the line-selecting stage, said combinations being only a function of the digits M, C, D, U;

(3) The indication of the energization of starting relay *so*;

(4) The indication of the removal of the ringing current, which is translated into the energization of relay *ez* in the register. As already indicated for a call to a special service, the two codes sent are registered upon relays *eia* and *ejb*, for example.

As already indicated for a call intended for a special service, as soon as the group-selection receiver is ready to receive the pulsating-current signals telling it the group to be chosen, it applies a ground to the *b'* wire; this energizes relay *sj*. This relay, according to a known method, causes the starting of the exploration chain from relay *pi* onward.

The codes registered upon relays *eia* and *ejb* are therefore sent with the aid of relays *pi* and *pj*.

Relay *pj* then prepares over its front *pj*4 the energization of relay *pp* and *pm*.

After having received the two codes that it needs, the group-selecting means of the originating exchange makes a break in the *b'* wire, this causing the release of relay *sj* and the stopping of the exploration chain.

It will now be assumed that the group-selecting means finds a free line in the direction that has been indicated to it by the two codes it has received. That line is connected to the feeding bridge and associated with an outgoing trunk. The register itself is connected to the outgoing trunk through the feeding bridge and group-selecting stage. The outgoing trunk then sends a positive polarity over the *c* wire. The following circuit is then completed: wire *c* brought to a positive potential, front *v*1 and *ac*3, wire 407, rectifier R*d*74, upper and middle windings of relay *sn* in series, ground. Relay *sn* energizes.

By its energization, relay *sn* indicates the seizure of a trunk to a distant exchange belonging to the same system as the originating exchange and to which the digits are sent directly as code pulses.

Over its front *sn*1 relay *sn* completes a holding circuit for itself to its lower winding. Over its front *sn*2 it short-circuits its high-resistance middle winding, thereby telling the outgoing trunk that the pulse sent out by it has been properly received. Over its front *sn*3 it completes the following circuit: ground, generator G*e*3, rectifier R*d*72, resistance R*e*73, back *sj*4, front *sl*3, *sn*3, back *sg*1, *sa*1, *sb*1, *sq*4, front *v*4, wire *a'*. This positive pulsating current will allow the distant-office incoming trunk to become calling in the group-selecting stage of said distant office.

When the receiver of this group-selecting stage is ready to receive the polarities that it requires, it sends a ground over the *b'* wire into the outgoing register. This ground causes according to a known method the energization of relay *sj*, which causes the re-seizure of the exploration chain according to a known method.

The operations involved in sending these selective combinations to the distant office that develop from this moment onward in the outgoing register are absolutely identical with those that have been described in the case of a local call. The group selection and the line selection are effected in the distant office, but under the control of the register of the originating exchange. The connection of the calling subscriber to the called subscriber is effected in the manner indicated for a local call.

The operations caused by the energization of relay *ez* have been previously described.

The various special cases that have been discussed in the case of a local call can apply to the case of a regional call intended for an exchange belonging to the same system as the originating exchange.

However, a few special cases can be added that have not yet been discussed.

In the case of directions comprising an alternative route, terminal *a*1 of distributor RP is not connected directly to the tores but to a terminal *d'*3 of distributor RP; said terminal is connected to a contact *trj*1 used when it is not necessary to route the call over in alternative route and to a contact *trj'*1 used when an alternative route is involved. Terminals *e* or *e'* are then connected to the appropriate tores.

In the case of an alternative route, after the first group selection, when all the direct lines to the distant exchange are busy, a battery is applied to the *b'* wire, which indicates the need of an alternative route. This battery completes the following circuit: battery on wire *b'*, front *v*5, back *sq*5, *sc*2 and *sd*3, rectifier R*d*76, left-hand winding of relay *st*, resistance R*e*77, front *so*3 and *ac*4, ground. Relay *st* energizes.

Over its front *st*1 relay *st* completes a holding circuit for itself through its right-hand winding. Over its back *st*2 it makes a break in the *c'* wire, causing the release of the members seized in the group-selecting means. Over its back *st*3 it isolates from the general holding ground the exploration chain and register ER, causing the release of all the exploration relays as also of the code-registering and service-indication relays. Over its back *st*6 it removes the ground from the *c* wire in order not to send a metering pulse when an alternative route is involved.

Over its front *st*4 it completes the following circuit: ground, front *ac*4, wire 408, front *st*4, wire 700, back *rt*7, relay *eed*, battery. Relay *eed* energizes.

Relay *eed* upon energizing completes a holding circuit for itself over its front *eed*4 to the ground of contact *ac*5. This ground also completes the following circuit: known circuit, wire 815, cable 824, wire 815, front *kb*3/2 of the translator connector, relay *tred*, battery. Relay *tred* energizes in the translator and indicates that an alternative route is involved.

When relay *trx* energizes, relay *trj'* also energizes, over front *tred*1, instead of *trj*, which energized when no re-routing was involved.

Relay *trj'*, the alternative-route relay, closes its front *trj'*1.

From the terminal of distributor RP corresponding to the prefix PQ a wire is led across front *trj'*1 and from point *e'*, thus reached, a wire is led across the necessary tores. The call progresses then according to a known method.

It may happen, for equipment reasons, for example, that there is need of making two group selections in the originating exchange.

In that case, the translator sends 4 preliminary codes instead of two, this causing the energization of register relay *es* and of four relays such as *ega, eha, eia, eja*. The service indication received upon relay *es* tells the register that 4 selective combinations must be sent. The codes registered by the first relays *ega* and *eha* will be used for the first group-selection, the next two, registered by *eia* and *eja*, being used for the second group-selection. The digits are then sent according to a known method.

The case will now be discussed of a regional call to an ordinary subscriber but going to an exchange that is not of the same type as the originating exchange.

It will be assumed that at the distant exchange the selection is effected by means of numerical pulses and that the called subscriber is selected by the reception of digits M, C, D, U.

As in the case previously discussed, generally only one group selection is required at the originating exchange to hunt for an outgoing trunk to the terminating exchange. However, this exchange effects the selection according to a method different from the one used at the originating exchange and it is no longer possible to send it the selection codes used in the originating exchange.

The outgoing trunk must therefore, in combination with appropriate equipment, convert the coded pulses into decimal pulses.

At the originating exchange, the prefix PQ having been registered, the register seizes a translator in known manner.

Upon the reception of the prefix PQ, the translator sends out the codes and service indications that allow routing the call, namely:

(1) Two indications that cause the energization of register relays *eo* and *er*. These relays indicate by their energization that two preliminary codes are sent out for the steering of the local group-selecting stage;

(2) Two codes that cause the energization of relays *eia* and *ejb*, for example;

(3) The service indication of sending out four digits, this being translated into the energization of relay *ex* in the register;

(4) The indication of the removal of ringing current by the energization of relay *ez*;

(5) The starting indication, which is translated into the energization of relay *so*.

Relays *ey* and *ev* remaining unoperated, they thus indicate that the terminating exchange is of a type different from the exchange considered up to this point.

The exploration of the two codes registered upon relays *eia* and *ejb* causes the group selection according to a known method and at the end thereof the register finds itself connected to an outgoing trunk.

At the end of that group selection, relay *pp* energizes through front *pj*4. This relay *pp* completes the following circuit in parallel with its own energizing circuit; front *pp*9, wire 505, front *ex*3, back *ev*1, relay *pm*, battery. Relay *pm* energizes, but relay *pp* releases immediately, having its holding circuit opened by back *pm*2.

When the outgoing trunk and the equipment associated therewith are ready to receive the coded pulses corresponding to digits M, C, D, U, a ground is applied to the *b'* wire, this causing the energization of relay *sj* and thereupon, according to a known method, the re-seizure of the exploration chain from relay *pm* onward.

According to a known method, relay *pm* and then relays *pc, pd, pu* send the codes corresponding to the digits M, C, D, U and relay *sq* pulls up when the units digit has been sent.

The connection, the removal of the feeding bridge and then the release are effected according to a method already described.

It will be noted that the stopping device characterized by relay *sh* is designed so that the digits M, C, D, U can be sent only in proportion as they are registered. In a terminating exchange of this type, it is no longer necessary to wait for the registration of the final digit in order to send the three digits C, D, U.

All the special cases previously discussed would apply in identical fashion in the case that has just been described.

It might happen that the called subscriber is not connected directly to the distant exchange and that this latter acts as a transit exchange.

The sequence of operations is exactly the same as the one that has been described, but, instead of sending four digits, the six digits of the called subscriber's number are sent just as they have been received.

If the charge is not determined by the outgoing trunk itself, there may be a metering request.

In that case, the translator responds by sending a supplementary code and the corresponding service indication. The translator therefore sends three codes, which are registered upon relays *eha/d, eia/d, eja/d*, the code registered upon relays *eja/d* being the metering code.

After this sending, the digits will be sent according to the method already described.

It may also happen that it will be necessary to use the class indication. As has already been pointed out, the class indication causes the energization in the translator of a relay *trea/c* and then of a relay *tri*. According to a known method, it suffices to run a wire from the distributer's terminal corresponding to the prefix PQ dialed, to connect it to the circuit passing through front *tri*1 and then to make it cross the tores corresponding to the codes and service indications required for the routing of a call. It follows from this that the routing of a call may depend not alone upon the call number dialed but also upon the class; this arrangement may in particular be used in the case of subscribers having restricted service.

The case of a national call will now be discussed with reference to Figs. 4 to 11.

When the calling subscriber removes his handset, he is, according to a known method, connected to regional group ENR, after his class has been registered, if needed, in regional register ER.

After having received a first dialing tone, a subscriber desiring to make a call to the national system dials a special number, 16 for example.

Once this first prefix has been registered in the regional register, a translator is seized, which responds by sending a service indication, thereby causing said register to seize a national-register finder CHEN.

According to a known method, register finder CHEN hunts for a national register and connects it to the regional register.

This national register comprises essentially only an exploration chain and a code-registering chain, resembling the similar chains of the regional register.

The national register therefore amounts to an auxiliary register of the regional register, which will be used only partly in the course of the call. In effect, this national register registers only the called subscriber's office prefix, the numerical portion of the called subscriber's number being registered by the regional register.

It will be noted in this connection that the call number used for a national call is made up of eight digits comprising two distinct parts: the office prefix A, B, P, Q and the numerical portion M, C, D, U.

Moreover, the national register receives the prefix A, B, P, Q through receiver RE and sends the codes sent to it by the translator through a sender EV of regional group ENR.

The special number 16 characterizing calls intended for the national system is registered according to a known method in register RE and its registration is evidenced by the energization of relays *rp, rq*.

Translator TR is then seized by the regional register and receives this prefix; it responds thereto by causing the energization, in said regional register, of relays *eo, er* and *es*, which hold on the general holding ground given by *ac*5. The translator also causes the energization of ringing-current-removal relay *ez*.

Over their rank-1 back contacts, the three relays *eo, er, es* open the energizing circuit of translator-seizing relay *rf*. The translator is released according to a known method.

The following circuit is completed over front *er*2 and *es*2: ground (Fig. 5), front *er*2 and *es*2, back *ex*1 and *rs*1, starting wire M of national register finder CHEN. Over their front *er*3 and *es*3, relays *er* and *es* prepare the energizing circuit of relays *rr* and *nrj*.

Having thus been started, national register finder CHEN proceeds to choose a national register ENN according to a known method. A free register is characterized by a battery on its test wire *nte* and a ground on its chain wire *nch*.

Once a free national register has been found, magnet V of finder CHEN closes its contacts and the national register thus finds itself connected to the regional register through finder CHEN.

The following circuit is then completed: ground in the regional register, front *er*3 and *es*3, back *ex*2, relay *rr*, wire 524, contact *t* of individual switch *chen*, back contact associated with front contact *nrq*3, righthand winding of relay *nrj*, battery. Regional-register relay *rr* and national-register relay *nrj* energize in series.

Over its front *rr*7 relay *rr* completes the following circuit in parallel with the energizing circuit of relay *rr*: ground, front *er*3 and *es*3, back *ex*2, front *rr*7, relay *rs*, battery. Relay *rs* energizes.

By energizing, this relay indicates the seizure of the national register by the regional register. Over its back *rs*1 it opens the starting circuit of the national-register connector. Over its back *rs*3 it opens the energizing circuit of the regional register exploration-chain relays. Over its back *rs*4 it opens the energizing circuit of the pair of regional-register metering relays and over its front *rs*4 it prepares the energizing circuit of a pair of similar metering relays in the national register. Over its front *rs*5 it completes a holding circuit for itself.

In the national register the seizure of said register is marked by the energization of relay *nrj*. Over its front *nrj*1 relay *nrj* gives the general holding ground of the registering relays and completes a holding circuit for magnet V of finder CHEN. Over its front *nrj*2 it gives the general holding ground of the code and exploration relays. Over its front *nrj*3 relay *nrj* completes the energizing circuit of relay *npx* over its upper winding. Over its front *nrj*4 it completes the following circuit for the sending of the second dialing tone to the subscriber to tell him that he may dial the called subscriber's number: generator G*e*4, condenser C*d*100, back *nra*7, front *nrj*4, contact *t* of switch *chen*, wire 524, back *ru*3, front *rp*7, wire 400, condenser C*d*40, back *ad*1, middle winding of relay *aa*, ground. This tone is sent to the calling subscriber as has been explained.

Relay *npx* upon energizing marks the national register busy. Over its back *npx*1 it opens the circuit of test wire *nte* and over its back *npx*3 the circuit of chain wire *nch*. The subscriber then dials the called subscriber's number. He thus dials the digits A, B, P, Q–M, C, D, U.

According to a known method these digits are received in receiver RE by receiving relays *ag* to *am* and are coded by means of coder CD2.

For the clarity of the description it will be assumed that the call number dialed is M4–A2 25–70. The first digit registered (M) corresponds to the sending of 6 pulses. Reference to the recapitulatory table that has been prepared for the purpose of local-call numbering will show that the 6 pulses correspond to a marking of wires A and D.

The following two circuits are then completed:

(1) Ground, front *ac*4, wire 409, coder CD2, wire A, cable 401, wire A, front *rp*2, *rq*2, *rr*3, wires 522*a* and 526, contact *a* of switch *chen*, back *npe*4, *npv*1, cable 1000, wires A and 1008, back *nra*2, relay *neaa*, battery;

(2) Circuit already described . . ., wire D, front *rp*5, *rq*5 and *rr*6, wire *d*, cable 522, wire 529, contact *d* of switch *chen*, wire D, cable 1000, wires D and 1014, back *nra*5, relay *nead*, battery.

Relays *neaa* and *nead* energize and by their combination characterize the code corresponding to the first digit (A) of the call number dialed.

These relays hold on the general ground of contact *nrj*1 and cause the energization of relay *nra* in order to indicate that the registration of the digit A of the call number has been effected.

Over its front *nra*2 to *nra*5 relay *nra* will allow, in a manner identical with the one that has just been described, the registration of digit B upon relays *neba* to *nebd*. Over its back *nra*7 relay *nra* opens the circuit for sending the dialing tone from the national register onward.

Character B, corresponding to digit 4, that is to say, to four numerical pulses, is characterized by the marking of wire C. It follows from this that the national register's registering relay for character B will be relay *nebc*, which at the end of the registration of said character causes the energization of relay *nrb*.

Over its front *nrb*2 to *nrb*5 relay *nrb* prepares the circuits for registering the digit P upon relays *nepa/d*. Over its front *nrb*7 it completes the following circuit: ground, back *nro*1, front *nrb*7, back *nrg*3, relay *nrf*, battery.

Relay *nrf* energizes and causes the seizure of the translator by the national register. The digit P corresponds to two numerical pulses, which, after coding, energize relay *nepb*. This relay thereupon causes in known manner the energization of the relay marking the end of the registration of digit P, namely, relay *nrp*.

The digit Q, also corresponding to two numerical pulses, is registered in code form on relay *neqb* over front *nrp*3.

Relay *neqb* energizes and causes the energization of the relay *nrq* marking the end of the registration of digit Q.

As has been explained in the case of a local call, relays *nra* . . . *nrq*, similar to relays *rp* . . . *ru*, all complete holding circuits for themselves to the general holding ground over their rank-1 contacts, and over their rank-6 front contacts complete holding circuits for the relays that register the digits A, B, P and Q.

Over its back *nrq*3 associated with front *nrq*3 relay *nrq* opens the initial energizing circuit of seizing relay *nrj*. Over its front *nrq*3 it switches in the high-resistance lefthand winding of relay *nrj* and again completes the energizing circuit of said relay to its two windings in series. This operation causes the release of relay *rr* in the regional register.

Upon releasing, relay *rr* will allow the registration of the numerical portion of the call number in regional register ER, restoring the continuity of wires A, B, C, D in the register over its back *rr*3 to *rr*6. Over its front *rr*7 it opens the energizing circuit of relay *rs*, which holds. The digits M, C, D, U dialed by the calling subscriber are registered according to the general method previously described in connection with a local call. When the units digit is registered, relay *ru* energizes and over its front *ru*3 switches in generator Ge2, which, over a circuit already described, sends the subscriber a waiting tone telling said subscriber that the call number has been properly registered. Over its back *ru*4 relay *ru* isolates from the subscriber's dial the pulse-receiving relays in receiver RE.

It has been pointed out that once the first two digits (A and B) of the office prefix have been registered, national-register relay *nrf* energized.

This relay controls the hunting and then the seizure of a translator by the national register.

The operations involved in the seizure of this translator are absolutely identical with those described in connection with a local call.

It will be noted moreover that within the translator the translation operations, as also the sending of certain codes or service indications, develop according to a method identical with the one described in connection with the cases previously discussed. The sole difference lies in that the translator is controlled by the national and no longer by the regional register.

It will be assumed that the translator can route the call with the first two digits (A and B) up to the regional exchange. The prefix AB is thus sent into the translator, the codes corresponding to the digit A causing the energization of relays *traa'* and *trad'* and the code corresponding to the digit B causing the energization of relay *trbc'*. These relays in turn and according to a known method cause the energization of relays *trfa'* among 10. Wire 843 issuing from contact *trfa'*1 of the *trfa'* relay energized terminates at terminal *a*2 of the distributer, corresponding to the prefix AB. This terminal is connected to the translation tores associated with the relays that must be energized in order to route the call in progress. The energization of these relays is brought about according to the same method described for the proceding cases.

A table may further be prepared showing the relays that energize depending on how the call is routed.

| Preliminary Codes | Relays Energized | Digits Sent | Relays Energized |
|---|---|---|---|
| 4 Codes | *neo* | 4 | |
| 2 Codes | *ner* | 3 | *nes* |
| 6 Codes | ---------- | 2 | *net* |
| | | 1 | *net* & *nes* |
| | | 0 | *nev* |

In case the call number dialed by the calling subscriber is not used, the translator sends a signal causing the energization of relays *net* and *nev* in the national register.

Further, regardless of the number of code or service-indication relays energized, the translator causes, also in known manner, the energization of starting relay *nro* in the national register.

Upon energizing, relay *nro* opens over its back *nro*1 the energizing circuit of relay *nrf*, which releases. This latter causes the release of the translator according to a method already described. Over its front *nro*1 it completes the following circuit: ground, front *nro*1, back *npe*3, *nps*2, *npo*1, *npq*4 . . . *npa*3, wire 1002, back *npi*4 . . . *nph*3, relay *npf*, battery. Relay *npf* energizes. Over its front *nro*2 relay nro completes the following circuit: battery, lower winding of differential relay *npr*, back *nps*1, front *nro*2, contact *i* of switch *chen*, wire 525, back *rt*2, lower winding of relay *rt*, ground. Relay *rt* energizes. Relay *npr* does not energize, owing to the high resistance of the lower winding of relay *rt*. Over its front *nro*5 relay *nro* completes a holding circuit for itself.

It will now be assumed, for the clarity of the description, that a single group-selection suffices to determine the distant exchange; the translator then sends two preliminary codes, this being translated into the energization of relays *ner*, *nejb*, *neka*. Relay *ner* corresponds to a service indication, relays *nejb* and *neka* corresponding to the preliminary codes in the national register. It will also be assumed that it is necessary to send 6 digits, these being the characters P, Q, M, C, D, U, just as they have been received; the national register for its part will send two of them and the translator will then cause the energization of national-register relay *net*.

Under these conditions, relay *npf* releases without having caused anything, its holding circuit being opened at *npj*2, the closing of front *ner*2 having further caused the pulling up of relay *npj*. Upon energizing, relay *npj* prepares the exploration of the first code sent by the national register and registered for example upon relay *nejb*.

Over its front *npj*1 relay *npj* completes a holding circuit for itself. Over its back *npj*3 and *npj*4 it opens the energizing circuits of the relays located ahead. Over its front *npj*4 it prepares the energization of relay *npk* for the exploration of the second code sent by the national register. Over its front *npj*5 to *npj*8 it prepares the circuits for sending the first code to the coding relays of sender EV.

Upon energizing, relay *rt* completes a holding circuit for itself over its front *rt*1. Over its back *rt*2 it opens its initial energizing circuit and over its front *rt*2 it switches this circuit by wire 500, front *rs*4, to the ground of front *se*7. The pair of national-register metering relays *npr*, *nps* are thus connected to pulse time relays *se*, *sf* of sender EV. Over its back *rt*6 relay *rt* removes the holding ground of *ac*4 for the code-registering and service-indication relays and replaces it with the ground or front *rt*4. Over its front *rt*8 it completes the energizing circuit of sender relay *so*.

When relay *so* energizes, it causes the energization of relay *sl* and the exploration operations and the operations involved in the sending of the two codes from the national register to the receiver of the group-selecting means of the exchange under consideration develop according to a method identical with the one described for a local call.

In effect, as has already been pointed out, the sender connected to the national register works with this latter the same as it worked with the regional register. Moreover, the pair of relays *se*, *sf*, *npr* and *nps*, and *se*, *sf*, *pr* and *ps*, are identical and work the same way.

In the national register this is translated into the grounding alternatively, of wires 1016 and 1017, this allowing the exploration chain to progress satisfactorily.

The signals of the national-register registering relays are sent through wires A1, B1, C1 or D1 over cable 1001, contacts *a*1, *b*1, *c*1, *d*1 of switch *chen*, from cable 520 to wires A1, B1, C1, D1, which respectively correspond to them in the regional register and which allow energizing all or part of relays *sa* . . . *sd*. From these relays onward the sending of the codes is done according to a known method.

When the second code has been sent out from the national register, relay *npp* energizes over front *net*1, causing the sending of digits P and Q of the call number.

When this sending has ended, the ground of front *nro*1 is switched to relay *npe*, which energizes over front *npq*4.

By energizing, relay *npe* indicates the end of the selection. Over its front *npe*1 it completes a holding circuit for itself. Over its front *npe*2 it causes relay *npq* to release. Over its back *npe*3 relay *npe* removes the ground from the exploration chain, this to say, it makes a break in the energizing circuits of relays *npf* to *npo*. Over its back *npe*4 it makes a break in the digit-code registering wire A and over its front *npe*4 it completes the following circuit: ground, front *npe*4, contact *a* of switch *chen*, wire 526, cable 522, wire 517, back *rr*1, front *rs*6, wire 817*b*, relay *ex*, battery. Relax *ex* energizes in the regional register.

Upon energizing, relay *ex* controls the sending of the last four digits (M, C, D, U) of the call number dialed, which, as has been explained, were registered in the regional register.

Over its back *ex*2 it opens the energizing circuit of national-register relay *nrj*, which releases, and the holding circuit of relay *rs*, which also releases. Over its front *ex*2 it completes the following circuit: ground, front *er*3, *es*3 and *ex*2, wire 502, back *ev*5, relay *pm*, battery. Relay *pm* energizes.

Upon homing, relay *nrj* removes over its front *nrj*1 and *nrj*2 the two general holding grounds, causing all the relays still energized in the national register to release. The national register is thus fully released.

Upon releasing, relay *rs* again applies over its back *rs*3 the ground of *ac*4 to the relays of the regional register's exploration chain. Over its back *rs*4 it restores the connection between the pair of metering relays *pr*, *ps* and time pulse relays *se*, *sf*.

The exploration chain of the regional register then resumes its stepping from relay *pm* onward and allows the exploration of the relays registering the digits M, C, D, U, which are sent to the distant office.

The final digit having been sent, relay *sq* pulls up and according to a method already described steers the *a'* and *b'* wires of finder *cher* to relays *sm* and *sp*.

If the called subscriber is free, relay *sm* causes the connection. It the called subscriber is busy, relay *sp* causes the sending of the busy tone to the calling subscriber.

In both cases, full release is effected as already described.

The special cases that can be encountered in the routing of a call intended for the national system will now be discussed.

It has been assumed in the course of the preceding description that the digits A and B suffice to route the call. It may happen that the four digits of the office prefix are required to route the call up to the distant office.

Under these conditions, the translator, after the reception of the digit B, acts in the manner that has already been described and causes its relay *tph* to energize. This latter causes the sending of a ground over wire CH3, which terminates through cables 824 and 824*n* at wire 816*n* and at national-register relay *nrg*. Relay *nrg* energizes and acts in a manner absolutely identical with that of regional-register relay *rg*, causing the energization of relay *nrh* and the return to normal of the translator-seizing relay (relay *nrf*). The translator is released.

In the national register, the registration of the office prefix proceeds up to the registration of the digit Q, which corresponds to the end of the registration of the prefix dialed and which is evidenced by the energization of relay *nrq*.

This relay then completes the following circuit: ground, back *nro*1, front *nrq*5, *nrh*2 and *nrg*3, relay *nrf*, battery. Relay *nrf* re-energizes and causes the seizure of translator TR by the national register. The translator then responds by sending a service indication, received in the register upon relay *neo*. The energization of *neo* indicates that four preliminary codes are to be sent. Moreover, the translator causes the energization of all or part of relays *neka* to *nekd*, *neja* to *nejd*, *neia* to *neid* and *neha* to *nehd*.

The exploration and the sending of the codes registered are then the same as those previously described, relay *nph* being the first relay of the reading chain to pull up.

It may happen that the routing of a call requires the sending of 6 preliminary codes by the translator, this causing the sending of grounds over the groups of wires T1 to T6 in the national register. None of relays *eo* or *er* being then energized, the first relay of the exploration chain to be energized is relay *npf*.

Depending upon the distant office called, it is necessary to send from 4 to 8 untranslated digits. In this case, the national register will have to send from 0 to 4 digits. In the case where the national register sends no digit, relay *net* energizes and, regardless of the number of preliminary codes sent, causes the energization of *npe* after the energization of relay *npk*, which evidences in all cases the sending of the final code. Relay *npe* marks the end of the sending of the codes from the national register and, as has already been explained, causes the sending of the digits registered in the regional register. In the case where the national register sends an untranslated digit, relays *net* and *nes* energize, causing the energization of relay *npp* after the sending of the final code.

Relay *npp* causes through its front *npp*10 the energization of *npo* over the following circuit: ground, front *nro*1, back *npe*3, *nps*2, *npo*1, *npq*4 . . . , front *npk*4, *net*1, *npp*10, *nes*2, relay *npo*, battery. Relay *npo* energizes and through the action of its contacts *npo*1, *npo*2 shifts the ground from wire 1016 to wire 1017 to cause the energization of relay *npq*.

Relay *npq* upon energizing causes the release of relay *npp* and causes the exploration and sending of the digit that the national register sends in the case under consideration.

Where it is necessary to send three digits, only national-register relay *nes* energizes. According to a known method the first two digits sent are read by relays *npb*, *npp*. The third digit sent is the character Q, read by relay *npq*. However, since the character A must not be sent, relay *npa* has caused the energization of *npo*. As already explained, this energization causes the inversion of wires 1016 and 1017, this causing the homing of relay *npa* before it was possible to send the character A.

In the case where the national register sends the digit, none of relays *es*, *et*, *ev*, *er* is energized.

Once the last preliminary code has been sent, the exploration chain steps uninterruptedly, relays *npa* to *npq* energizing in turn. Relay *npe* energizes at the end of the selection, causing the sequence of operations in the regional register as has been previously explained.

It may happen that an alternative route has been provided if all the direct lines to the distant office called are busy. As in the case of a regional call, relay *st* energizes in the regional register.

Upon energizing, relay *st* completes a holding circuit for itself over its front *st*1. Over its back *st*2 it opens the circuit of the *c'* wire for the group-selecting means under seizure at the moment under consideration, in order to release it. Over its back *st*3 it opens the holding circuits of the code and service-indication relays of the register, as also the exploration relays, but the service-indication relays hold over the ground of contact *rt*4. Over its back *st*5 it makes a break in the national register's code-sending wire C1 and over its front *st*5 it applies a positive battery to said wire C1 to tell the national register that an alternative route is involved, thereby causing the energization of relay *npt*. The following circuit is then completed: positive battery, resistance Re50, front *st*5, wire 532, contact *c*1 of switch *chen*, front *v*3, rectifier Rd100, left-hand winding of relay *npt* ground. Relay *npt* energizes.

Upon energizing, relay *npt* completes a holding circuit for itself over its front *npt*1. Over its back *npt*2 it opens the holding circuits of the national register's various code-registering relays T2 to T6, of service-indication relays *neo* to *nev*, of the exploration chain's stepping relays *npf* to *npo* and of relay *nro*. Over its front *npt*2 it completes the following circuit: ground, front *nrj*2 and *npt*2, relay *npn*, battery. Relay *npn* energizes. Relay *npn* is an auxiliary rerouting relay. Over its front *npn*2 it completes a holding circuit for itself. Over its front *npn*1 it prepares the energization of a rerouting relay in this new translator.

Relay *nro* upon homing causes the release of relay *npt* by opening its holding circuit over front *nro*3.

Relay *npt* releases and over its back *npt*2 again provides a general holding ground for the service-indication relays, the code-registering relays of the exploration chain, and for the starting relay.

As has been pointed out, in the case of rerouting the selection operations will resume at once, according to a previously-described method, and the following circuit is completed for translator relay *tred* when the national register has again seized a translator: ground, front *npn*1, class wire 815*n*, cable 824*n*, cable 824 (Figs. 5 and 6), wire 815*d* in Fig. 8, front *kb*3/2, relay *tred*, battery. Relay *tred* being energized, it causes the translation operations corresponding to a rerouting case.

If the number dialed by the calling subscriber is not used, the translator sends the selection codes to the special service to which he must be switched, together with the corresponding service indications. In the national register, the translator causes the energization of relays *net, nev*.

When the fourth digit (Q) of the national prefix has been registered, this being characterized by the energization of relay *nrq*, and when the group-selection signals have been sent, this being evidenced by the energization of relay *npe*, the following circuit is completed: battery, relay *npv*, front *nrq*4, *nev*4, *npe*5, ground. Relay *npv* energizes.

Relay *npv* characterizes the connection of the calling subscriber to a special service. Upon energizing, this relay, over its back *npv*1 and *npv*2, makes a break in the wires A and B registering the prefix in the national register and grounds them over its front *npv*1 and *npv*2, causing the energization of relays *ev* and *ex* in the regional register over back *rr*1 and *rr*2 and over front *rs*6 and *rs*7.

As has already been explained, the simultaneous energization of these two relays in the regional register characterizes the routing without digit sending. In the present case this is a special service.

It may also happen that the selection will not be successful upon the sending of codes from the national register. At the end of a certain period a timing device is started that causes a new selection attempt.

As has already been explained, sender relay *se* controls stepping of the exploration chain and the sending of codes. In the national register, relay *se* acts through metering relays *npr* and *nps*. When *se* energizes, that is to say, during the sending of a code, only one of relays *npr* and *nps* is energized. Between the sending of codes, when relay *se* is in home position, both relays *npr* and *nps* are energized or both are in home position.

Upon starting, when relay *nro* energizes and when, through relay *rt*, sender relay *so* has likewise energized, regional-register relay *sz* and national-register relay *nrz* energize upon the first passage of cam *Cb*1. For this device to operate correctly it is necessary that the regional and national registers be connected to the same cams *Cb*1 and *Cb*2.

Relays *sz* and *nrz* hold in both registers between two code sendings. As has been seen, relay *sz* holds over back *sf*3. Relay *nrz* holds on the general ground over the following circuit: battery, upper winding of relay *nrz*, back *nrk*2, front *nrz*1, back or front *npr*3 and *nps*3 when relay *se* is in home position and ground over front *nrj*2.

If upon the passage of cam *Cb*2 relays *sz* and *nrz* are still energized, no code having been sent, regional-register relay *sy* and national-register relay *nry* energize, relay *sy* over front *sz*2 and relay *nry* over front *nrz*2.

In the national register, relay *nry* upon energizing completes a holding circuit for itself over its front *nry*2 and opens over its back *nry*1 the holding circuit of the code-registering and service-indication relays, as also the relays of the exploration chain. The national register then again seizes a translator to make a new selection attempt.

In the regional register, as has already been seen, relay *sy* breaks over its back *sy*2 the wire *c'* holding the selections of the chain below, releasing the group-selecting stage.

In the regional register, however, service-indication relays that had energized hold on the ground of front *rt*4, their usual holding circuit being broken by back *rt*6 and *sy*1.

The selection can thus recommence in the national register from the beginning.

However, as in the case of a regional call, a second unsuccessful selection attempt would have the effect of sending the calling subscriber the busy tone.

As has already been pointed out, the national register is released as soon as the digit Q has been sent, the regional register sending the four digits of the numerical portion of the call number.

Relay *rs* is then restored to normal in the regional register, but relay *rt* is still energized; relay *sx* is then energized by the ground of contact *ac*5 over back *rs*2 and front *rt*5 to its right-hand winding. If a selection failure occurs then, relay *sx* sends the calling subscriber the busy tone after cams *Cb*1 and *Cb*2 have caused the operation of relays *sz* and *sp*. In that case, the national register being released, no new selection attempt can be made.

As has been pointed out, the translator cannot start to perform its functions until the digits A and B of the office prefix have been registered. But it may happen that one of the exploration relays, *npp* or *npq*, will energize before the corresponding digit, P or Q, has itself been registered.

Under these conditions, if the digit P is not registered, relay *nrp* is still in normal position and the following circuit is completed: ground, front *nrj*1, back *nrp*6, front *npp*9, relay *nrk*, battery. Relay *nrk* energizes.

Over its back *nrk*1 relay *nrk* isolates wire D1 from the national register and over its front *nrk*1 it completes the following circuit: positive battery, resistance R*e*102, front *nrk*1 and *v*4, contact *d*1 of switch *chen*, wire 533, cable 520*d*, wide *d*, back *pm*8, *pc*8, *pd*8 and *pu*8, wire D1, wire 708, wire D1 is the sender, back *se*6, left-hand winding of relay *sh*, rectifier R*d*77, ground. Stopping relay *sh* of the sender energizes to prevent, as has already been explained, the sending of pulses from relay *se* by opening back *sh*1. Further, over its back *nrk*2 relay *nrk* opens the circuit of the right-hand winding of relay *nrz* to prevent it from holding. If a delay occurs in the dialing of the digits of the call number, cams *Ca*1 and *Ca*2 are the ones that operate.

It is quite obvious that the foregoing descriptions have been given only as nonlimitative examples and that numerous variants could be introduced without departing from the scope of the invention. For example, a plurality of alternative routes could be provided for the routing of a call when all the direct lines are busy. The case has already been discussed where only a single alternative route was provided. It may happen that all the lines of this first route are busy. If a second alternative route is provided, a battery is applied to wire *b'*, this causing, as has already been explained, the energization of relay *st*. In that case, register ER should comprise a second *eed* relay (not shown), which energizes, the first *eed* relay holding and indicating thereby that the first alternative route has been tested.

The second relay such as *eed* upon energizing causes the sending to the translator of a signal characterizing a second alternative route; the translator then sends signals similar to those already sent for the first alternative route.

Other alternative routes can be provided, which would be tested, in the manner already described, in a certain order until one comprising a free line is found for the routing of the call.

It would also be possible to provide a system comprising more than 6 digits, translate office prefixes comprising a variable number of digits, send other translated digits and provide other codes for the sending of the various selective combinations.

I claim:

1. An automatic telephone system comprising a plurality of lines and selecting means for connecting a calling line with a called line, said selecting means comprising a main register, means for connecting a calling line with said main register upon the initiation of a call, first receiving means in said main register for receiving a digit denoting the special character of the call, an auxiliary register, means responsive to the receipt of said digit by said first receiving means for connecting said auxiliary register to said main register, second receiving means in said auxiliary register for thereafter receiving the office prefix digit and the corresponding translated signals of a called number transmitted from said calling line, and means for thereafter causing said first receiving means to receive the digits denoting the numerical portion of said called number.

2. An automatic telephone system, according to claim 1, in which the first receiving means comprises a registering device adapted to register the numerical portion of the number dialed, and means for thereupon sending the selective combinations of digits for routing the call which have been registered in said registering device.

3. An automatic telephone system, according to claim 2, in which the first receiving means comprises sending means adapted to send each of the digits of the office prefix of a received called number to the auxiliary register immediately upon the receipt thereof, said sending means adapted to explore the various combinations of digits received by said auxiliary register and then to send them to the various selector stages.

4. An automatic telephone system, according to claim 3, further comprising means for automatically connecting the first receiver to the auxiliary register when the main register and the auxiliary register have been connected, means in said auxiliary register upon the receipt of the office prefix thereby for routing the digits representing the numerical portion of the call to the main register, and means for releasing the auxiliary register as soon as the information it has received has been sent by the sender, whereby the holding time of the auxiliary register is shortened and the total number of registers may be reduced for a given number of lines.

5. An automatic telephone system, according to claim 1, in which there are a plurality of registers of different types, further comprising a translator adapted to be associated with any of said registers, means in said translator for receiving an indication of the class of the calling line, means in said translator responsive to the receipt of said indication for sending selective combinations depending upon the office prefix of the number dialed, upon the type of the calling register, and upon the class of the calling line, whereby the same translator may be used regardless of the class of the calling line and the type of the register, so that a minimum number of translators will be required in the exchange.

6. An automatic telephone system, according to claim 5, in which the translator comprises a series of terminals each corresponding to a digital combination to be translated, an electric coding device having a plurality of members including a plurality of coils characterizing the translation, a plurality of register relays adapted to receive the translations from said device, means for permanently connecting said members to said relays, and a wire individual to each digital combination to be translated connected to the corresponding terminal and passing through the coils characterizing the various translations, whereby a single one of said wires may be used for each digital combination to be translated.

7. An automatic telephone system, according to claim 5, further comprising means in the translator responsive to the receipt of a predetermined number of digits for deducing therefrom the selective combinations for routing the call, means responsive to the failure of said last-mentioned means for sending a signal to the register and releasing itself, and means in said register responsive to said signal for placing said register in such a condition that it cannot seize a translator again until after having received all the digits necessary to bring about the routing of the call without fail, whereby the holding time of the translators is reduced.

8. An automatic telephone system, according to claim 5, further comprising means operative when there is no direct route for the call and one or more alternative routes are provided for sending a special signal to the register, means in said register responsive to said special signal for causing release of the selective chain that has been seized and causing the return to normal of the devices that have registered the translations and further causing the re-seizing of a translator, means responsive to the re-seizing of a translator for sending to the re-seized translator the office prefix of the number dialed together with a re-routing signal and sending to the register the selective combinations required for routing the call over the first alternative route.

9. An automatic telephone system, according to claim 8, further comprising means operative when the first alternative route lines are busy and a second alternative route is provided and responsive to the special signal for sending to the translator a signal characteristic of a second alternative route, and means for causing the translator to send to the register the selective combinations required for the routing of the call over the second alternative route.

10. An automatic telephone system, according to claim 1, in which the first receiving means comprises a registering device having a separate registering portion for each selective combination to be registered and a sending device, said first receiving means adapted to receive each of the digits dialed, said registering device adapted to register the digits received by said receiving means in the separate portions thereof, said sending device adapted to send the selective combinations of digits for routing the call which have been registered in said registering device, said sending device comprising a plurality of relays arranged in a chain and having two incoming wires, the relays associated with the first wire being adapted to explore the odd combinations of digits and the relays associated with the second wire being adapted to explore the even combinations of digits, means controlled by the register for applying a potential at a predetermined polarity to said first wire, means responsive to the application of said potential for operating the first of said relays associated therewith, connecting means operated by said first relay for connecting said sending device to that portion of said registering device which has registered the first selective combination, preparing means also operated by said first relay for preparing the circuit for the operation of the second exploring relay, said sending means adapted for sending said first selective combination in response to the operation of said connecting means, means responsive to the sending of said first selective combination for switching the potential applied to said first incoming wire to said second incoming wire, means responsive to the application of said potential to said second incoming wire for operating the second of said relays associated therewith, connecting means operated by said second relay for connecting said sending device to that portion of said registering device which has registered the second selective combination, and preparing means also operated by said second relay for preparing the circuit for the third exploring relay, said sending means adapted for sending said second selective combination in response to the operating of said connecting means.

11. An automatic telephone system, according to claim 10, in which the means for applying the potentials to the incoming wires comprises a plurality of counting relays, means responsive to the sending of a selective combination for sending a pulse to said counting relays for operating one of said relays, and means responsive to the operation of each of said counting relays for operating the switching means for transferring the potential applied to one of said incoming wires to the other of said wires.

12. An automatic telephone system, according to claim 11, further comprising means operative when an odd number of the exploring relays remain unused for reversing the connection of the two incoming wires and for thus causing the application of the potential to the appropriate wire, said potential being applied twice in succession to this wire and then being switched again alternately to one wire and the other.

13. An automatic telephone system, according to claim 1, further comprising a code sending device for sending codes for selection stages, each requiring several codes and having a receiving arrangement for receiving from a selection stage an "invitation-to-send" signal, means responsive to said signal for sending several selective combinations in succession, each combination consisting of a predetermined electrical characteristic which lasts for a predetermined period of time followed by a suitable time interval, means at the selection stage for sending another signal to the register when the number of codes necessary for the steering of said stage have been received, and means for sending additional codes in response to a new "invitation-to-send" signal from the next selection stage.

14. An automatic telephone system, according to claim 13, further comprising means operative when a combination of several codes must be used to steer a selection stage for withholding the sending of the first of these codes until all have been received by the register, whereby the holding time of the common control member associated with that selection stage is reduced.

15. An automatic telephone system, according to claim 1, in which the first receiving means comprises a plurality of counting relays including a differential relay with an energizing winding and an opposition winding and a single-winding relay, a rectifier, the opposition winding of said differential relay being connected in series with the winding of said single-winding relay via said rectifier, means for delivering the first pulse of the dialed pulses to said energizing winding of said differential relay, means for preparing the circuit for said single-winding relay by the operation of said differential relay, means responsive to the end of said first pulse for operating said single-winding relay, and means for causing the second pulse to be received both by the opposition winding of said differential relay, thereby releasing said differential relay, and by the winding of said single-winding relay, whereby said single-winding relay is held, said rectifier being so poled as to prevent the release of the differential relay at the end of the first pulse.

16. An automatic telephone system, according to claim 1, in which the selecting means comprises a plurality of selection stages, said system further comprising a timing device adapted to operate a predetermined time after its connection to the register, means for connecting said timing device to said register at the moment of the commencement of each selection, means responsive to the operation of said timing device for releasing the selection chain and causing the selection operations to resume, means for releasing said timing device upon the release of said selection chain, means for connecting said timing device again when said selection operations are resumed, and means for sending the busy tone to the calling line upon the second operation of said timing device.

17. An automatic telephone system, according to claim 16, in which a plurality of translators are provided adapted to be connected to the register and to send translations thereto, said system further comprising means responsive to the resumption of the selection operations for cancelling the translations received from the translator and selecting another translator and connecting it to the register.

18. An automatic telephone system, according to claim 16, further comprising means operated when the routing of a call requires the switching in of an auxiliary register for modifying the operation of the timing device so as to send the calling line the busy tone if the numerical portion of the selection is not made within a predetermined time.

References Cited in the file of this patent

UNITED STATES PATENTS

| | | |
|---|---|---|
| 2,597,209 | Walsh | May 20, 1952 |
| 2,618,708 | Ostline | Nov. 18, 1952 |
| 2,631,195 | Ostline | Mar. 10, 1953 |
| 2,678,353 | Ostline | May 11, 1954 |